US006687194B1

(12) United States Patent
Kobayashi et al.

(10) Patent No.: US 6,687,194 B1
(45) Date of Patent: Feb. 3, 2004

(54) OPTICAL STORING APPARATUS AND REPRODUCING METHOD FOR CORRECTING READ ERRORS

(75) Inventors: Shinya Kobayashi, Kawasaki (JP);
Shigenori Yanagi, Kawasaki (JP);
Teruji Yamakawa, Kawasaki (JP);
Kiyomi Imamura, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/374,002

(22) Filed: Aug. 13, 1999

(30) Foreign Application Priority Data

Dec. 15, 1998 (JP) .......................................... 10/355927

(51) Int. Cl.[7] .............................................. G11B 11/00
(52) U.S. Cl. .................................. 369/13.05; 369/53.2
(58) Field of Search .......................... 369/13.05, 13.17, 369/13.22, 53.2, 53.3, 53.28, 116, 44.34, 44.29, 44.11, 13.02, 53.26, 30.16

(56) References Cited

U.S. PATENT DOCUMENTS

| 5,796,704 A | 8/1998 | Nanba et al. ............. 369/53.12 |
| 6,324,128 B1 * | 11/2001 | Ikeda et al. .............. 369/13.05 |
| 6,434,087 B1 * | 8/2002 | Schell et al. ............. 369/13.02 |

FOREIGN PATENT DOCUMENTS

| EP | 0 491 301 | 6/1992 |
| EP | 0 878 797 | 11/1998 |
| EP | 0 944 051 | 9/1999 |
| JP | 564855 | 1/1981 |
| JP | 58182172 | 10/1983 |
| JP | 1285078 | 11/1989 |
| JP | 3228231 | 10/1991 |
| JP | 5189876 | 7/1993 |
| JP | 6052589 | 2/1994 |
| JP | 6290478 | 10/1994 |
| JP | 7282537 | 10/1995 |
| JP | 7311906 | 11/1995 |
| JP | 9091610 | 4/1997 |
| JP | 10050005 | 2/1998 |
| JP | 10198962 | 7/1998 |

* cited by examiner

*Primary Examiner*—Ali Neyzari
(74) *Attorney, Agent, or Firm*—Greer, Burns & Crain, Ltd.

(57) ABSTRACT

A read retry of an MSR medium is executed while changing a setting of a reproducing magnetic field. Parameter set values of a successful read retry are stored as statistic information. When changes of the set values for defaults increase, the defaults are updated. The parameter set information of a retry success is stored as statistic information. In a new read retry, the parameter set information of a high success ratio is selected from the statistic information and the retry is executed.

20 Claims, 54 Drawing Sheets

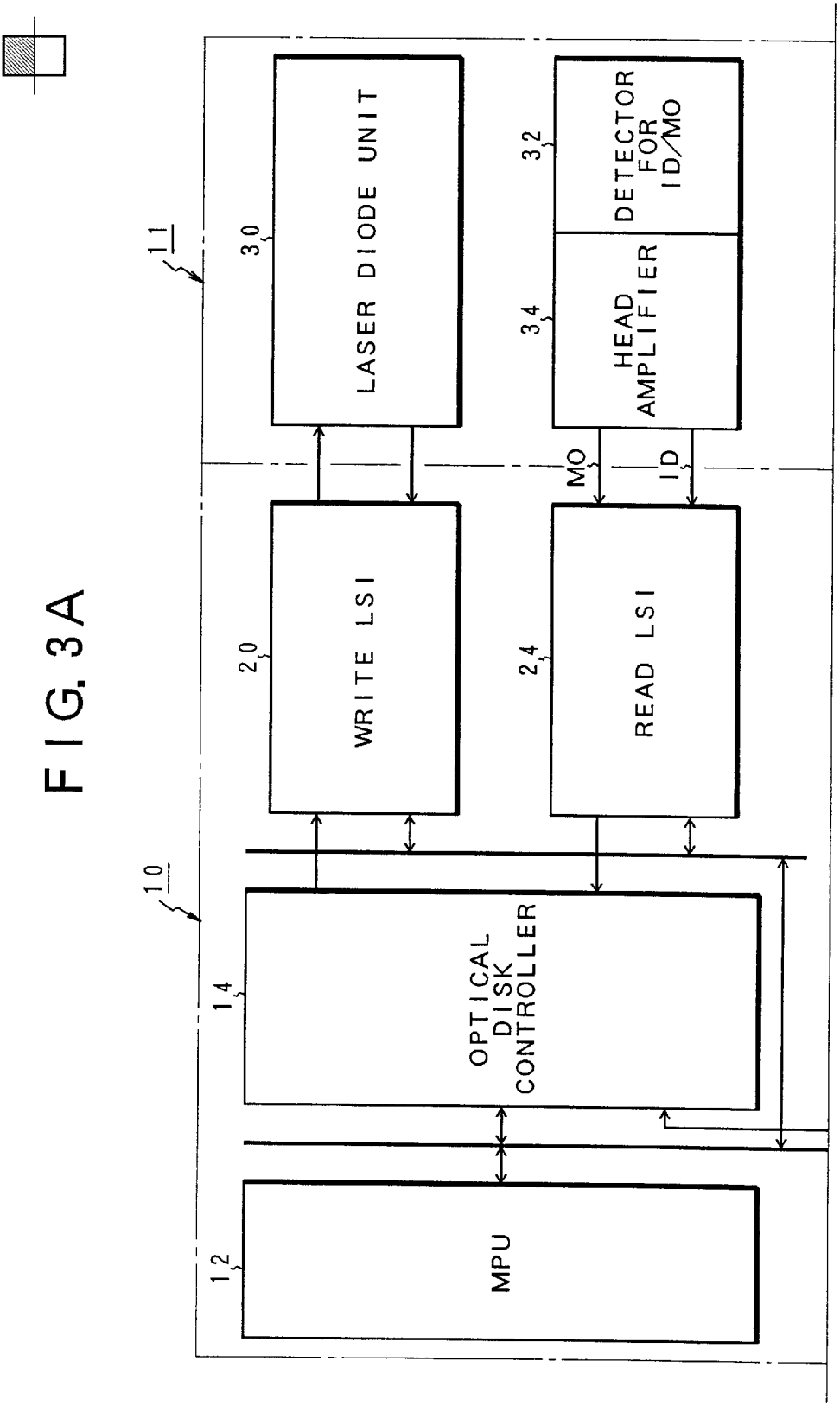

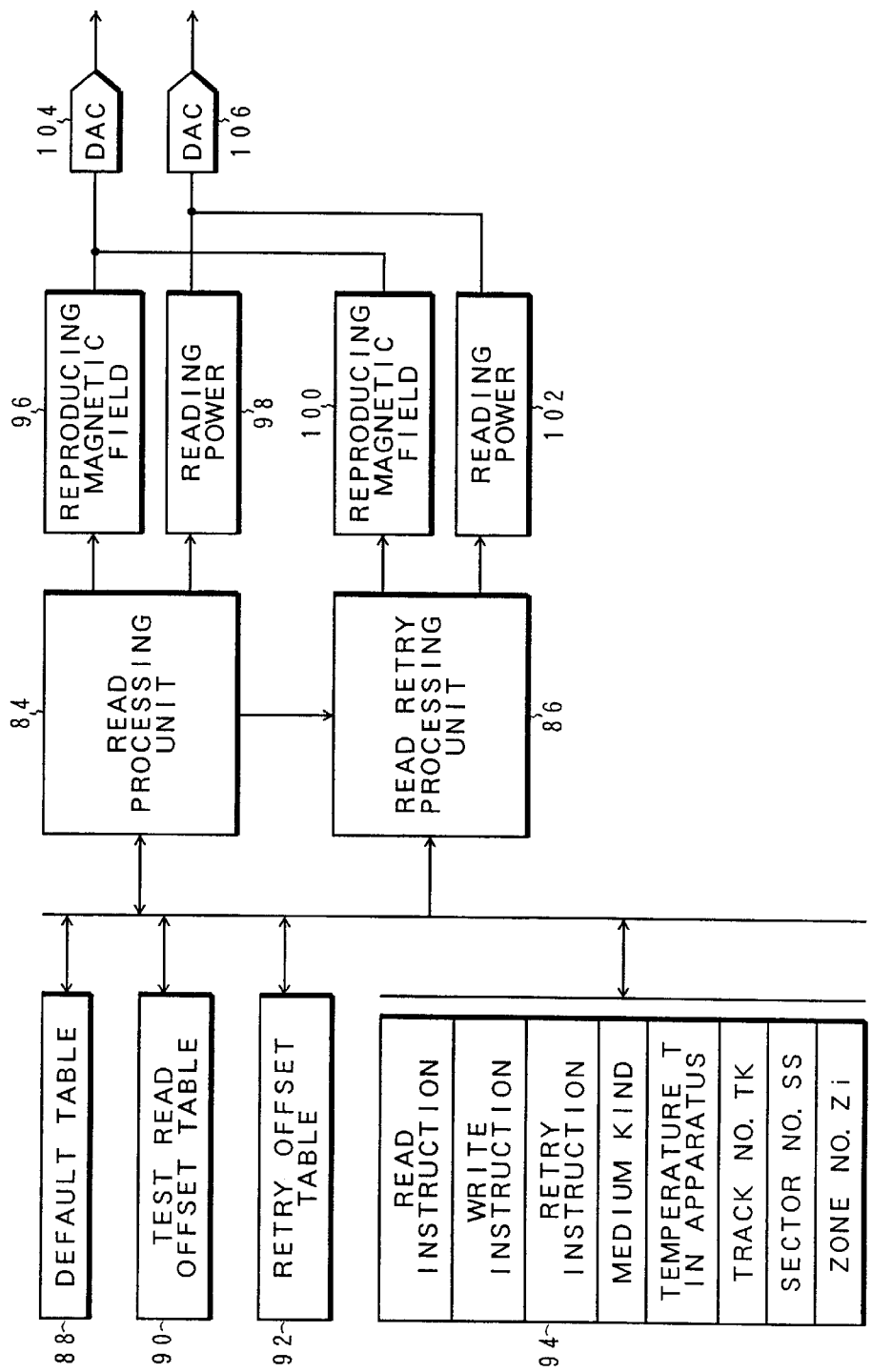

| ZONE | REPRODUCING MAGNETIC FIELD | READING POWER |
|---|---|---|
| Z1 | H1 | Pr1 |
| Z2 | H2 | Pr2 |
| Z3 | H3 | Pr3 |
| Z4 | H4 | Pr4 |
| ⋮ | ⋮ | ⋮ |
| Z17 | H17 | Pr17 |
| Z18 | H18 | Pr18 |

| ZONE | TEST READ OFFSET |
|---|---|
| Z1 | $\Delta H11$ |
| Z2 | $\Delta H12$ |
| Z3 | $\Delta H13$ |
| Z4 | $\Delta H14$ |
| ⋮ | ⋮ |
| Z17 | $\Delta H117$ |
| Z18 | $\Delta H118$ |

| THE NUMBER OF TIMES OF RETRY | RETRY OFFSET |
|---|---|
| 1 | ΔH21 |
| 2 | ΔH22 |
| ⋮ | ⋮ |
| n | ΔH2n |

| THE NUMBER OF TIMES OF READ RETRY | RETRY OFFSET ΔH2 |
|---|---|
| 1 | +10% |
| 2 | −10% |
| 3 | +20% |
| 4 | −20% |
| 5 | +30% |
| 6 | −30% |
| 7 | +40% |

| AREA | ZONE | REPRODUCING MAGNETIC FIELD | READING POWER |
|------|------|---------------------------|---------------|
| A1 | Z1-Z3 | H1 | Pr1 |
| A2 | Z4-Z6 | H2 | Pr2 |
| A3 | Z7-Z9 | H3 | Pr3 |
| A4 | Z10-Z12 | H4 | Pr4 |
| A5 | Z13-Z15 | H5 | Pr5 |
| A6 | Z16-Z18 | H6 | Pr6 |

| AREA | ZONE | TEST READ OFFSET |
|------|------|------------------|
| A1 | Z1-Z3 | $\Delta H11$ |
| A2 | Z4-Z6 | $\Delta H12$ |
| A3 | Z7-Z9 | $\Delta H13$ |
| A4 | Z10-Z12 | $\Delta H14$ |
| A5 | Z13-Z15 | $\Delta H15$ |
| A6 | Z16-Z18 | $\Delta H16$ |

FIG. 14

| TEMPERATURE | TEST READ OFFSET |
|---|---|
| 0°C ≦ T < 10°C | ΔH11 |
| 10°C ≦ T < 20°C | ΔH12 |
| 20°C ≦ T < 30°C | ΔH13 |
| 30°C ≦ T < 40°C | ΔH14 |
| 40°C ≦ T < 50°C | ΔH15 |
| 50°C ≦ T < 60°C | ΔH16 |

90-3

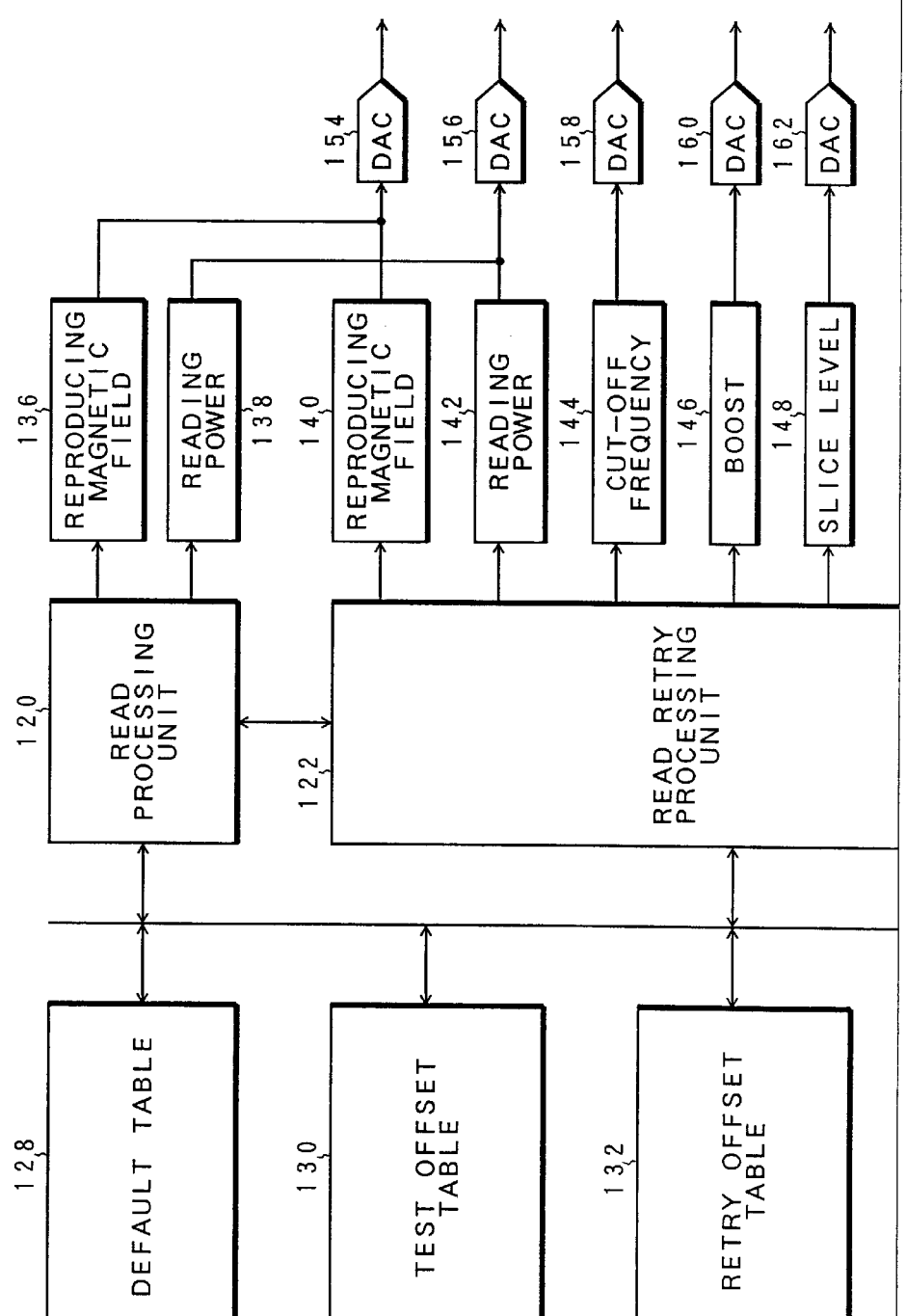

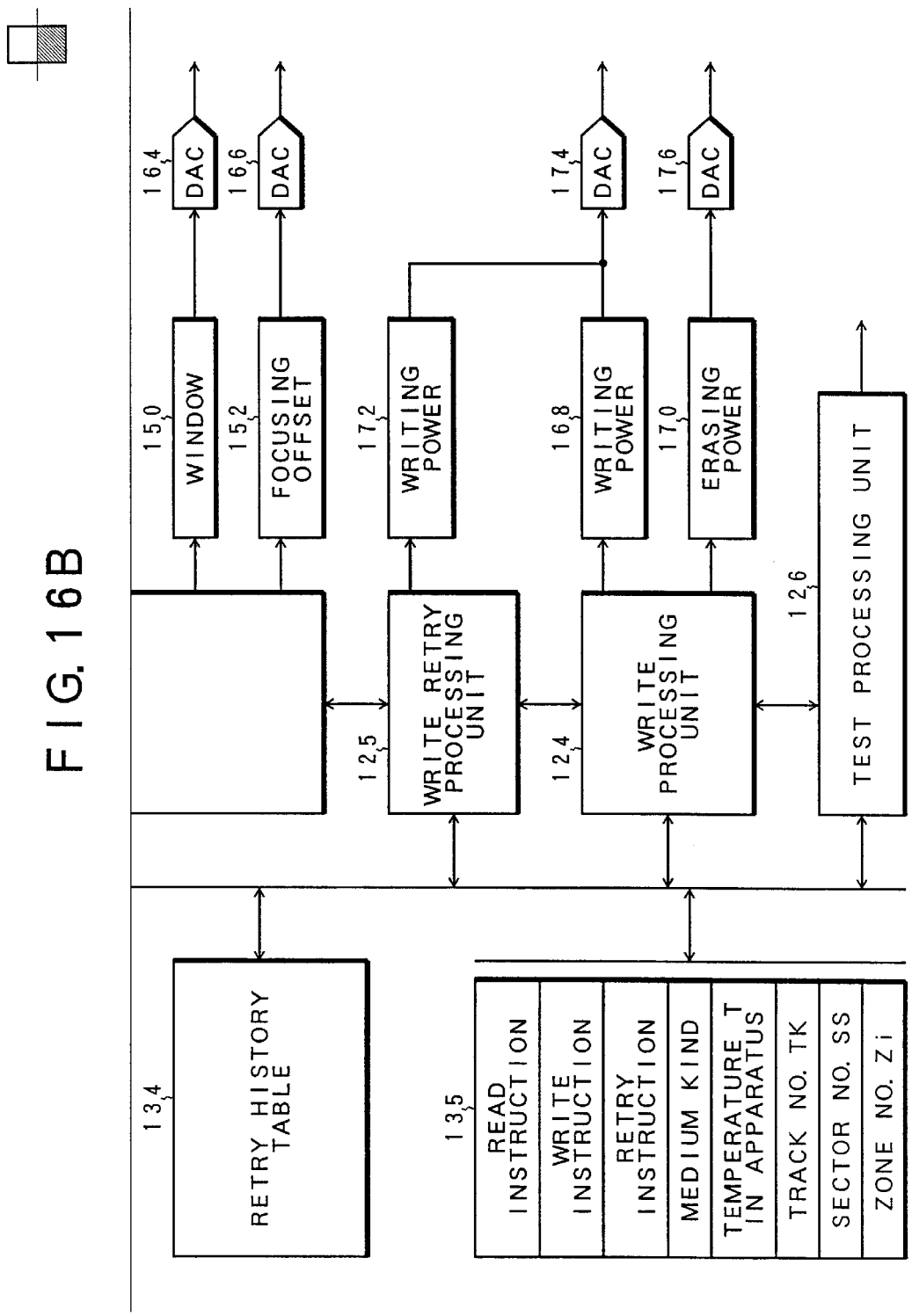

| ZONE | REPRODUCING MAGNETIC FIELD | READING POWER | WRITING POWER | CUT-OFF FREQUENCY | BOOST | SLICE LEVEL | WINDOW | FOCUSING OFFSET |
|---|---|---|---|---|---|---|---|---|
| Z1 | H1 | Pr1 | Pw1 | Fc1 | Fb1 | S1 | W1 | FCO1 |
| Z2 | H2 | Pr2 | Pw2 | Fc2 | Fb2 | S2 | W2 | FCO2 |
| Z3 | H3 | Pr3 | Pw3 | Fc3 | Fb3 | S3 | W3 | FCO3 |
| Z4 | H4 | Pr4 | Pw4 | Fc4 | Fb4 | S4 | W4 | FCO4 |
| ...... | ...... | ...... | ...... | ...... | ...... | ...... | ...... | ...... |
| Z17 | H17 | Pr17 | Pw17 | Fc17 | Fb17 | S17 | W17 | FCO17 |
| Z18 | H18 | Pr18 | Pw18 | Fc18 | Fb18 | S18 | W18 | FCO18 |

F I G. 18

| ZONE | REPRODUCING MAGNETIC FIELD | READING POWER | WRITING POWER | CUT-OFF FREQUENCY | BOOST | SLICE LEVEL | WINDOW | FOCUSING OFFSET |
|---|---|---|---|---|---|---|---|---|
| Z1 | ΔH11 | ΔPr11 | ΔPw11 | ΔFc11 | ΔFb11 | ΔS11 | ΔW11 | ΔFCO11 |
| Z2 | ΔH12 | ΔPr12 | ΔPw12 | ΔFc12 | ΔFb12 | ΔS12 | ΔW12 | ΔFCO12 |
| Z3 | ΔH13 | ΔPr13 | ΔPw13 | ΔFc13 | ΔFb13 | ΔS13 | ΔW13 | ΔFCO13 |
| Z4 | ΔH14 | ΔPr14 | ΔPw14 | ΔFc14 | ΔFb14 | ΔS14 | ΔW14 | ΔFCO14 |
| ...... | ...... | ...... | ...... | ...... | ...... | ...... | ...... | ...... |
| Z17 | ΔH117 | ΔPr117 | ΔPw117 | ΔFc117 | ΔFb117 | ΔS117 | ΔW117 | ΔFCO117 |
| Z18 | ΔH118 | ΔPr118 | ΔPw118 | ΔFc118 | ΔFb118 | ΔS118 | ΔW118 | ΔFCO118 |

| ZONE | REPRODUCING MAGNETIC FIELD | READING POWER | WRITING POWER | CUT-OFF FREQUENCY | BOOST | SLICE LEVEL | WINDOW | FOCUSING OFFSET |
|---|---|---|---|---|---|---|---|---|
| Z1 | ΔH21 | ΔPr21 | ΔPw21 | ΔFc21 | ΔFb21 | ΔS21 | ΔW21 | ΔFCO21 |
| Z2 | ΔH22 | ΔPr22 | ΔPw22 | ΔFc22 | ΔFb22 | ΔS22 | ΔW22 | ΔFCO22 |
| Z3 | ΔH23 | ΔPr23 | ΔPw23 | ΔFc23 | ΔFb23 | ΔS23 | ΔW23 | ΔFCO23 |
| Z4 | ΔH24 | ΔPr24 | ΔPw24 | ΔFc24 | ΔFb24 | ΔS24 | ΔW24 | ΔFCO24 |
| ...... | | | | | | | | |
| Z17 | ΔH217 | ΔPr217 | ΔPw217 | ΔFc217 | ΔFb217 | ΔS217 | ΔW217 | ΔFCO217 |
| Z18 | ΔH218 | ΔPr218 | ΔPw218 | ΔFc218 | ΔFb218 | ΔS218 | ΔW218 | ΔFCO218 |

FIG. 21

| AREA | ZONE | REPRODUCING MAGNETIC FIELD | READING POWER | WRITING POWER |
|---|---|---|---|---|
| A1 | Z1-Z3 | H1 | Pr1 | Pw1 |
| A2 | Z4-Z6 | H2 | Pr2 | Pw2 |
| A3 | Z7-Z9 | H3 | Pr3 | Pw3 |
| A4 | Z10-Z12 | H4 | Pr4 | Pw4 |
| A5 | Z13-Z15 | H5 | Pr5 | Pw5 |
| A6 | Z16-Z18 | H6 | Pr6 | Pw6 |

128-2

| CUT-OFF FREQUENCY | BOOST | SLICE LEVEL | WINDOW | FOCUSING OFFSET |
|---|---|---|---|---|
| Fc1 | Fb1 | S1 | W1 | FCO1 |
| Fc2 | Fb2 | S2 | W2 | FCO2 |
| Fc3 | Fb3 | S3 | W3 | FCO3 |
| Fc4 | Fb4 | S4 | W4 | FCO4 |
| Fc5 | Fb5 | S5 | W5 | FCO5 |
| Fc6 | Fb6 | S6 | W6 | FCO6 |

FIG. 22

| AREA | ZONE | REPRODUCING MAGNETIC FIELD | READING POWER | WRITING POWER | CUT-OFF FREQUENCY | BOOST | WINDOW | FOCUSING OFFSET |
|---|---|---|---|---|---|---|---|---|
| A1 | Z1−Z3 | ΔH11 | ΔPr11 | ΔPw11 | ΔFc11 | ΔFb11 | ΔW11 | ΔFCO11 |
| A2 | Z4−Z6 | ΔH12 | ΔPr12 | ΔPw12 | ΔFc12 | ΔFb12 | ΔW12 | ΔFCO12 |
| A3 | Z7−Z9 | ΔH13 | ΔPr13 | ΔPw13 | ΔFc13 | ΔFb13 | ΔW13 | ΔFCO13 |
| A4 | Z10−Z12 | ΔH14 | ΔPr14 | ΔPw14 | ΔFc14 | ΔFb14 | ΔW14 | ΔFCO14 |
| A5 | Z13−Z15 | ΔH15 | ΔPr15 | ΔPw15 | ΔFc15 | ΔFb15 | ΔW15 | ΔFCO15 |
| A6 | Z16−Z18 | ΔH16 | ΔPr16 | ΔPw16 | ΔFc16 | ΔFb16 | ΔW16 | ΔFCO16 |

| AREA | ZONE | REPRODUCING MAGNETIC FIELD | READING POWER | WRITING POWER | CUT-OFF FREQUENCY | BOOST | WINDOW | FOCUSING OFFSET |
|---|---|---|---|---|---|---|---|---|
| A1 | Z1-Z3 | ΔH21 | ΔPr21 | ΔPw21 | ΔFc21 | ΔFb21 | ΔW21 | ΔFCO21 |
| A2 | Z4-Z6 | ΔH22 | ΔPr22 | ΔPw22 | ΔFc22 | ΔFb22 | ΔW22 | ΔFCO22 |
| A3 | Z7-Z9 | ΔH23 | ΔPr23 | ΔPw23 | ΔFc23 | ΔFb23 | ΔW23 | ΔFCO23 |
| A4 | Z10-Z12 | ΔH24 | ΔPr24 | ΔPw24 | ΔFc24 | ΔFb24 | ΔW24 | ΔFCO24 |
| A5 | Z13-Z15 | ΔH25 | ΔPr25 | ΔPw25 | ΔFc25 | ΔFb25 | ΔW25 | ΔFCO25 |
| A6 | Z16-Z18 | ΔH26 | ΔPr26 | ΔPw26 | ΔFc26 | ΔFb26 | ΔW26 | ΔFCO26 |

| TEMPERATURE | REPRODUCING MAGNETIC FIELD | READING POWER | WRITING POWER | CUT-OFF FREQUENCY | BOOST | WINDOW | FOCUSING OFFSET |
|---|---|---|---|---|---|---|---|
| 0°C ≦ T < 10°C | H1 | Pr1 | Pw1 | Fc1 | Fb1 | W1 | FCO1 |
| 10°C ≦ T < 20°C | H2 | Pr2 | Pw2 | Fc2 | Fb2 | W2 | FCO2 |
| 20°C ≦ T < 30°C | H3 | Pr3 | Pw3 | Fc3 | Fb3 | W3 | FCO3 |
| 30°C ≦ T < 40°C | H4 | Pr4 | Pw4 | Fc4 | Fb4 | W4 | FCO4 |
| 40°C ≦ T < 50°C | H5 | Pr5 | Pw5 | Fc5 | Fb5 | W5 | FCO5 |
| 50°C ≦ T < 60°C | H6 | Pr6 | Pw6 | Fc6 | Fb6 | W6 | FCO6 |

F I G. 2 5

| TEMPERATURE | REPRODUCING MAGNETIC FIELD | READING POWER | WRITING POWER | CUT-OFF FREQUENCY | BOOST | WINDOW | FOCUSING OFFSET |
|---|---|---|---|---|---|---|---|
| 0°C ≦ T < 10°C | ΔH11 | ΔPr11 | ΔPw11 | ΔFc11 | ΔFb11 | ΔW11 | ΔFCO11 |
| 10°C ≦ T < 20°C | ΔH12 | ΔPr12 | ΔPw12 | ΔFc12 | ΔFb12 | ΔW12 | ΔFCO12 |
| 20°C ≦ T < 30°C | ΔH13 | ΔPr13 | ΔPw13 | ΔFc13 | ΔFb13 | ΔW13 | ΔFCO13 |
| 30°C ≦ T < 40°C | ΔH14 | ΔPr14 | ΔPw14 | ΔFc14 | ΔFb14 | ΔW14 | ΔFCO14 |
| 40°C ≦ T < 50°C | ΔH15 | ΔPr15 | ΔPw15 | ΔFc15 | ΔFb15 | ΔW15 | ΔFCO15 |
| 50°C ≦ T < 60°C | ΔH16 | ΔPr16 | ΔPw16 | ΔFc16 | ΔFb16 | ΔW16 | ΔFCO16 |

130-3

F I G. 26

132-3

| TEMPERATURE | REPRODUCING MAGNETIC FIELD | READING POWER | WRITING POWER | CUT-OFF FREQUENCY | BOOST | WINDOW | FOCUSING OFFSET |
|---|---|---|---|---|---|---|---|
| 0°C ≦ T < 10°C | ΔH21 | ΔPr21 | ΔPw21 | ΔFc21 | ΔFb21 | ΔW21 | ΔFCO21 |
| 10°C ≦ T < 20°C | ΔH22 | ΔPr22 | ΔPw22 | ΔFc22 | ΔFb22 | ΔW22 | ΔFCO22 |
| 20°C ≦ T < 30°C | ΔH23 | ΔPr23 | ΔPw23 | ΔFc23 | ΔFb23 | ΔW23 | ΔFCO23 |
| 30°C ≦ T < 40°C | ΔH24 | ΔPr24 | ΔPw24 | ΔFc24 | ΔFb24 | ΔW24 | ΔFCO24 |
| 40°C ≦ T < 50°C | ΔH25 | ΔPr25 | ΔPw25 | ΔFc25 | ΔFb25 | ΔW25 | ΔFCO25 |
| 50°C ≦ T < 60°C | ΔH26 | ΔPr26 | ΔPw26 | ΔFc26 | ΔFb26 | ΔW26 | ΔFCO26 |

F I G. 3 4
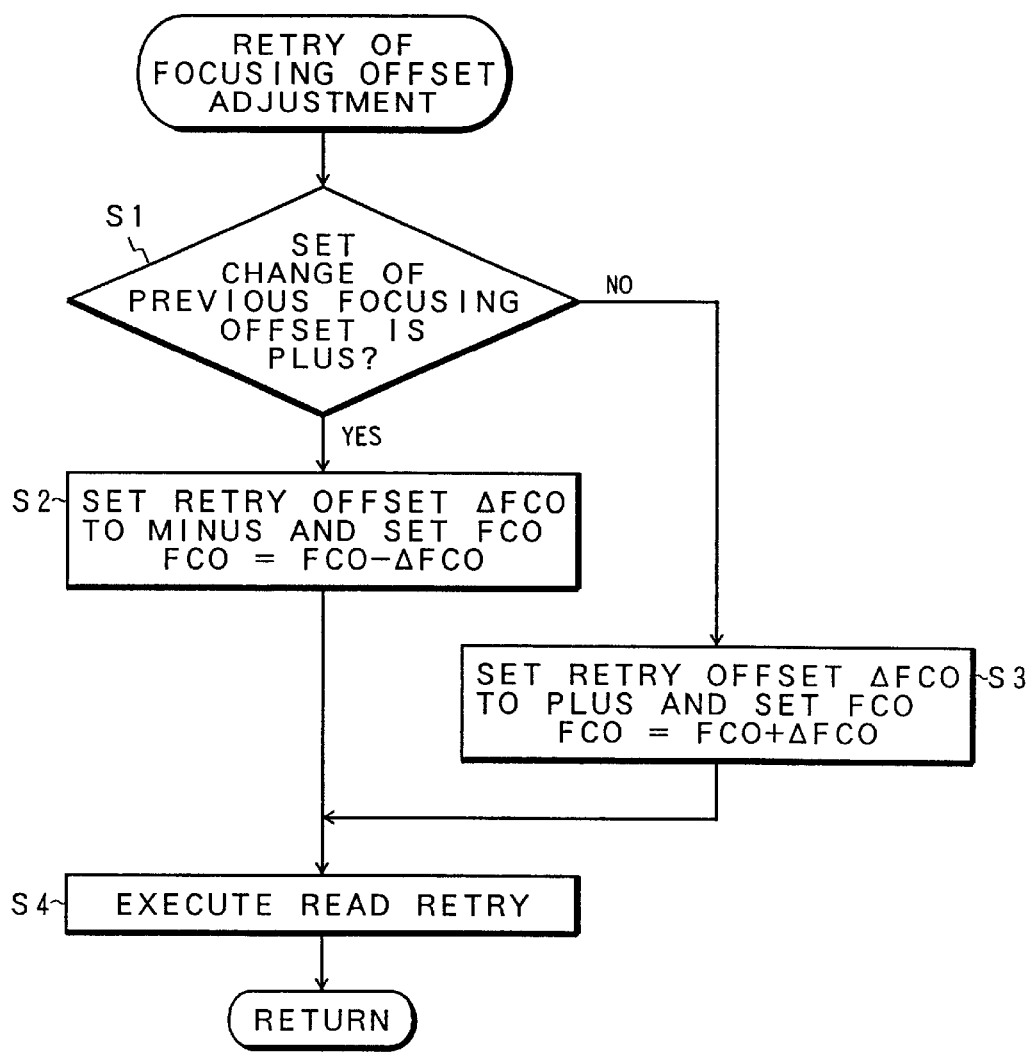

FIG. 38A
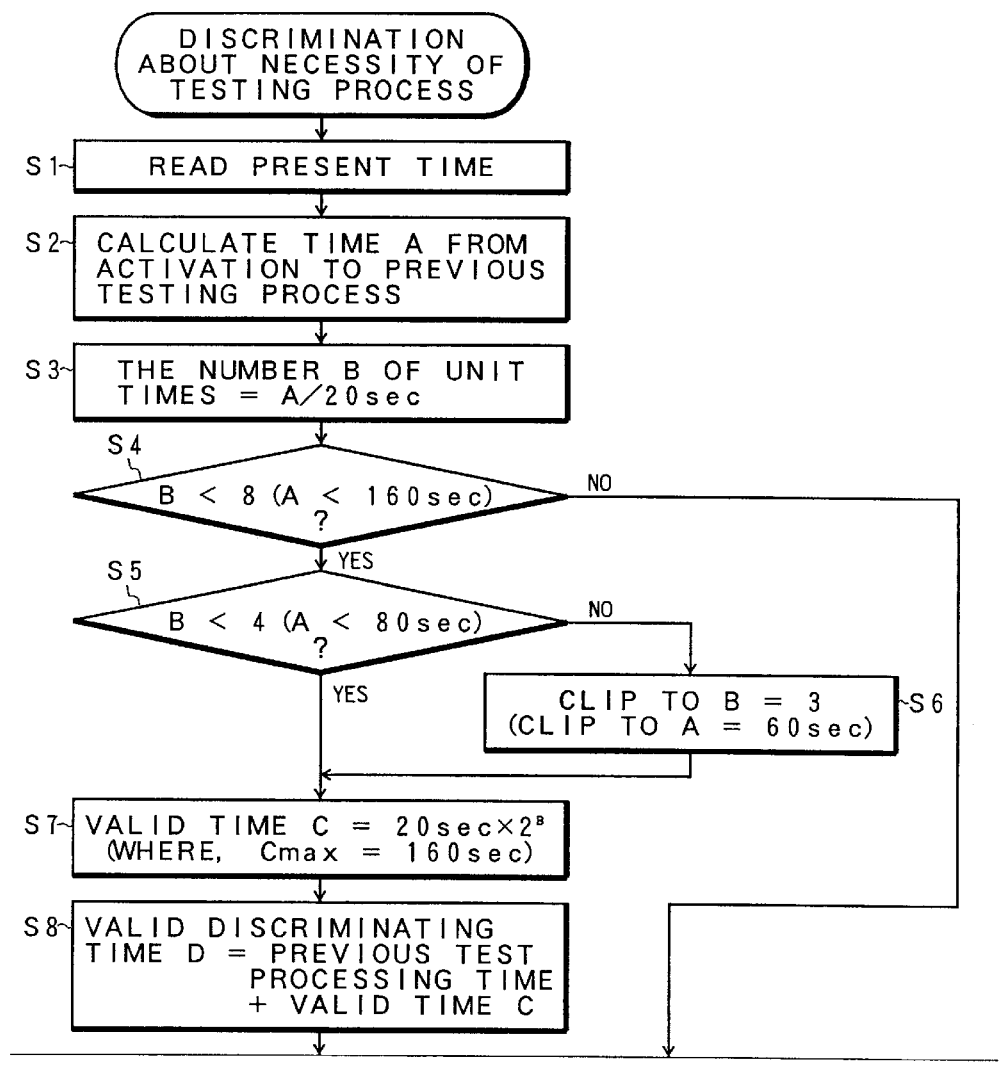

F I G. 4 1

| THE NUMBER OF TIMES OF WRITE RETRY | RETRY OFFSET $\Delta Pw$ |
|---|---|
| 1 | 0% |
| 2 | +3% |
| 3 | -3% |
| 4 | +6% |
| 5 | -6% |
| 6 | TEST WRITE |
| 7 | TEST WRITE |

132-4

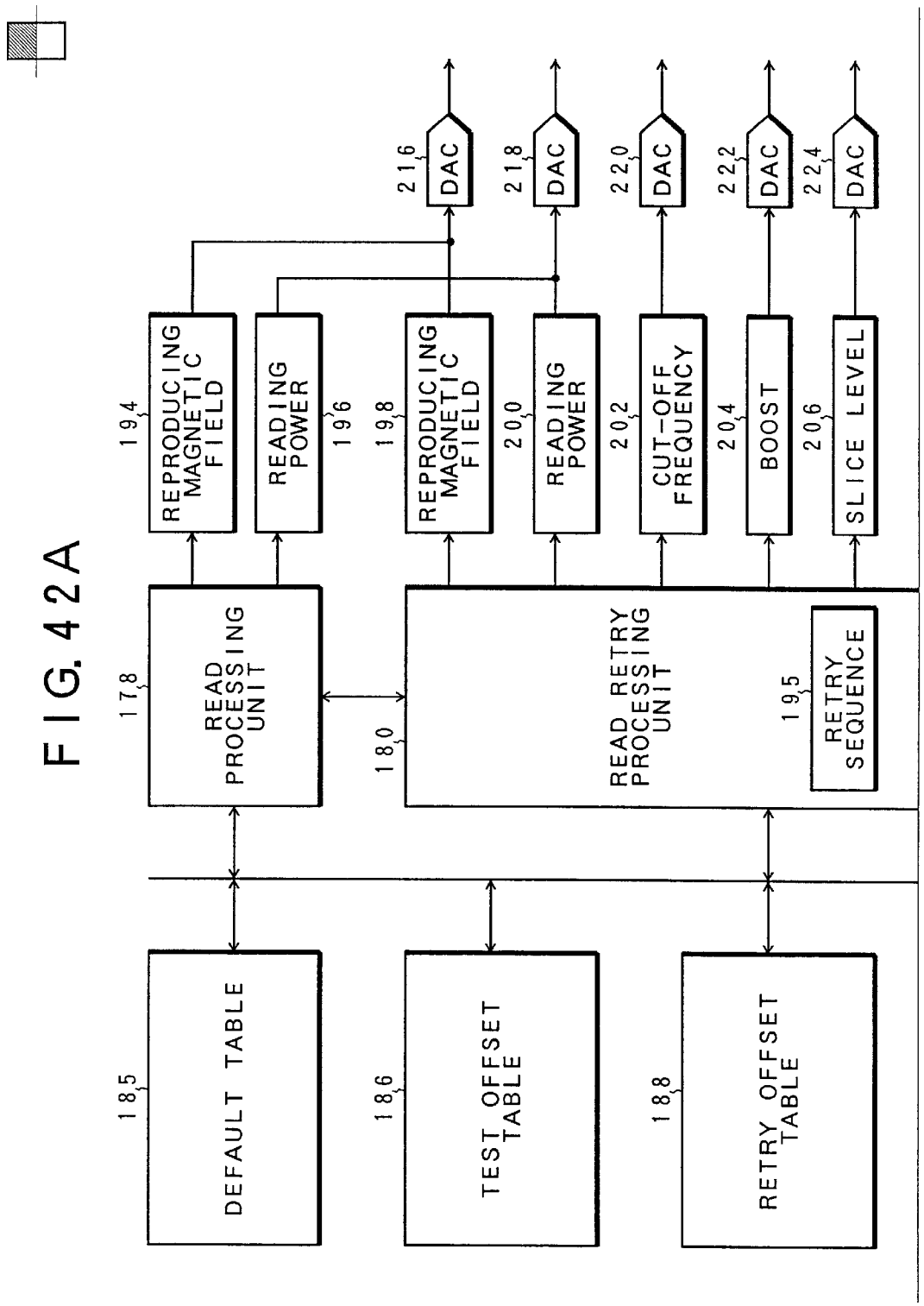

FIG. 43

| RETRY SEQUENCE (195-1) | RETRY OFFSET (188-1) |
|---|---|
| SEQ1 | $+\Delta H$ |
| SEQ2 | $-\Delta H$ |
| SEQ3 | $+\Delta Pr$ |
| SEQ4 | $-\Delta Pr$ |
| SEQ5 | $+\Delta Fc$ |
| SEQ6 | $-\Delta Fc$ |
| SEQ7 | $+\Delta Fb$ |
| SEQ8 | $-\Delta Fb$ |
| SEQ9 | $+\Delta S$ |
| SEQ10 | $-\Delta S$ |
| SEQ11 | $+\Delta W$ |
| SEQ12 | $-\Delta W$ |
| SEQ13 | $+\Delta FCO$ |
| SEQ14 | $-\Delta FCO$ |

FIG. 44

| RETRY SEQUENCE (195-2) | RETRY OFFSET (188-2) |
|---|---|
| SEQ1 | $+\Delta Pr$ |
| SEQ2 | $-\Delta Pr$ |
| SEQ3 | $+\Delta Fc$ |
| SEQ4 | $-\Delta Fc$ |
| SEQ5 | $+\Delta Fb$ |
| SEQ6 | $-\Delta Fb$ |
| SEQ7 | $+\Delta S$ |
| SEQ8 | $-\Delta S$ |
| SEQ9 | $+\Delta W$ |
| SEQ10 | $-\Delta W$ |
| SEQ11 | $+\Delta FCO$ |
| SEQ12 | $-\Delta FCO$ |

| TEMPERATURE | SUCCESS RETRY SEQUENCE |
|---|---|
| $0°C \leq T < 10°C$ | SEQ3 |
| $10°C \leq T < 20°C$ | SEQ1 |
| $20°C \leq T < 30°C$ | SEQ2 |
| $30°C \leq T < 40°C$ | SEQ4 |
| $40°C \leq T < 50°C$ | SEQ5 |
| $50°C \leq T < 60°C$ | SEQ7 |

| ZONE | SUCCESS RETRY SEQUENCE |
|---|---|
| Z01 | SEQ2 |
| Z02 | SEQ1 |
| Z03 | SEQ2 |
| Z04 | SEQ3 |
| ⋮ | ⋮ |
| Z18 | SEQ1 |

| MEDIUM CAPACITY | SUCCESS RETRY SEQUENCE |
|---|---|
| 128MB | SEQ1 |
| 230MB | SEQ1 |
| 540MB | SEQ2 |
| 640MB | SEQ2 |
| 1.3GB | SEQ1 |

| ZONE | SUCCESS RETRY SEQUENCE |
|---|---|
| 00001-02500 | SEQ1 |
| 02501-05000 | SEQ1 |
| 05001-07500 | SEQ2 |
| 07501-10000 | SEQ1 |
| ⋮ | ⋮ |
| 32501-35000 | SEQ4 |

| TEMPERATURE | SUCCESS RETRY SEQUENCE SEQi | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| $0°C \leq T < 10°C$ | 1 | 1 | 4 | 2 | 1 | 0 | 0 | 0 | 0 | 0 | 0 | 0 | 0 | 0 |
| $10°C \leq T < 20°C$ | 6 | 2 | 1 | 1 | 0 | 0 | 0 | 0 | 0 | 0 | 0 | 0 | 0 | 0 |
| $20°C \leq T < 30°C$ | 2 | 4 | 3 | 1 | 1 | 1 | 0 | 0 | 0 | 0 | 0 | 0 | 0 | 0 |
| $30°C \leq T < 40°C$ | 1 | 7 | 3 | 2 | 1 | 1 | 1 | 0 | 0 | 0 | 0 | 0 | 0 | 0 |
| $40°C \leq T < 50°C$ | 0 | 2 | 4 | 3 | 1 | 1 | 1 | 1 | 1 | 0 | 1 | 0 | 0 | 0 |
| $50°C \leq T < 60°C$ | 0 | 0 | 0 | 1 | 2 | 1 | 4 | 1 | 0 | 0 | 0 | 1 | 1 | 0 |

F I G. 50

190-6

| ZONE | SUCCESS RETRY SEQUENCE SEQi | | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Z01 | 2 | 2 | 6 | 8 | 2 | 1 | 0 | 0 | 1 | 0 | 0 | 1 | 0 | 0 |
| Z02 | 3 | 2 | 5 | 4 | 3 | 1 | 1 | 0 | 0 | 1 | 0 | 0 | 0 | 0 |
| Z03 | 4 | 5 | 3 | 2 | 1 | 2 | 0 | 0 | 1 | 0 | 0 | 0 | 0 | 0 |
| Z04 | 3 | 7 | 3 | 2 | 1 | 1 | 1 | 0 | 0 | 0 | 0 | 0 | 0 | 0 |
| ... | ... | ... | ... | ... | ... | ... | ... | ... | ... | ... | ... | ... | ... | ... |
| Z18 | 5 | 2 | 1 | 1 | 0 | 0 | 0 | 0 | 0 | 0 | 1 | 0 | 0 | 0 |

| MEDIUM CAPACITY | SUCCESS RETRY SEQUENCE SEQi ||||||||||||||
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 128MB | 10 | 7 | 2 | 1 | 2 | 0 | 0 | 0 | 0 | 0 | 0 | 0 | — | — |
| 230MB | 12 | 6 | 3 | 1 | 2 | 1 | 1 | 0 | 0 | 0 | 0 | 0 | — | — |
| 540MB | 4 | 7 | 5 | 2 | 1 | 2 | 0 | 0 | 1 | 0 | 0 | 0 | — | — |
| 640MB | 2 | 4 | 8 | 5 | 2 | 1 | 1 | 1 | 0 | 0 | 1 | 0 | — | — |
| 1.3GB | 1 | 2 | 6 | 9 | 4 | 5 | 3 | 1 | 1 | 0 | 0 | 1 | 1 | 0 |

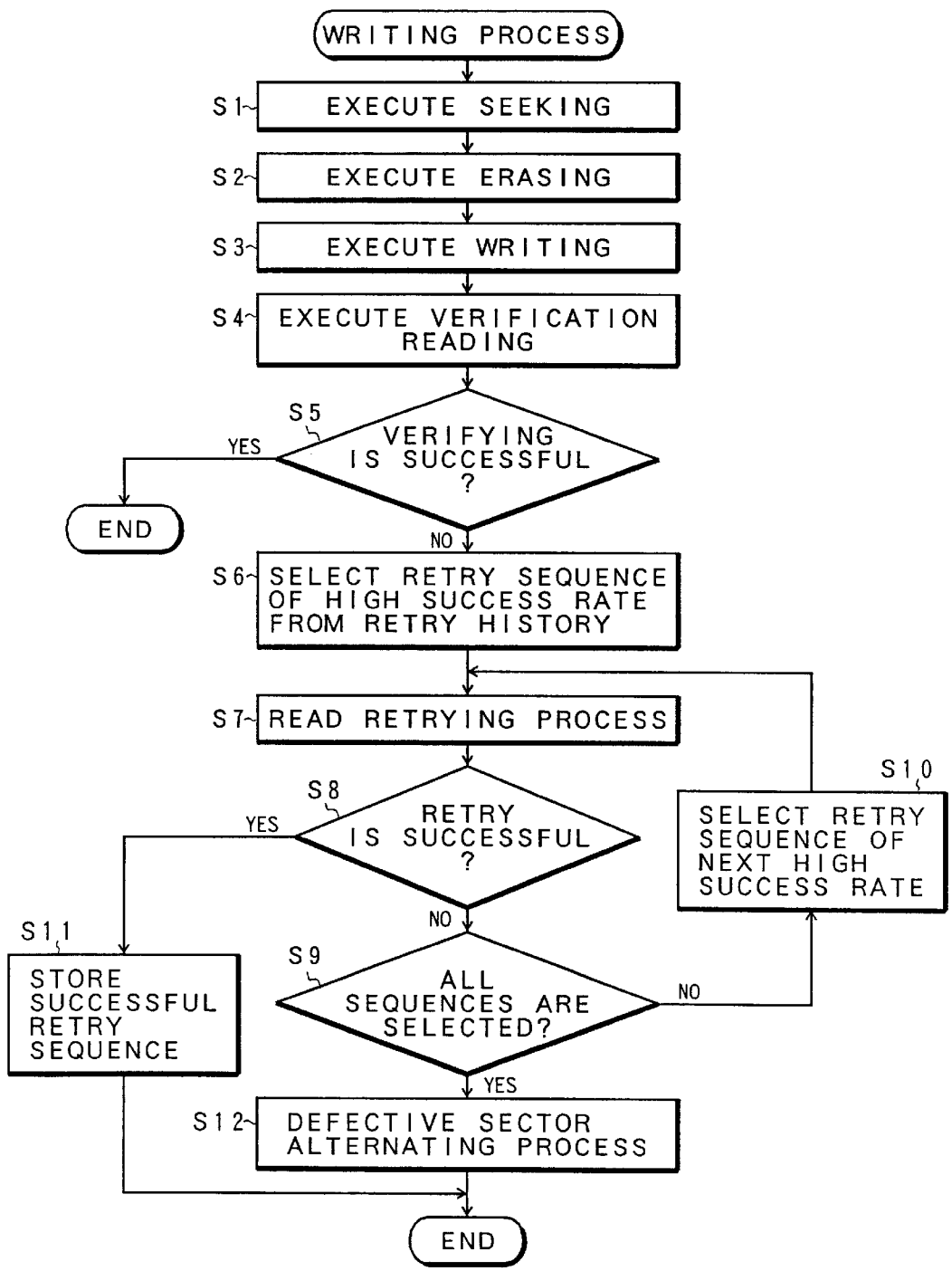
F I G. 5 3

OPTICAL STORING APPARATUS AND REPRODUCING METHOD FOR CORRECTING READ ERRORS

BACKGROUND OF THE INVENTION

1. Field of the Invention

The invention relates to an optical storing apparatus for recording and reproducing information by using a laser beam and a recording and reproducing method of an optical storage medium. More particularly, the invention relates to an optical storing apparatus for optimizing a retry in the case where a read error occurs in the recording and reproducing operation of an optical storage medium including an MSR medium to record and reproduce data at a density smaller than a beam diameter and a recording and reproducing method of an optical storage medium.

2. Description of the Related Arts

In recent years, an optical disk is highlighted as an external storage medium of a computer. In the optical disk, by forming magnetic recording pits on the submicron order onto the medium by using a laser beam, a recording capacity can be remarkably increased as compared with that of a floppy disk or a hard disk so far as an external storage medium. Further, in a magnetooptic disk as a perpendicular magnetic storage medium using a rare earth—transition metal system material, information can be rewritten and the future development is more and more expected.

The optical disk has a memory capacity of, for example, 128 MB, 230 MB, 540 MB, or 640 MB for one side of the disk of 3.5 inches. The 128 MB medium and 230 MB medium are based on a pit position modulation (PPM) recording. The 540 MB medium and 640 MB medium are based on a pulse width modulation (PWM) recording. This means that one optical disk has a memory capacity of 128 to 640 floppy disks when considering a fact that a memory capacity of one floppy disk of 3.5 inches is equal to about 1 MB. As mentioned above, the optical disk is a rewritable storage medium of a very high recording density. However, for preparations for a future multimedia era, it is necessary to further raise the recording density of the optical disk to a value larger than the present one. To raise the recording density, further more pits have to be recorded on the medium. For this purpose, it is necessary to further reduce the size of pit and to narrow an interval between the pits. In case of raising the recording density by such a method, although it is necessary to further reduce a wavelength of a laser beam to a value shorter than the present wavelength of 670 nm, when considering the case of putting into practical use, the pit size has to be reduced at the existing wavelength of 670 nm. In this case, as for the recording, by controlling a power of the laser beam, the pit smaller than the beam diameter can be formed. As for the reproduction, however, if the pit smaller than the beam diameter is reproduced, a crosstalk with the adjacent pit increases. In the worst case, since information of the adjacent pit is also included in a reproducing beam, such a method is very difficult when considering practicality.

As a method of reproducing a pit smaller than the beam diameter by using the beam of the existing wavelength of 670 nm, there is a magnetooptic recording and reproducing method represented by JP-A-3-93058 and is known as a recording and reproducing method by an MSR (Magnetically induced Super Resolution). The above method has two methods of an FAD (Front Aperture Detection) system and an RAD (Rear Aperture Detection) system. According to the FAD system, as shown in FIGS. 1A and 1B, an MSR medium is divided into a recording layer 320 and a reproducing layer 316 on a substrate 311 and a reproducing magnetic field Hr is applied in a state where a laser spot 322 of a read beam is irradiated, thereby reproducing. In this instance, in the portion where the reproducing layer 316 is the recording pit, a magnetic coupling of a switching layer 318 which is formed at a boundary with the recording layer 320 is released in dependence on a temperature distribution of the medium heating by the laser spot 322 and such a portion is influenced by the reproducing magnetic field Hr and becomes a mask. On the other hand, with regard to the portion of the next recording pit, the magnetic coupling of the switching layer 318 is held and such a portion becomes an aperture 324. Therefore, like a laser spot 322, only a pit 330 of the aperture 324 can be read without being influenced by an adjacent pit 328.

According to the double mask RAD system, as shown in FIGS. 2A and 2B, the MSR medium is constructed by three layers of the reproducing layer 316, an intermediate layer 317, and the recording layer 320 on the substrate 311. A reproducing laser power upon reproduction is slightly raised and information is read. Upon reading, depending on a temperature distribution of the medium heating by a laser spot 334 of the read beam, a front mask 336, an aperture 338 in which magnetization information of the recording layer 320 is transferred to the reproducing layer 316, and a rear mask 337 are formed in the reproducing layer 316. That is, in the front mask 336 at a low temperature by the read beam laser spot 334, no signal is derived because the reproducing layer 316 has been initialized by a reproducing magnetic field 332. In the aperture 338 at an intermediate temperature, since the intermediate layer 317 is perpendicularly magnetized, its coupling force is enhanced, the magnetization information of the recording layer 320 is transferred to the reproducing layer 316, and a signal is derived. In the rear mask 337 at a high temperature, since it is close to the Curie temperature of the intermediate layer 317, the coupling force between the recording layer 320 and reproducing layer 316 decreases and the magnetization of the reproducing layer 316 is aligned in the direction of the reproducing magnetic field 332. The magnetization information of the recording layer 320 transferred to the reproducing layer 316 is converted into an optical signal by a magnetooptic effect (Kerr effect or Faraday effect), so that data is reproduced. In this instance, as compared with a pit 328 of the recording layer 320 which is being read out at present, in the pit 330 of the recording layer 320 to be subsequently read out, since the information is not transferred because of the formation of the front mask 336 by initial magnetization information of the reproducing layer 316, even if the recording pit is smaller than the laser spot 334, no crosstalk is generated and the pit smaller than the beam diameter can be reproduced. Further, if the double mask RAD is used, since the area of the recording layer 320 other than the reproducing portion is in a state where it has been masked by the initialized reproducing layer 316, a pit interference from the adjacent pit does not occur and the pit interval can be further narrowed. The crosstalk from the adjacent track can be also suppressed. Thus, a track pitch can be narrowed more than that of the FAD and the reproduction can be performed at a high density even by using the beam of the existing wavelength of 680 nm.

However, in the conventional optical disk apparatus using the MSR medium as mentioned above, there is a problem such that unless the reproducing magnetic field which is used upon reproduction and the reading power are strictly controlled, the proper reproducing operation cannot be performed. This is because, for example, when a reproducing power Pr of the laser beam in the FAD system of FIGS. 1A and 1B is too small, a forming range of the mask 326 in FIG. 1B by the magnetization of the reproducing layer 316 decreases, the pit 328 is not masked, and a crosstalk occurs. When the reproducing power Pr is too strong, the forming range of the mask 326 is widened, the pit 330 is also partially masked, a reproducing level decreases, and an error occurs. At the same time, the reproducing magnetic field Hr also acts on the recording layer 320 and there is a possibility that the recording data is erased. When the reproducing power and the reproducing magnetic field are too small in the double mask RAD system of FIGS. 2A and 2B, the coupling range by the beam heating of the reproducing layer 316 is not widened, no aperture is formed, and the pit 328 in FIG. 2B is not reproduced. When the reproducing power and the reproducing magnetic field are too strong, an erasing range by the beam heating of the initialization magnetic field of the reproducing layer 316 is narrowed, a forming range of the front mask 336 is widened, and the pit 328 is also partially masked. The aperture 338 decreases, the reproducing level decreases, and an error occurs. At the same time, if the reproducing power is too strong, it also acts on the recording layer 320 and there is a possibility that the recording data is erased. To solve such a phenomenon, the method of merely adjusting the reproducing magnetic field or the reproducing power is insufficient and such a phenomenon also depends on an environmental temperature in the apparatus which decides a temperature of the storage medium. That is, when the environmental temperature in the apparatus changes to the low temperature side, a laser power to heat the reproducing layer to an aperture forming temperature is needed. On the contrary, when the environmental temperature changes to the high temperature side, since it is sufficient to slightly heat the reproducing layer to a rear mask forming temperature, it is necessary to reduce the reproducing power. When the reading of a certain sector of the MSR medium based on a read access fails, a read retry to read again by using values of the reproducing power and reproducing magnetic field adjusted to optimum values is performed. However, if the environmental temperature or the like in the apparatus is out of conditions upon adjustment of the reproducing magnetic field to the optimum value, even if the retry is performed many times, the reading operation does not succeed and a retry out finally occurs. The sector is determined to be a defective sector, and an alternating process is executed. Therefore, when the read error occurs, it takes time until the retry succeeds. Further, if use conditions of the apparatus are largely changed, the read error often occurs due to the unsuccessful retry and there is a problem of deterioration of processing performance. A similar problem of the read retry also occurs in a verify retry when an error occurs due to a verification because the erasure, writing, and verification are performed in the writing operation. The problem of the unsuccessful retry in the read retry and verify retry similarly occurs in not only the MSR medium which needs the reproducing magnetic field but also an ordinary MO medium.

SUMMARY OF THE INVENTION

Read Retry of the MSR Medium

According to the invention, an optical storing apparatus for reducing the occurrence of a read error of an MSR medium by devising a retrying process and a recording and reproducing method of an optical storage medium are provided.

First, the invention uses an MSR medium (optical storage medium) in which at least a recording layer to record data and a reproducing layer to reproduce the data recorded on the recording layer are formed on a substrate. A recording unit records data to the recording layer of the MSR medium at a recording density smaller than a beam diameter of a laser beam. A reproducing unit combines a reproducing magnetic field and a reproducing laser power which are necessary for reproduction and sets them to optimum values, thereby reproducing the data recorded on the recording layer of the MSR medium at the recording density smaller than the beam diameter. In addition, the invention is characterized in that a read retrying processing unit is provided and, at the time of a read retry when a read error occurs, a value of the reproducing magnetic field is changed and the reproducing operation is retried. As mentioned above, according to the invention, the value of the reproducing magnetic field is changed at the time of the read retry of the MSR medium and the read retry is performed by the changed reproducing magnetic field, thereby making the retry succeed and reducing a frequency of the occurrence of the read error due to the retry out.

The read retry processing unit changes the reproducing magnetic field at the time of the read retry in accordance with at least any one of each zone formatted in the MSR medium, each area obtained by dividing a recording area of the MSR medium into a plurality of areas, and a temperature in the apparatus. Since an intensity of the reproducing power or reproducing magnetic field that is optimum for reproduction of the MSR medium differs depending on each zone and each area of the medium and, further, the temperature in the apparatus at that time, by changing the reproducing power or reproducing magnetic field to the proper value in accordance with those conditions, the occurrence frequency of the read error is reduced. The read retry processing unit determines a test offset $\Delta Pr1$ or $\Delta H1$ of the optimum reproducing power or optimum reproducing magnetic field by a test read and changes it to the reproducing power ($Pr+\Delta Pr1+\Delta Pr2$) or reproducing magnetic field ($H+\Delta H1+\Delta H2$) obtained by adding the test offset $\Delta Pr1$ or $\Delta H1$ and a predetermined retry offset $\Delta Pr2$ or $\Delta H2$ to a predetermined default value Pr and H, respectively. As mentioned above, at the time of the read retry, after the optimum reproducing power or optimum reproducing magnetic field adapted to the use conditions at that time was determined by the test read, the optimum reproducing power or optimum reproducing magnetic field is changed to the value for retry and the data is read out again. Thus, the reproducing power or reproducing magnetic field can be changed to the optimum reproducing power or optimum reproducing magnetic field adapted to the change in actual use conditions. As the learning advances, the reading operation can be made successful by the retries of the small number of times.

According to the invention, there is provided a recording and reproducing method of an MSR medium, comprising:

a recording step of recording data to a recording layer of an MSR medium at a recording density smaller than a beam diameter of a laser beam by using the MSR medium (optical storage medium) in which at least a recording layer to record data and a reproducing layer to reproduce the data recorded on the recording layer are formed on a substrate;

a reproducing step of reproducing the data recorded on the recording layer of the MSR medium at the recording density smaller than the beam diameter by combining a reproducing magnetic field and a reproducing laser power which are necessary for reproduction and setting them to optimum values; and a read retry step of changing the value of the reproducing magnetic field and retrying the reproducing operation at the time of a read retry when a read error occurs in the reproducing step.

The details of the recording and reproducing method of the MSR medium are also substantially the same as those of the apparatus construction.

Statistic Updating of Read Parameters

According to the invention, there are provided optical storing apparatus and method in which in a read retry or a verify retry which is executed while changing the setting of parameters, parameter set information when the retry is successful is stored as statistic information, the updating of the optimum parameters by a learning process of the statistic information is performed, and conditions of the retry success are reflected, thereby reducing the occurrence of the read error.

The optical storing apparatus of the invention comprises: a recording unit for recording data onto the optical storage medium by a laser beam; and a reproducing unit for reproducing the data recorded on the optical storage medium by setting parameters necessary for reproduction to optimum values. As for the optical storing apparatus, the invention is characterized in that a read retry processing unit (retry processing unit) is further provided, the read retry is repeated while changing the setting of the parameter set values at the time of the read retry when a read error occurs in the reproducing unit, the parameter set values are stored as statistic information when the retry succeeds, and the parameter set values are updated by the learning process based on the statistic information. The parameter set values are usually values in which the test offsets obtained when the optimum parameters are determined by the testing process were added to the defaults. As mentioned above, according to the optical storing apparatus of the invention, when the read retry succeeds, the parameter set values at the time of success are stored as statistic information, the optimum parameters are automatically updated by the learning process of the statistic information, the conditions of the retry success are reflected to the optimum parameters, and the number of times of read retry until the success thereof is reduced, thereby raising a success ratio, reducing a frequency of occurrence of the read error due to a failure of the retry (retry out), and improving the stability of the reading operation.

Further, at the time of the verify retry when the read error occurs in the recording unit due to the verification, the read retry processing unit similarly repeats the verify retry while changing the setting of the parameter set values, stores the parameter set values as statistic information at the time of the retry success, and updates the parameter set values by the learning process based on the statistic information. Thus, the number of times of verify retry until the success thereof when the read error occurs due to the verification subsequent to the erasure and writing in the writing operation is reduced and the frequency of occurrence of the read error due to the retry failure is decreased, thereby improving the stability of the writing operation. In the case where the MSR medium (Magnetically induced Super Resolution medium) in which data is recorded at a recording density smaller than the beam diameter of the laser beam is used as an optical storage medium, in the optical storing apparatus of the invention, a reproducing magnetic field H, a reading power Pr, a cut-off frequency Fc and a boost Fb of a low pass filter, a slice level S of a slicing circuit, a window value (window delay time) W of a data discriminator, and a focusing offset FCO are set as parameters for reproduction, and at the time of the read retry, the read retry is repeated while sequentially switching a plurality of kinds of parameters and changing the setting thereof. In case of using a magnetooptic medium such as an MO medium in which data is recorded at a recording density depending on the beam system of the laser beam as an optical storage medium, according to the optical storing apparatus of the invention, the reading power Pr, cut-off frequency Fc and boost Fb of the low pass filter, slice level S of the slicing circuit, window value (window delay time) W of the data discriminator, and focusing offset FCO excluding the reproducing magnetic field H peculiar to the MRS medium are set as parameters for reproduction. At the time of the read retry, the read retry is repeated while sequentially switching a plurality of kinds of parameters and changing the setting thereof. At the time of the read retry, the read retry processing unit performs the read retry while alternately (like a toggle) repeating the change of the setting of the parameters to add the retry offsets to the parameter set values and the change of the setting of the parameters to subtract the retry offsets from the parameter set values, and stores the parameter set values at the time of success and information indicating whether the retry offsets have been added or subtracted as statistic information. For example, at the first time of the retry, the retry offsets are added to the parameter set values (=default+test offsets) at that time. In the second retry in which the retry fails, the retry offsets are subtracted from the parameter set values (=default+test offsets). Thus, the setting of the parameters is changed in a range in which a change amount on the plus side and that on the minus side around the parameter set values as centers are almost equal, an opportunity of retry success is enhanced, and the retry is made successful by the retries of the small number of times, thereby raising a success ratio. Since the setting of the parameters is changed almost equally in the plus and minus directions around the default as a center, a situation such that the number of times of retry due to the change in parameters increases and the parameters are rapidly away from the default and reach limit values can be avoided. Upon updating of the parameter set values based on the statistic information, when an absolute value of the sum of the number of times of addition of the retry offsets which succeeded and the number of times of subtraction of the retry offsets which succeeded is equal to or larger than a predetermined threshold value on the basis of the statistic information, the test offsets which are added to the default are updated so that the parameters are close to the parameter set values which made the retry successful. For example, the test offsets which are added to the default are increased or decreased by only the half of the retry offsets which made the retry successful, thereby updating the optimum parameters. As mentioned above, the statistic information of the parameter set values which made the retry successful is learned and the parameters which are used in the ordinary reading or verification are updated in accordance with a statistic tendency of the parameters which make the retry successful, so that errors in the subsequent reading or verification can be reduced.

The retry processing unit changes the parameter set values in accordance with at least any one of each zone which has been formatted onto the optical storage medium, each area obtained by dividing a recording area of the optical storage medium into a plurality of areas, and a temperature in the apparatus. Therefore, the retry processing unit prepares the parameter set values (default+test offsets) and the retry offsets which are used to change the setting of the parameters in accordance with each zone formatted onto the optical storage medium, each area obtained by dividing a recording area of the optical storage medium into a plurality of areas, and the temperature in the apparatus and changes the setting of the parameters by adding the retry offsets to the corresponding parameter set values on the basis of the zone and area and the temperature in the apparatus at the time of retry. Thus, the setting change of the parameters at the time of retry can be optimized in accordance with the zone and area of the optical storage medium and the temperature in the apparatus and the retry success ratio can be improved.

The optical storing apparatus of the invention further has a test processing unit for deciding test offsets which are added to the default that gives the optimum parameter set values by a test read and performing the next test read when the elapsed time from the test reading timing reaches a predetermined time or when a temperature change exceeding a predetermined value in which the apparatus temperature at the time of test read is set to a reference temperature occurs. In this case, when the parameters are updated on the basis of the statistic information in which the parameter set information of the retry success has been stored, the read retry processing unit initializes the elapsed time of the test processing unit, updates the reference temperature to the temperature in the apparatus at the time of the retry success, and allows the next test read to be discriminated. Thus, the process to update the parameters which are used in the ordinary reading or verification on the basis of the parameter set values obtained by the success of the read retry or the write retry is regarded as a process similar to the testing process to decide the optimum parameters in the test processing unit. Since the retry is assembled into a part of the testing process, a frequency of occurrence of the testing process which is executed by interrupting the access to the medium is reduced and the whole access performance is improved.

In the optical storing apparatus of the invention, in the read retry processing unit, when the verify retry is finished unsuccessfully, the writing operation of the erasure, writing, and verification is repeated by the write retry processing unit while changing the setting of the writing power to record data onto the optical storage medium. As mentioned above, even if the read retry is finished unsuccessfully, by further repeating the write retry while changing the writing power, a success ratio of the retry can be further improved. In this instance, at the time of the write retry, the retry processing unit repeats the write retry while alternately performing the change of the setting of the parameters to add the retry offsets to the set value of the writing power and the change of the setting of the parameters to subtract the retry offset from the writing power set value. When the write retry is finished successfully, the retry processing unit stores the successful writing power set value and information indicating whether the retry offsets have been added or subtracted as a learning result. When an absolute value of the sum of the number of times of addition of the successful retry offsets in the learning result and the number of times of subtraction of the successful retry offsets is equal to or larger than a predetermined threshold value, the retry processing unit updates the writing power set value so as to approach the latest writing power set value by which the retry succeeded. Upon write retry, the retry processing unit changes the writing power in accordance with at least any one of each zone formatted onto the optical storage medium, each area obtained by dividing the recording area of the optical storage medium into a plurality of areas, and the temperature in the apparatus.

Reflection of the Successful Retry

According to the invention, there is provided an optical storing apparatus in which information of the successful read retry is stored as statistic information and, at the time of the next read retry, conditions of the read retry of a high success ratio are extracted from the statistic information, thereby improving a retry success ratio.

The optical storing apparatus of the invention comprises: a recording unit for recording data onto an optical storage medium by a laser beam; and a reproducing unit for reproducing the data recorded on the optical storage medium by setting parameters which are necessary for reproduction to optimum values. The invention is characterized in that a retry processing unit is further provided and at the time of the read retry when a read error occurs in the reproducing unit, the retry processing unit performs a read retry of a high success ratio on the basis of past successful retry information and stores the successful retry information at the time of the retry success. Since the successful retry information is reflected to the next read retry as mentioned above, a success ratio of the retry which is executed while changing the setting by switching a plurality of kinds of parameters is remarkably raised, and the number of times of retry until it succeeds decreases and a retry execution time is reduced as compared with those of the retry which is performed while sequentially switching a plurality of kinds of parameters and changing the setting thereof in accordance with a fixed predetermined order.

At the time of a verify retry when a read error occurs in the recording unit due to the verification, the retry processing unit further performs the read retry on the basis of past successful retry information and stores the successful retry information at the time of the retry success. With respect to the retry for the read error in the verification subsequent to the erasure and writing of the writing operation as mentioned above as well, the number of times of retry until the retry success is similarly decreased and the retry execution time is reduced. The retry processing unit executes the retry while switching a plurality of kinds of parameters and changing the setting thereof, and the successful parameter set values are stored as statistic information. At the time of the new read retry, the retry processing unit starts the read retry from the previous successful parameter set values, and the successful parameter set values when the retry succeeds are stored. Thus, the previous successful specific parameter set values are used in the next retry and, unless the retry conditions are changed like a reading of the continuous sectors, the retry can be succeeded by one retry. The retry processing unit executes the retry while switching a plurality of kinds of parameters and changing the setting thereof, and the successful parameter set values and the number of times of success for every parameter are stored as statistic information. At the time of the new read retry, the parameter set values are sequentially selected in accordance with the order from the large number of times of success in the statistic information, and the read retry is repeated. As mentioned above, since the number of times of past success has been stored as statistic information with respect to each parameter, at the time of the new retry, the specific parameter set values of the highest success ratio are selected and the retry is executed. The number of times of retry until the success is reduced and the retry execution time is decreased.

In the optical storing apparatus of the invention, when the MSR medium (Magnetically induced Super Resolution medium) in which data is recorded at a recording density smaller than that of the beam system of the laser beam is used as an optical storage medium, the retry is executed while switching a reproducing magnetic field, a reading power, a cut-off frequency and a boost of a low pass filter, a slice level of a slicing circuit, a window value (window delay time) of a data discriminator, and a focusing offset as parameters and changing the setting thereof. When a magnetooptic medium such as an MO medium or the like in which data is recorded at a recording density depending on the beam system of the laser beam is used as an optical storage medium, the retry is executed while switching the reading power, the cut-off frequency and boost of the low pass filter, the slice level of the slicing circuit, the window value (window delay time) of the data discriminator, and the focusing offset as parameters excluding the reproducing magnetic field that is peculiar to the MSR medium and changing the setting thereof. At the time of the read retry, the retry processing unit alternately repeats the setting change of the parameters to add the retry offsets to the parameter set values and the setting change of the parameters to subtract the retry offsets from the parameter set values. The retry processing unit stores the statistic information of the parameter setting in the successful retry in accordance with any one of the temperature in the apparatus, each zone formatted onto the medium, the kind of optical storage medium, and the seek distance. As for various parameters which are used to retry, since the retry success ratio differs depending on the condition of the temperature in the apparatus, the medium zone, the kind of optical storage medium, or the seek distance, by selectively using the parameters in accordance with each condition, the retry success ratio can be further improved. As for the temperature in the apparatus, for example, there is a case where although the retry succeeds at 40° C. by the retry in which the set reading power is changed, when the temperature rises to 50° C., the retry succeeds by the retry in which the set focusing offset is changed. Therefore, the successful parameter set values and the number of times of success are separately stored every apparatus temperature and, at the time of retry, the retry of the parameters of a high success ratio is selected from the statistic information corresponding to the apparatus temperature and is executed. With respect to the medium zone, since a recording frequency differs every zone, a possibility that the retry which succeeds in the innermost rim is proper in the outermost rim is small. Therefore, the statistic information of the successful retry is stored every zone, and at the time of retry, the parameter information of a high success ratio is selected from the statistic information corresponding to the present zone and the retry is executed. As for the medium kind, for example, there are a 128 MB medium, a 230 MB medium, a 540 MB medium, and a 640 MB medium as MO media. The 128 MB medium and 230 MB medium are based on the PPM recording. The 540 MB medium and 640 MB medium are based on the PWM recording. Further, there is an MSB medium of 1.3 GB. As mentioned above, since the recording and reproducing method differs when the medium kind differs, the statistic information of the successful retry is stored every medium, the parameter information of a high success ratio is selected from the statistic information corresponding to the medium kind at the time of retry, and the retry is executed. Further, as for the read error occurring due to the sector positioning accompanied with the seeking operation, since the parameters of the successful retry differ depending on the seek distance, the statistic information of the successful retry is stored every seek distance. At the time of the retry of the new seek positioning, the parameter information of a high success ratio is selected from the statistic information corresponding to the seek distance at that time and the retry is executed.

The above and other objects, features, and advantages of the present invention will become more apparent from the following detailed description with reference to the drawings.

BRIEF DESCRIPTION OF THE DRAWINGS

FIGS. 3A and 3B are block diagrams of an optical disk drive according to the invention;

FIG. 5 is a functional block diagram of the first embodiment to execute a read retrying process of the MSR medium;

FIG. 6 is an explanatory diagram of a default table divided into zones;

FIG. 7 is an explanatory diagram of a table of a test read offset divided into the zones;

FIG. 8 is an explanatory diagram of a table in which a retry offset has been set every number of times of retry;

FIG. 9 is an explanatory diagram of a specific example of the table of FIG. 8;

FIG. 12 is an explanatory diagram of a default table divided into areas;

FIG. 13 is an explanatory diagram of a table of a test read offset divided into areas;

FIG. 14 is an explanatory diagram of a table of a test read offset divided on the basis of temperatures in an apparatus;

FIGS. 16A and 16B are functional block diagrams according to the second embodiment in which parameters are updated by the learning of statistical information of a successful read retry;

FIG. 17 is an explanatory diagram of a table in which defaults of various parameters divided into zones have been stored;

FIG. 18 is an explanatory diagram of a table in which test read offsets of various parameters divided into zones have been stored;

FIG. 19 is an explanatory diagram of a table in which retry offsets of various parameters divided into zones have been stored;

FIG. 21 is an explanatory diagram of a table in which defaults of various parameters divided into areas have been stored;

FIG. 22 is an explanatory diagram of a table in which test read offsets of various parameters divided into areas have been stored;

FIG. 23 is an explanatory diagram of a table in which retry offsets of various parameters divided into zones have been stored;

FIG. 24 is an explanatory diagram of a table in which defaults of various parameters divided on the basis of temperatures in the apparatus have been stored;

FIG. 25 is an explanatory diagram of a table in which test read offsets of various parameters divided on the basis of temperatures in the apparatus have been stored;

FIG. 26 is an explanatory diagram of a table in which retry offsets of various parameters divided on the basis of temperatures in the apparatus have been stored;

FIG. 34 is a flowchart for a read retry in which the setting of a focusing offset is changed;

FIGS. 38A and 38B are flowcharts for discrimination about the necessity of the testing process in FIGS. 36A and 36B;

FIG. 41 is an explanatory diagram of a table of a write retry offset to the number of times of write retry;

FIGS. 42A and 42B are functional block diagrams of the third embodiment for executing a read retry to which past successful retry information is reflected;

FIG. 43 is an explanatory diagram of a correspondence between retry sequences for an MSR medium as a target and retry offsets of parameters in which the setting is changed;

FIG. 44 is an explanatory diagram of a correspondence between retry sequences for an MO medium as a target and retry offsets of parameters in which the setting is changed;

FIG. 45 is an explanatory diagram of a history table in which parameter information of a retry success has been stored while dividing on the basis of temperatures in the apparatus;

FIG. 46 is an explanatory diagram of a history table in which parameter information of a retry success has been stored while dividing into zones;

FIG. 47 is an explanatory diagram of a history table in which parameter information of a retry success has been stored while dividing on the basis of medium capacities:

FIG. 48 is an explanatory diagram of a history table in which parameter information of a retry success has been stored while dividing on the basis of seek distances;

FIG. 49 is an explanatory diagram of a history table in which the number of times of retry success of each parameter has been stored while dividing on the basis of the temperatures in the apparatus;

FIG. 50 is an explanatory diagram of a history table in which the number of times of retry success of each parameter has been stored while dividing into zones;

FIG. 51 is an explanatory diagram of a history table in which the number of times of retry success of each parameter has been stored while dividing on the basis of the medium capacities;

FIG. 53 is a flowchart for a reading process including a verification retry to which the past successful retry information in FIGS. 42A and 42B is reflected.

DETAILED DESCRIPTION OF THE PREFERRED EMBODIMENTS

Apparatus Construction

Figure 1A:
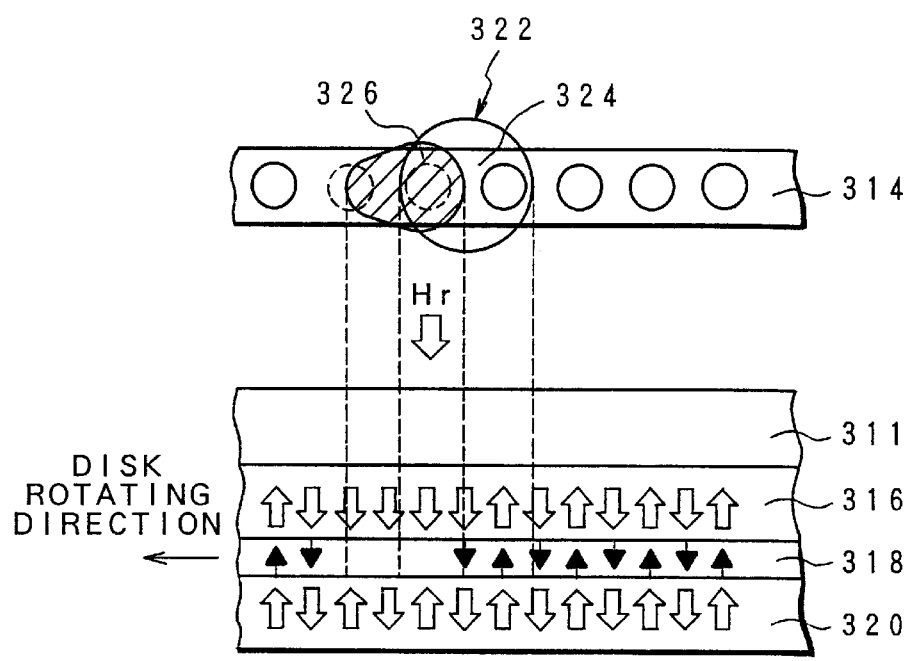
FIGS. 1A and 1B are explanatory diagrams of the FAD reproducing operation of an MSR medium.
Figure 1B:
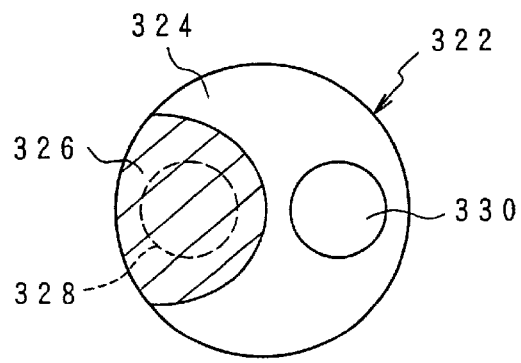
Figure 2A:
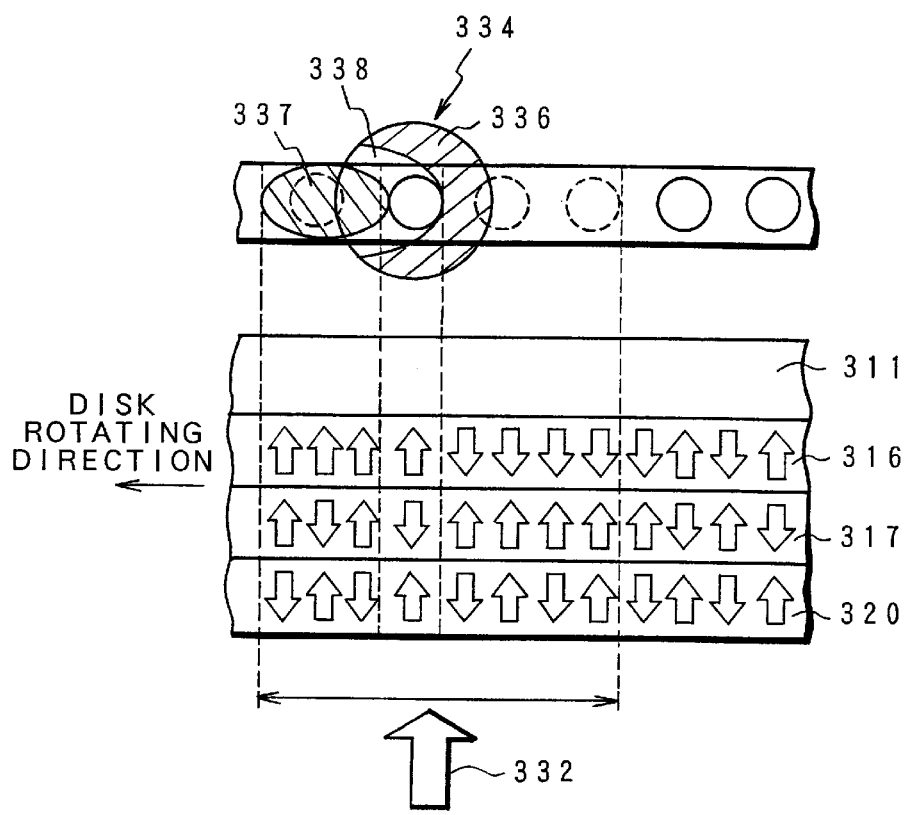
FIGS. 2A and 2B are explanatory diagrams of the double mask RAD reproducing operation of the MSR medium.
Figure 2B:
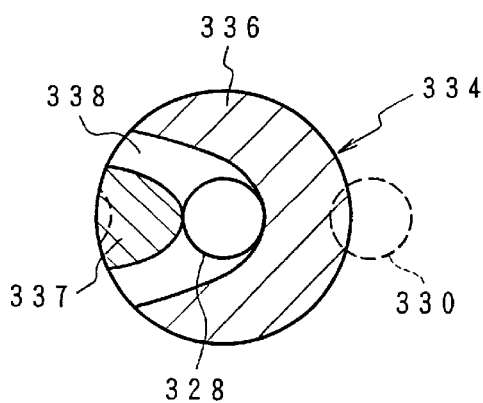
Figure 3B:
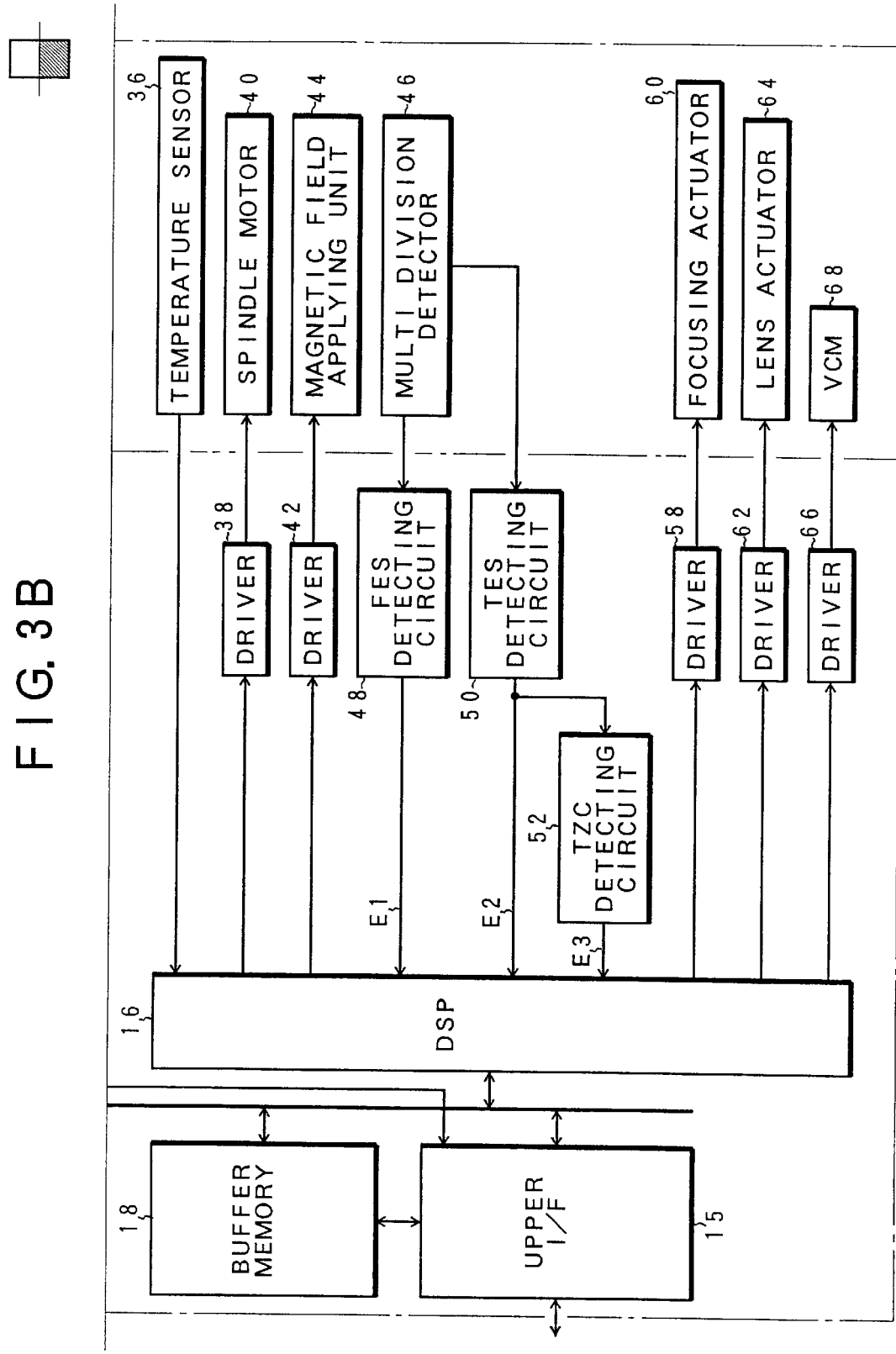

FIGS. 3A and 3B are circuit block diagrams of an optical disk drive as an optical storing apparatus of the invention. The optical disk drive of the invention comprises a control unit 10 and an enclosure 11. The control unit 10 has: an MPU 12 to control the whole optical disk drive; an interface 15 to transmit and receive commands and data to/from an upper apparatus; an optical disk controller (ODC) 14 to perform processes necessary for reading and writing data from/to an optical disk medium; a DSP 16; and a buffer memory 18. The buffer memory 18 is used in common by the MPU 12, optical disk controller 14, and upper interface 15. The optical disk controller 14 has a formatter and an ECC processing function. When a cartridge medium is inserted into the optical disk drive, the kind of medium is recognized by the MPU 12 and a recording and reproducing function according to the medium kind is set up by the optical disk controller 14 and DSP 16. The optical disk drive can cope with the MO media of 128 MB, 230 MB, 540 MB, and 640 MB and an MSR medium of 1.3 GB. A recording format of the cartridge medium is set to the zone CAV. Further, a recording system of the media of 128 MB and 230 MB is set to a pit position recording (PPM recording) in which data is recorded in correspondence to the presence or absence of a mark on the medium. A recording system of the MO media of 540 MB and 640 MB and the MSR medium of 1.3 GB is set to a pulse width recording (PWM recording) in which edges of the mark, namely, a front edge and a rear edge are allowed to correspond to the data. When an MO cartridge medium is loaded into the optical disk drive, an ID portion of the medium is first read, a kind of medium is recognized in the MPU 12 from a pit interval or the like, the kind is notified to the optical disk controller 14, DSP 16, a write LSI 20, and a read LSI 24, and a recording and reproducing function adapted to the medium is established. In the write access mode after the cartridge medium was inserted, the optical disk controller 14 divides NRZ write data on a sector unit basis of the medium by the formatter, forms a recording format, forms an ECC code on a sector write data unit basis by an ECC process, and adds it. If necessary, the optical disk controller 14 forms and adds a CRC code and, further, converts it into, for example, a 1–7 RLL code and outputs to the write LSI 20. The write LSI 20 has therein a write modulating circuit and a laser diode control circuit. A laser diode unit 30 has therein a laser diode and a detector for monitoring. The write LSI 20 converts sector write data from the optical disk controller 14 into PPM recording data or PWM recording data in accordance with the medium kind, supplies the converted data to the laser diode unit 30, and writes onto the medium by a write beam. As for the writing operation, the erasure, writing, and verification are performed in a state where the laser beam is positioned to an instructed sector on the medium. When a read error occurs upon verification, a verify retry is performed. In the invention, the verify retry is executed while switching various parameters necessary to read and changing the setting thereof. The read LSI 24 has therein a read demodulating circuit and a frequency synthesizer. A photosensing signal of the return light of the read beam by a detector 32 for ID/MO provided in the enclosure 11 is inputted as an ID signal and an MO signal to the read LSI 24 through a head amplifier 34. The read LSI 24 has therein an AGC circuit, a filter, and a demodulating circuit such as a data discriminator. The read LSI forms a read clock and read data by the inputted ID signal and MO signal and demodulates the original NRZ data from the PPM recording data or PWM recording data. Since the zone CAV is used as a control system of a spindle motor 40, a frequency dividing ratio to generate a clock frequency corresponding to the zone is set into the frequency synthesizer built in the read LSI 24 from the MPU 12. The frequency synthesizer is a PLL circuit having a programmable frequency divider and generates a reference clock having a predetermined peculiar frequency according to the zone position on the medium as a read clock. The read data demodulated by the read LSI 24 is supplied to the optical disk controller 14 and inversely converted into the 1–7 RLL code. After that, it is subjected to a CRC check and an ECC process, NRZ sector data is reconstructed, and is coupled to a stream of the NRZ read data by the formatter. After that, the resultant data is transferred to the upper apparatus via the buffer memory 18 by the upper interface 15. When a read error occurs by the read access, a read retry is performed. In the invention, the read retry is executed while switching various parameters necessary for reproduction and changing the setting thereof.

A detection signal of a temperature sensor 36 provided on the enclosure 11 side is supplied to the MPU 12 via the DSP 16. On the basis of an environmental temperature in the apparatus detected by the temperature sensor 36, the MPU 12 controls each of the light emitting powers for reading, writing, and erasing in a laser diode control unit 30 to an optimum value by a testing process in which the recording and reproduction are actually performed on the medium. The MPU 12 controls the spindle motor 40 provided on the enclosure 11 side by a driver 38 via the DSP 16. Since the recording format of the MO cartridge is set to the zone CAV, the spindle motor 40 is driven at a constant rotational speed. The MPU 12 controls a magnetic field applying unit 44 provided on the enclosure 11 side through a driver 42 from the DSP 16. The magnetic field applying unit 44 is arranged on the side opposite to the beam irradiating side of the MO cartridge loaded in the apparatus. As for the MO medium, an external magnetic field is supplied to the medium upon recording and erasure. With respect to the MSR medium, an external magnetic field is also supplied to the medium upon reproduction in addition to the recording and erasure. Although an electromagnet is usually used as a magnetic field applying unit 44, as another means, a permanent magnet in which an optimum magnetic field determined by a calibrating process of the invention is obtained can be used and, further, a combination of an electromagnet and a permanent magnet can be used. The external magnetic field upon reproduction of the MSR medium by the magnetic field applying unit 44 is a reproducing magnetic field Hr as for the FAD medium and is an initialization magnetic field Hi as for the RAD medium. Further, as for the external magnetic field by the magnetic field applying unit 44 upon reproduction, in the invention, for example, a reproducing magnetic field and a reading power as parameters necessary for reproduction of the MSR medium are determined to a set of optimum values by a testing process that is realized as a processing function of the MPU 14. The testing process is also performed with respect to parameters other than the reproducing magnetic field and reading power. The DSP 16 has a servo function to position the beam from the laser diode unit 30 to the medium and executes a seek control for seeking to a target track so as to enter an on-track state. The seek control can be simultaneously executed in parallel with the write access or read access in response to an upper command by the MPU 12. To realize the servo function of the DSP 16, a multi division detector 46 to receive the beam return light from the medium is provided for the optical unit on the enclosure 11 side. An FES detecting circuit (focusing error signal detecting circuit) 48 forms a focusing error signal E1 from a photosensing output of the multi division detector 46 and inputs it to the DSP 16. The multi division detector 46 to receive the beam return light from the medium is provided for the optical unit on the enclosure 11 side. A TES detecting circuit (tracking error signal detecting circuit) 50 forms a tracking error signal E2 from the photosensing output of the multi division detector 46 and inputs it to the DSP 16. The tracking error signal E2 is inputted to a TZC detecting circuit (track zero-cross point detecting circuit) 52, by which a track zero-cross pulse E3 is formed and inputted to the DSP 16. Further, the DSP 16 drives and controls a focusing actuator 60, a lens actuator 64, and a VCM 68 via drivers 58, 62, and 66 in order to control the position of the beam spot on the medium.

Figure 4:
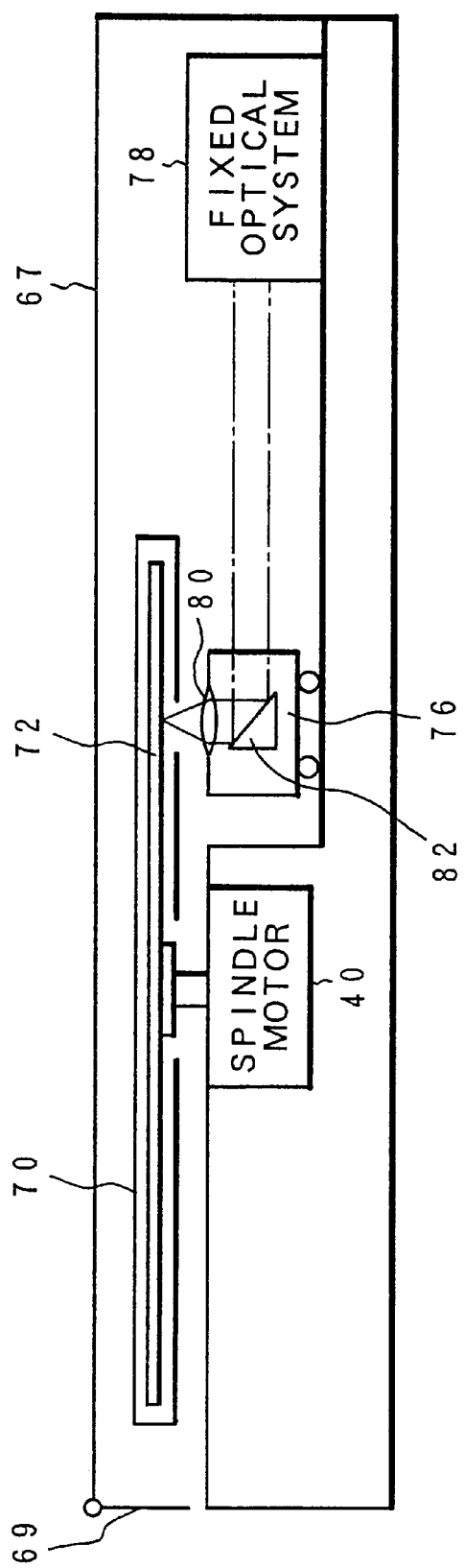
FIG. 4 is an explanatory diagram of an internal structure of an apparatus in which an MO cartridge has been loaded.

An outline of the enclosure 11 is as shown in FIG. 4. The spindle motor 40 is provided in a housing 67. A loading such that by inserting an MO cartridge 70 from an inlet door 69 side to a hub of a rotary shaft of the spindle motor 40, an internal MO medium 72 is attached to the hub of the rotary shaft of the spindle motor 40 is performed. A carriage 76 which is movable in the direction which traverses the medium tracks by the VCM 68 is provided under the MO medium 72 of the loaded MO cartridge 70. An objective lens 80 is mounted on the carriage 76. The beam from the laser diode provided in a fixed optical system 78 is inputted into the objective lens through a prism 82, so that a beam spot is formed as an image onto the medium surface of the MO medium 72. The objective lens 80 is moved in the optical axial direction by the focusing actuator 60 provided in the enclosure 11 in FIGS. 3A and 3B. The objective lens can be moved by the lens actuator 64 within a range of, for example, tens of tracks in the radial direction which traverses the medium tracks. Although FIGS. 3A and 3B show an example of the double driving type having the lens actuator 64 and VCM 68 as an optical pickup, a single driving type of only the VCM 68 without the lens actuator 64 is also included.

Read Retry of the MSR Medium

FIG. 5 is a functional block diagram of the first embodiment of the invention to perform a read retrying process of an MSR medium. The function for the read retrying process is realized by the MPU 12, optical disk controller 14, DSP 16, write LSI 20, and read LSI 24 in FIGS. 3A and 3B. A read processing unit 84 to read the MSR medium is provided and a read retry processing unit 86 is provided for the purpose of the read retry for an error at the time of the reading operation. A default table 88, a test read offset table 90, and a retry offset table 92 which are used to control the reproducing magnetic field and the reading power to optimum values are provided for read processing unit 84 and read retry processing unit 86. Further, a group of registers 94 to control and instruct the reading operation and retry operation are provided. A read instruction, a write instruction, a retry instruction, a medium kind, a temperature (T) in the apparatus, a track number TK, a sector number SS, and a zone number Zi are stored if necessary in the registers 94. The read processing unit 84 stores a set value of the reproducing magnetic field into a register 96, stores a set value of the reading power into a register 98, and converts those set values into analog control signals by D/A converters 104 and 106. By supplying a driving current to the electromagnet of the magnetic field applying unit 44 through the driver 42 in FIGS. 3A and 3B, a reproducing magnetic field is generated. By supplying a light emission current to the laser diode of the laser diode unit 30, a laser beam of the set reading power is generated.

For example, like a zone division default table 88-1 in FIG. 6, default values H1 to H18 of the reproducing magnetic field and default values Pr1 to Pr18 of the reading power are separately stored in the default table 88 with respect to 18 zones of Z01 to Z18 of the MSR medium. Like a zone division test read offset table 90-1 in FIG. 7, test offsets ΔH11 to ΔH118 which are added to the default obtained by the test read in the read retry until the previous read retry are separately stored in the test read offset table 90 with respect to the zones Z01 to Z18 of the MSR medium. Further, for example, like a number of times division retry offset table 92-1 in FIG. 8, retry offsets ΔH21 to ΔH2n are separately stored in the retry offset table 92 with respect to the number (n) of times of retry. As such a retry offset table, specifically speaking, a number of times division retry offset table 92-2 as shown in FIG. 9 is used. With respect to each of the numbers (1 to 7) of times of read retry, an increase ratio (percentage expression) for the default at that time is stored as a retry offset ΔH in the number of times division retry offset table 92-2. For example, the retry offset ΔH2 of +10% is stored for the first time of the read retry. Similarly, −10% is stored for the second time, +20% is stored for the third time, 20% is stored for the fourth time, +30% is stored for the fifth time, −30% is stored for the sixth time, and +40% is stored for the seventh time, respectively.

In the ordinary reading operation, the read processing unit 84 in FIG. 5 reads out the default Hi of the reproducing magnetic field corresponding to the zone Zi to be accessed from the zone division default table 88-1 in FIG. 6 and, at the same time, reads out a test read offset ΔH1i of the same zone Zi from the zone division test read offset table 90-1 in FIG. 7. As a reproducing magnetic field H, $$H=Hi+\Delta H1i$$

is obtained and set into the register 96. The optimum reproducing magnetic field is extracted. When a read error occurs in the reading operation due to the optimum reproducing magnetic field and reading power by the read processing unit 84, the read retry processing unit 86 is activated. In the read retry of the first time, for example, the read retry processing unit 86 reads out the retry offset ΔH2 of +10% for the default in the number of times division retry offset table 92-2 in FIG. 9, obtains a reproducing magnetic field $$H=Hi+\Delta H1i+\Delta H2i$$

by adding the default Hi of the reproducing magnetic field and the test read offset ΔH1i to the retry offset ΔH2, and performs the test read. The test read is a process in which the writing operation and the reading operation of test data are executed for a predetermined test track in a certain area on the MSR medium, for example, a zone which is at present being accessed while changing the reading power and the reproducing magnetic field, CNR characteristics (carrier to noise ratio characteristics) and characteristics of the number of times of bit dissidence are measured, and the optimum reading power and the optimum reproducing magnetic field are obtained so that an error rate satisfies the set values. By such a test read, the optimum reproducing magnetic field and the optimum reading power are determined. The optimum reproducing magnetic field by the test read finally denotes that the optimum test read offset ΔH1i is determined because the default Hi and retry offset ΔH2i are set to fixed values. When the test read offset ΔH1i which gives the optimum reproducing magnetic field can be determined as mentioned above, by using the optimum values of the reproducing magnetic field and reading power obtained in the test read, the read retry is executed with respect to the sector in which the read error occurs. If a read error occurs and the retry fails even by executing the retry of the first time, −10% for the default as a retry offset ΔH2 of the read retry of the second time in FIG. 9 is selected. The test read offset ΔH1i which gives the optimum reproducing magnetic field is similarly determined by the test read. The optimum reproducing magnetic field and the optimum reading power are determined by the test read. After that, the laser beam is positioned to the sector in which the read error occurred, and the read retry of the second time is executed. In this manner, the read retry is repeated up to seven times is repeated in case of FIG. 9.

Figure 10:
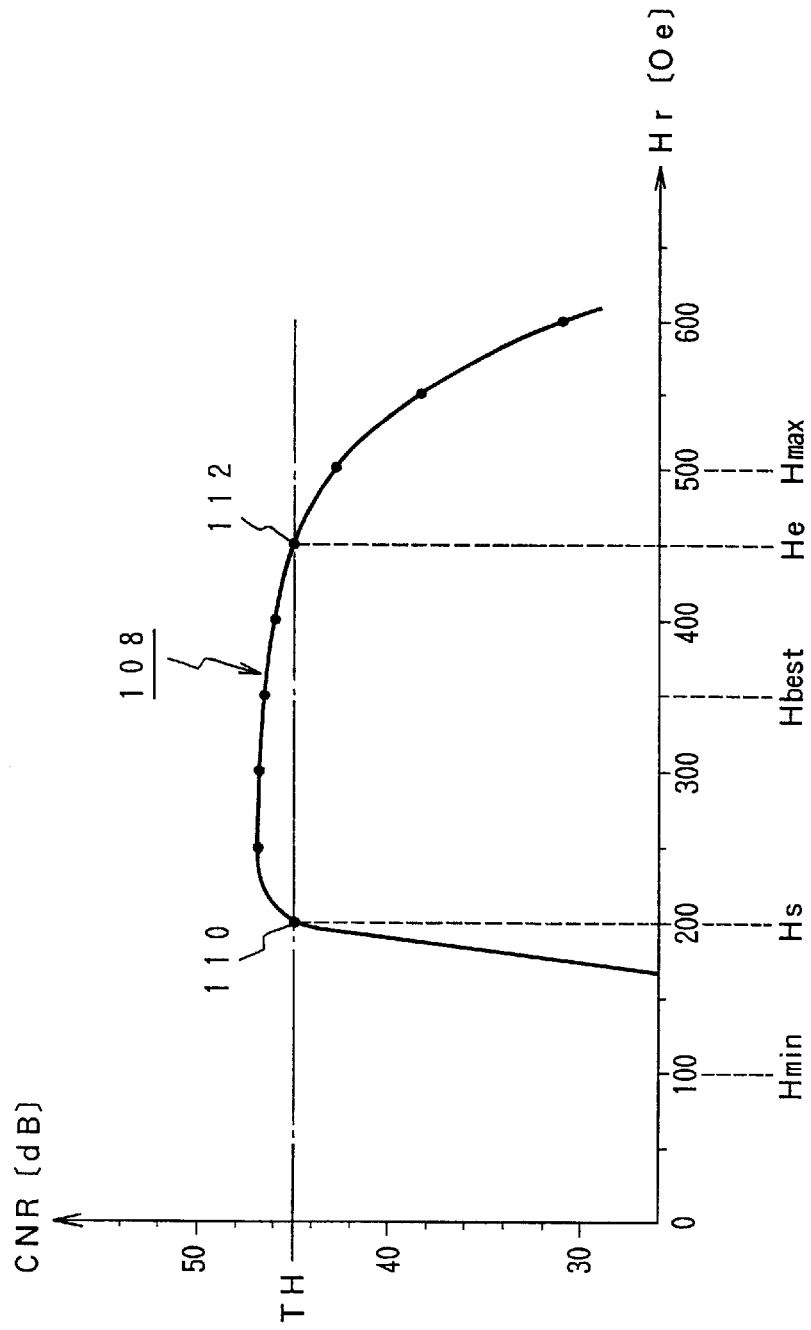
FIG. 10 is an explanatory diagram of a calculating process of a reproducing magnetic field optimum value based on NCR characteristics by a test reading.

FIG. 10 shows an example of the calculating process of the optimum reproducing magnetic field in the test read which is executed by the read retry processing unit 86 in FIG. 5. In FIG. 10, an axis of abscissa denotes a reproducing magnetic field Hr [Oe: oersteds] and an axis of ordinate indicates a carrier to noise ratio (CNR) of the read data. The reproducing magnetic field of the MSR medium is changed in a range, for example, from the minimum value Hmin=100 oersteds to the maximum value Hmax=500 oersteds. A characteristics curve 108 is obtained by such a change in reproducing magnetic field. Reproducing magnetic fields Hs=200 oersteds and He=450 oersteds at cross points 110 and 112 where the CNR is equal to a predetermined threshold value TH=47.5 dB are obtained. As an optimum magnetic field Hbest, for example, $$Hbest=Hs+(He-Hs)/2$$

is obtained.

Figure 11:
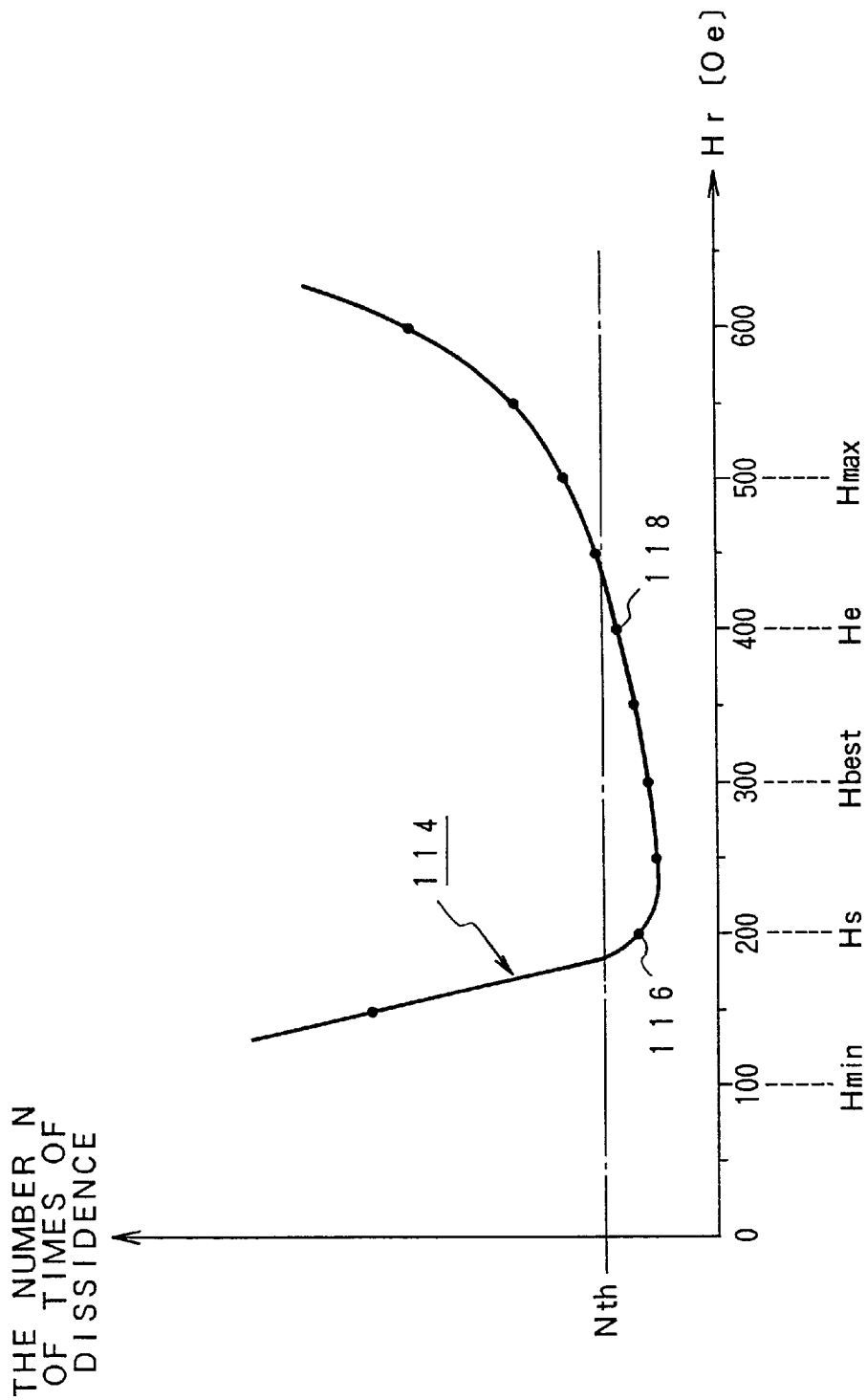
FIG. 11 is an explanatory diagram of a calculating process of a reproducing magnetic field optimum value based on characteristics of the number of times of bit dissidence by a test reading.

FIG. 11 shows another calculating process of the optimum reproducing magnetic field which is obtained by the test read at the time of retry. In this case, the optimum value of the reproducing magnetic field is determined on the basis of the characteristics of the number (N) of times of dissidence of the reproduction data. That is, as shown on the axis of abscissa, when the number (N) of times of bit dissidence of the read data is obtained by performing the test read while changing the reproducing magnetic field from the minimum value Hmin=100 oersteds of the reproducing magnetic field to the maximum value Hmax=500 oersteds, for example, a characteristics curve 114 is obtained. Since this measurement is discretely performed, for example, on a unit basis of 50 oersteds, a magnetic field at a measuring point 116 on the Hmin side where the number (N) of times of bit dissidence is equal to or less than a predetermined threshold value Nth is obtained as Hs. A magnetic field at a measuring point 118 on the Hmax side is obtained as He. Similarly, the optimum magnetic field Hbest is calculated as $$Hbest=Hs+(He-Hs)/2$$

FIG. 12 shows another embodiment of the default table which is used in the read retrying process in FIG. 5. Default values of the reproducing magnetic field and reading power are stored as an area division default table 88-2 divided into areas A1 to A6 in which 18 zones of Z1 to Z18 of the MSR medium are grouped, for example, every three zones.

FIG. 13 is an area division test read offset table 90-2 corresponding to the area division default table 88-2 in FIG. 12. Similarly, test read offsets which are added to the default obtained by the test read are separately stored in the areas A1 to A6 of a 3-zone unit of the MSR medium. With respect to the case of using the area division default table 88-2 and test read offset table 90-2 shown in FIGS. 12 and 13 as well, the read retry in which the set value of the reproducing magnetic field using the number of times division retry offset table 92-1 or 92-2 in FIG. 8 or 9 was changed can be executed in substantially the same manner.

FIG. 14 shows another embodiment of the test read offset table 90 which is used in the read retry of FIG. 5. This embodiment is characterized in that a temperature division test read offset table 90-3 is used. That is, since the optimum reproducing magnetic field necessary for reproduction of the MSR medium differs depending on the temperature T in the apparatus, if the optimum test read offset ΔH1i is obtained in the test read of the read retry, the optimum test read offset obtained by the test read is separately stored in the table depending on the temperature T in the apparatus at that time. Thus, when the read retry is performed in FIG. 5, with reference to the temperature division retry offset table 92 in FIG. 14 on the basis of the temperature T in the apparatus set in the registers 94, the test read offset ΔH1i corresponding to the temperature in the apparatus at that time is read out. The reproducing magnetic field of the test read is obtained from the zone division default table 88-1 in FIG. 6 and the number of times division retry offset table 92-1 or 92-2 in FIG. 8 or 9. The test read is performed and the optimum test read offset is obtained. After that, the laser beam is positioned to the sector where the retry occurred and the read retry is performed.

Figure 15:
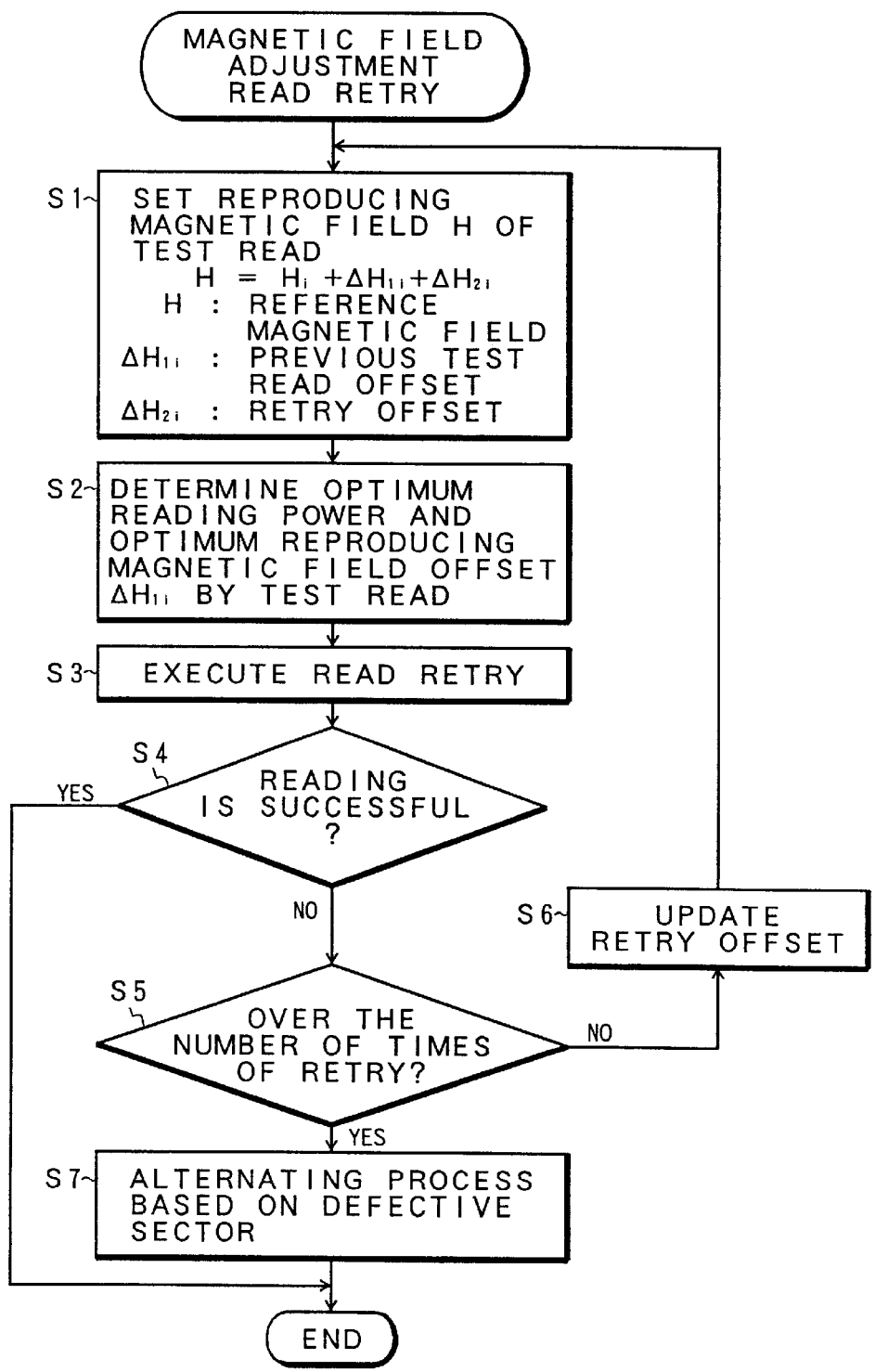
FIG. 15 is a flowchart of a read retrying process of a magnetic field adjustment according to the first embodiment of FIG. 5.

FIG. 15 is a flowchart for the read retrying process in the first embodiment of FIG. 5. First in step S1, the reproducing magnetic field Hi which is used in the test read of the zone Zi to execute the read retry is obtained by adding the default magnetic field Hi of the default table 88, the previous test read offset ΔH1i from the test read offset table 90, and the retry offset ΔH2i of the first time of the retry offset table 92. In step S2, the test read offset ΔH1i which gives the optimum reading power and the optimum reproducing magnetic field is determined by the test read. Subsequently, in step S3, the laser beam is positioned to the sector where the read error occurred and the read retry is executed by the optimum reading power and the optimum reproducing magnetic field which were determined in step S2. When it is determined in step S4 that the reading operation is successfully performed by the execution of the read retry, the read retrying process is finished. When the reading operation fails, a check is made in step S5 to see if the number of times of read retry is larger than a predetermined number, for example, 7. If NO, the retry offset is updated to the second retry offset in step S6. The processing routine is returned again to step S1. A reproducing magnetic field for the second retry test read is set. The optimum reading power and the optimum reproducing magnetic field are decided in step S2. In step S3, the second read retry is executed subsequently to the sector where the read error occurred. By the read retry which is executed while changing the reproducing magnetic field as mentioned above, so long as an unrecoverable factor such as a medium defect or the like does not exist in the sector on the access destination side, the reading operation is successful by performing the read retry of an arbitrary number of times of retry. If there is a medium defect in the access sector, the number of times of retry exceeds, for example, 7 in step S5. In this case, an alternating process based on the defective sector is performed in step S7.

Statistical Updating of Read Parameters

FIGS. 16A and 16B are functional block diagrams of the second embodiment of the retrying process in the optical storing apparatus of the invention. The second embodiment is characterized by the following points. The read retry or verify retry is executed while switching various parameters which are used in the reading operation and changing the setting of them. When the retry is successful, the successful parameter set information is stored as statistic information. When a degree of the change regarding the stored statistic information increases to a certain extent, the parameters are updated to the optimum values in accordance with the trend of the statistic information. By reflecting the conditions of the retry success to the parameters, a retry success ratio is raised.

In FIGS. 16A and 16B, a read processing unit 120 for the reading operation is provided and a read retry processing unit 122 for the read retry when a read error occurs in the read processing unit 120 is provided. A write processing unit 124 for the writing operation is provided. An erasure, a writing, and a verification are executed in the writing operation. A write retry processing unit 125 to perform the verify retry in correspondence to the read error occurring by the verification is provided. When the verify retry is unsuccessful, the write retry processing unit 125 executes the test write while changing a writing power. For this purpose, a test processing unit 126 for the test write is provided. Different from the read retry and verify retry, the test processing unit 126 determines the optimum values of the reproducing magnetic field and the laser power which are used in the reading operation and the writing operation by testing processes. When the medium is loaded, the first testing process is performed. After that, the next testing process is performed by monitoring the elapsed time from the start of the testing process and the fluctuation of the temperature in the apparatus. In order to set various parameters necessary for the reading operation, writing operation, and further, testing operation into the read processing unit 120, read retry processing unit 122, write processing unit 124, write retry processing unit 125, and test processing unit 126 as mentioned above, a default table 128, a test offset table 130, a retry offset table 132, and further, registers 135 to instruct various controls are provided. In the read retry processing unit 122 of the invention, there is provided a retry history table 134 to store the successful retry information, specifically speaking, the set information of the successful various parameters as statistic information when the read retry or verify retry succeeds. By learning the statistic information of the parameter set information obtained by the success of the read retry and the verify retry and stored in the retry history table 134, the read retry processing unit 122 updates the test offsets of the test offset table 130 so as to approach the set values which make the retry successful.

Registers 136 and 138 to set the set values of the reproducing magnetic field and reading power are provided for the read processing unit 120. Registers 140, 142, 144, 146, 148, 150, and 152 are provided for the read retry processing unit 122 and these registers set the reproducing magnetic field upon execution of the read retry, reading power, cut-off frequency, boost, slice level, window, and focusing offset as set parameters. In correspondence to the registers 140 to 152, D/A converters 154, 156, 158, 160, 162, 164, and 166 for converting the set data in the registers into analog control signals and controlling the corresponding parameters of the circuit units are provided. A register 168 to set a writing power and a register 170 to set an erasing power are provided for the write processing unit 124. A register 172 which is used to change the writing power in the test write after the verify retry failed is provided for the write retry processing unit 125. A D/A converter 174 is provided in correspondence to the writing power setting registers 168 and 172. A D/A converter 176 is provided in correspondence to the erasing power setting register 170.

FIG. 17 shows an embodiment of the default table 128 in FIGS. 16A and 16B and shows a zone division default table 128-1 in which defaults of various parameters which are set and changed while switching at the time of the read retry have been separately stored every zone of the MO medium or MSR medium. For example, a case of the MSR medium having 18 zones will now be considered. As parameters which are separately set and changed by switching at the time of the read retry with respect to the zones Z1 to Z18, the default values of the reproducing magnetic field, reading power, cut-off frequency, boost, window, and focusing offset are stored. Among the parameters which are set and changed by switching upon read retry, the cut-off frequency, boost, window, and focusing offset indicate circuit parameters of the circuits built in the read LSI 24 in FIGS. 3A and 3B and extracted and shown in FIG. 20.

Figure 20:
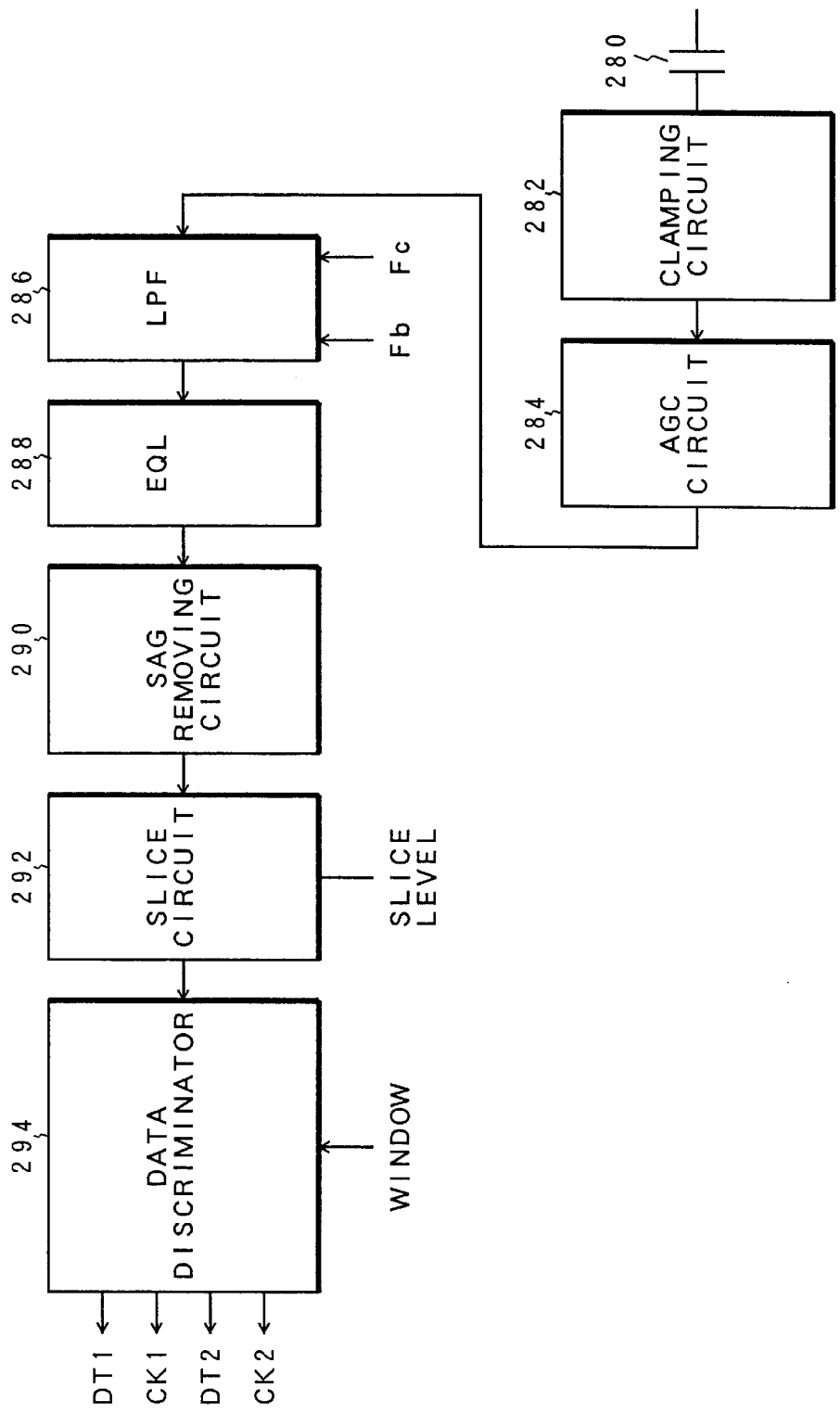
FIG. 20 is a circuit block diagram of a read LSI in which the setting of parameters is changed by retry offsets.

A demodulating circuit of the read LSI 24 in FIG. 20 has: a clamping circuit 282 whose input terminal is connected to a head amplifier through a capacitor 280; an AGC circuit 284; a low pass filter (LPF) 286; an equalizer (EQL) 288; an SAG removing circuit 290; a slice circuit 292; and a data discriminator 294. In the LPF 286, a cut-off frequency Fc and a boost Fb to decide a gain of a high band can be set and changed as circuit parameters from the outside in correspondence to a stored frequency. In the slice circuit 292, a slice level S of a read waveform of the demodulated PWM data can be set and changed as a circuit parameter. Further, in the data discriminator 294 functioning as a data separator, a delay time of the window that is set for data discrimination can be set and changed from the outside. The data discriminator 294 individually extracts data DT1 and DT2 and clocks CK1 and CK2 with respect to the leading edge and the trailing edge of the PWM pulse. They are synthesized in a circuit at a post stage of the data discriminator.

FIG. 18 shows an embodiment of the test offset table 130 in FIGS. 16A and 16B and shows a zone division test offset table 130-1 in a manner similar to FIG. 17. For example, when considering 18 zones of the MSR medium, test offsets obtained by the testing process to add them to the default parameters in FIG. 17, for example, test offsets $\Delta H11$ to $\Delta H118$ of the reproducing magnetic field are stored in correspondence to the zones Z1 to Z18.

FIG. 19 shows an embodiment of the retry offset table 132 in FIGS. 16A and 16B. In correspondence to each of the tables of the defaults and test offsets of the zone division in FIGS. 17 and 18, retry offsets regarding various parameters corresponding to the zones Z1 to Z18, for example, in the reproducing magnetic field, the retry offsets $\Delta H21$ to $\Delta H218$ are stored as a zone division retry offset table 132-1.

FIGS. 17, 18, and 19 show the examples of the default table, test offset table, and retry offset table of the zone division. However, as shown in FIGS. 21, 22, and 23, for example, it is also possible to use a default table 128-2, a test offset table 130-2, and a retry offset table 132-2 of an area division divided into areas A1 to A6 which were grouped every three zones.

Further, as shown in FIGS. 24, 25, and 26, it is also possible to use a default table 128-3, a test offset table 130-3, and a retry offset table 132-3 of a temperature division in which the temperature T in the apparatus is divided into temperature regions each corresponding to a range of, for instance, 10° C. within a range from 0 to 60° C. and the default test offsets and the retry offsets of various parameters are stored with respect to each temperature region.

Figure 27:
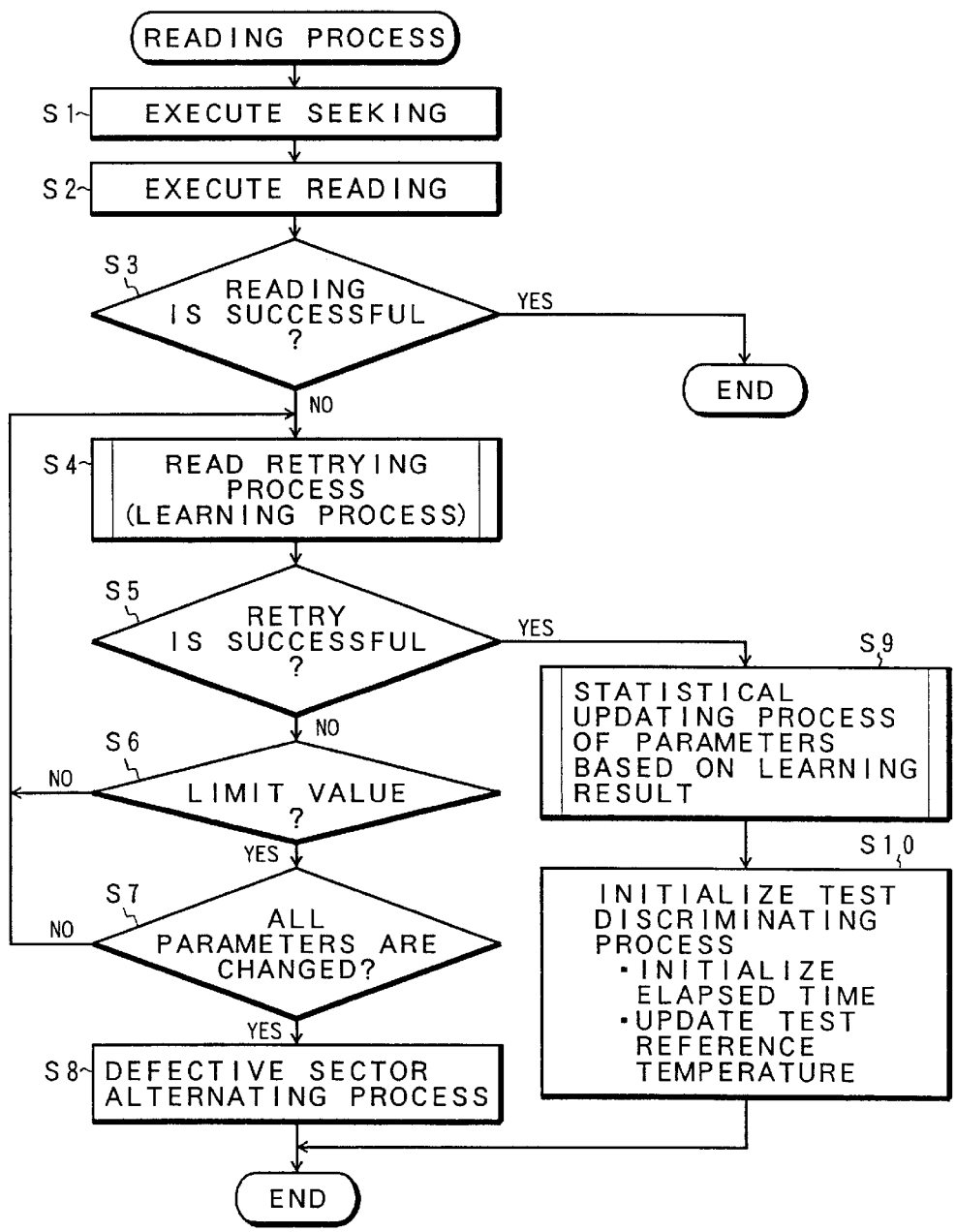
FIG. 27 is a flowchart for a reading process including a read retry according to the second embodiment of FIGS. 16A and 16B.

FIG. 27 is a flowchart for the reading process by the read processing unit 120 and read retry processing unit 122 in FIGS. 16A and 16B. When the read instruction, track number TK, sector number SS, and zone number Zi are set in each of the registers 135 in FIGS. 16A and 168, the seeking operation to position the laser beam to the target sector is executed in step S1. When the laser beam is positioned to the target sector, the reading operation is executed in step S2. When the reading operation is successfully performed in step S3, the reading process is finished. When the reading process is unsuccessful in step S3, the read retrying process is executed in step S4. In the read retrying process, for example, as shown in FIGS. 17, 18, and 19, the read retry is executed while switching the parameters such as reproducing magnetic field, reading power, cut-off frequency, boost, window, focusing offset, and the like and changing the setting thereof by using the default table 128-1, test offset table 130-1, and retry offset table 132-1 of the zone division. In this case, with respect to one parameter, for example, only one offset value is stored as shown in the zone division retry offset table 130-1 in FIG. 19. At the first time, the retry offset value is added to the parameter in which the test offset was added to the default. In the second retry, the retry offset value is subtracted from the parameter in which the test offset was added to the default. In this way, the retry by the setting change of the parameters in which it is alternately switched to the plus side and the minus side around the default as a center is executed. With respect to the read retry which is executed while switching various parameters and changing the setting thereof in step S4, if the retry is unsuccessful in step S5, a check is made in step S6 to see if the set value regarding the same parameter has changed to a predetermined limit value. If it reached the limit value, a check is made in step S7 to see if the retry by the setting change of all of the parameters has been finished. The read retry which is executed while switching the parameters and changing the setting thereof in step S4 is repeated until the setting change to the limit value with respect to each parameter and the setting change with regard to all of the parameters are finished. By such a read retry, if the retry success is decided in step S5, the processing routine advances to step S9. The parameter set information of the successful retry is stored as statistic information and the test offsets to be added to the defaults by learning the stored parameter set information are updated. In the parameter updating process based on the parameter set information of the successful retry, for example, since the parameters have been changed to the plus side and minus side in the read retrying process in step S4, the number of times of setting change in which the parameters of the successful retry were changed to the plus side or the minus side is respectively counted. When the absolute value of a difference between the number of times of success due to the change in the plus direction and that in the minus direction exceeds a predetermined threshold value, the parameters, namely, the test offsets are updated so as to approach the parameter set values of the latest retry success. Further, when the parameters are updated in step S9, the elapsed time (from the execution of the test) which is monitored in the test processing unit 126 in order to discriminate the necessity of the next test is initialized, and a test reference temperature to discriminate the necessity of the test by checking whether a predetermined temperature change has occurred or not while setting the temperature in the apparatus upon testing to a reference temperature is set to the temperature in the apparatus at the timing of the execution of the updating process of the parameters in step S10. Owing to the initialization of the elapsed time and the updating of the test reference temperature for the purpose of discriminating the necessity of the test in the test processing unit 126, the updating process of the parameters based on the success of the read retry is substantially regarded as updating of the optimum parameters by the testing process and reflected to the ordinary reading operation and writing operation.

Figure 28:
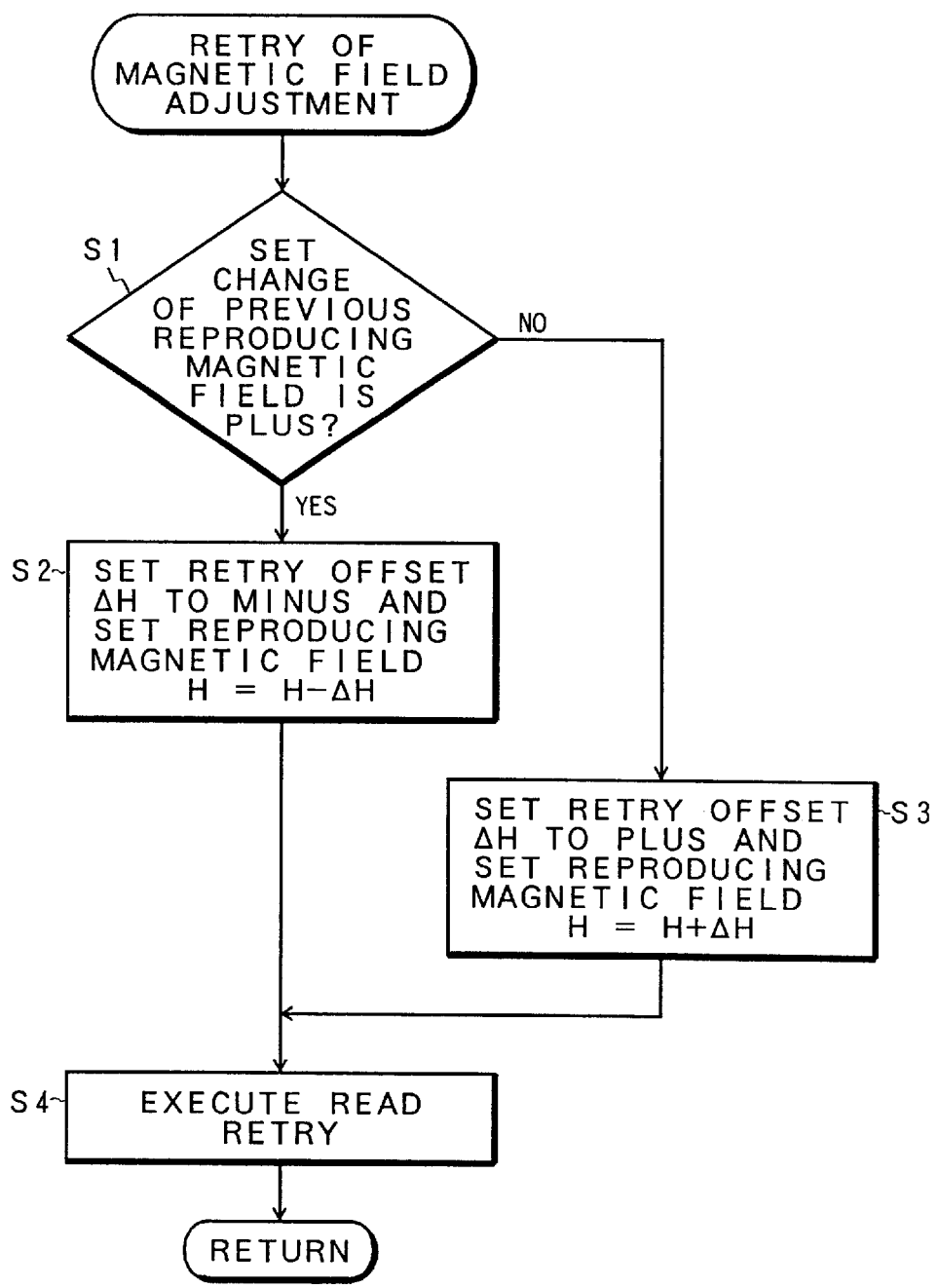
FIG. 28 is a flowchart for a read retry in which the setting of a reproducing magnetic field is changed.

FIG. 28 shows a specific example of the read retrying process in step S4 in FIG. 27 and shows the read retrying process in the case where the reproducing magnetic field is selected as a parameter. In the read retrying process which is performed while adjusting the reproducing magnetic field, a check is made in step S1 to see if the previous setting change of the reproducing magnetic field has been performed to the plus side. If YES, the retry offset ΔH is set to a minus value and the reproducing magnetic field which is used in the read retry is set in step S2. The reproducing magnetic field H has a value obtained by adding the test offset to the default. When the previous setting change of the reproducing magnetic field is performed to the minus side in step S1, the retry offset ΔH is set to a plus value and the reproducing magnetic field is set in step S3. In step S4, the read retry is executed with respect to the reproducing magnetic field obtained by the subtraction or addition of the retry offset ΔH in step S2 or S3.

Figure 29:
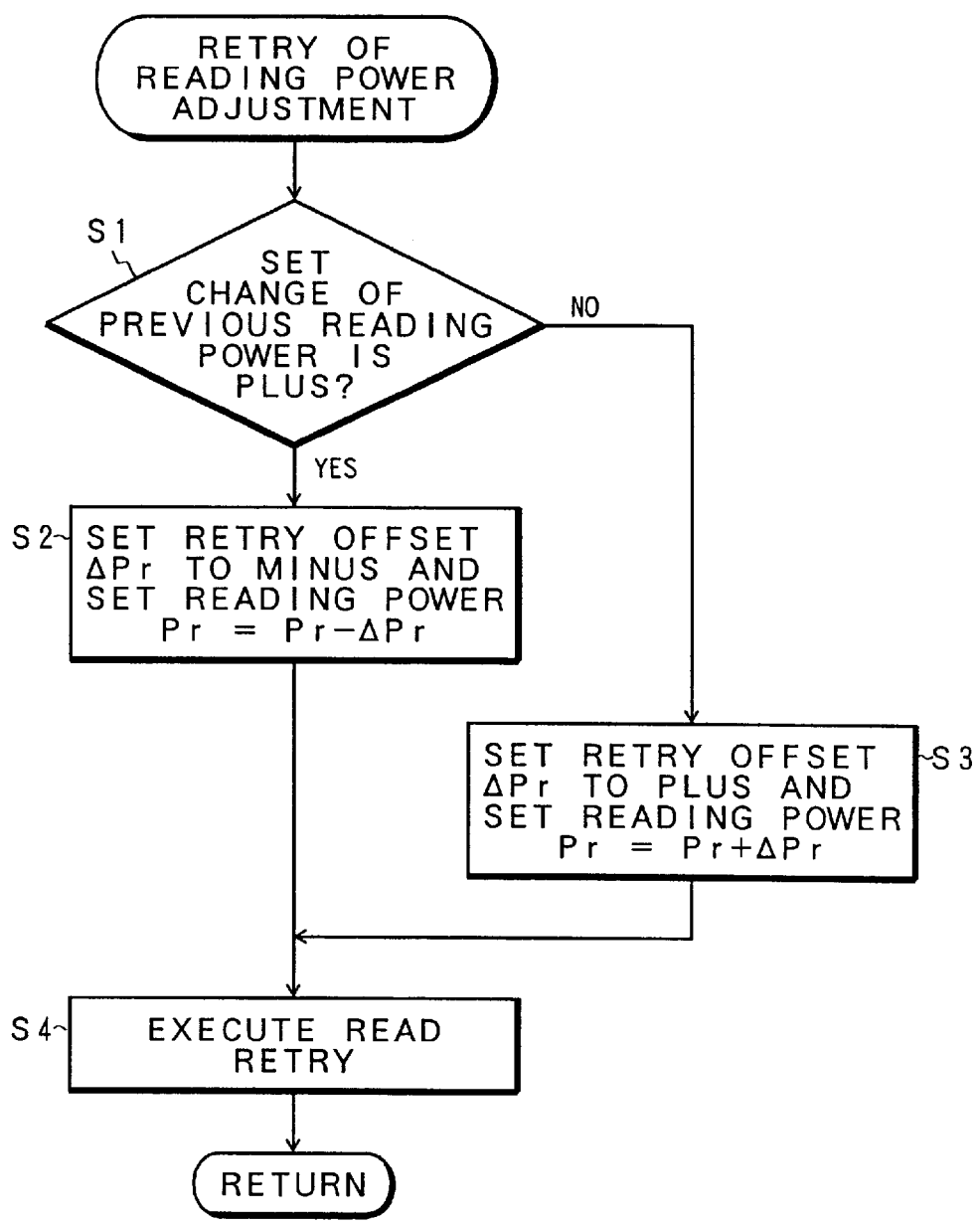
FIG. 29 is a flowchart for a read retry in which the setting of a reading power is changed.

FIG. 29 shows a specific example of the read retrying process in step S4 in FIG. 27 and relates to the case where the reading power is selected as a parameter. Even in this case, a check is made in step S1 to see if the previous setting change of the reading power has been performed to the plus side. If YES, the retry offset ΔPr is set to a minus value and the reading power Pr is set in step S2. When the previous setting change is performed to the minus side, the retry offset ΔPr is set to a plus value and the reading power Pr is set in step S3. In step S4, the read retry is executed.

Figure 30:
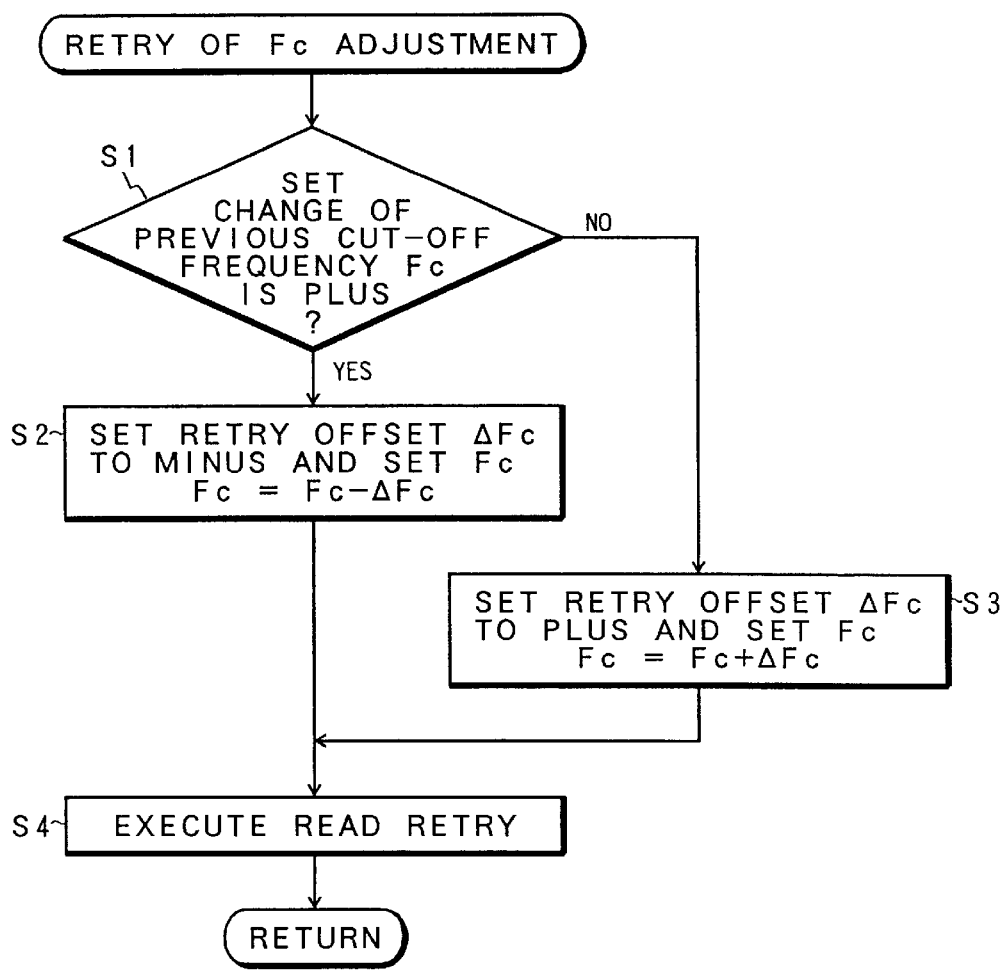
FIG. 30 is a flowchart for a read retry in which the setting of a cut-off frequency of an LPF is changed.

FIG. 30 shows the read retry in the case where the cut-off frequency Fc of the low pass filter is selected as a parameter. In step S1, if the previous setting change of the cut-off frequency has been performed to the plus side, the retry offset ΔFc is set to a minus value and the cut-off frequency Fc is set in step S2. When the previous setting change is performed to the minus side, the retry offset ΔFc is set to a plus value and the cut-off frequency Fc is set in step S3. In step S4, the read retry is executed.

Figure 31:
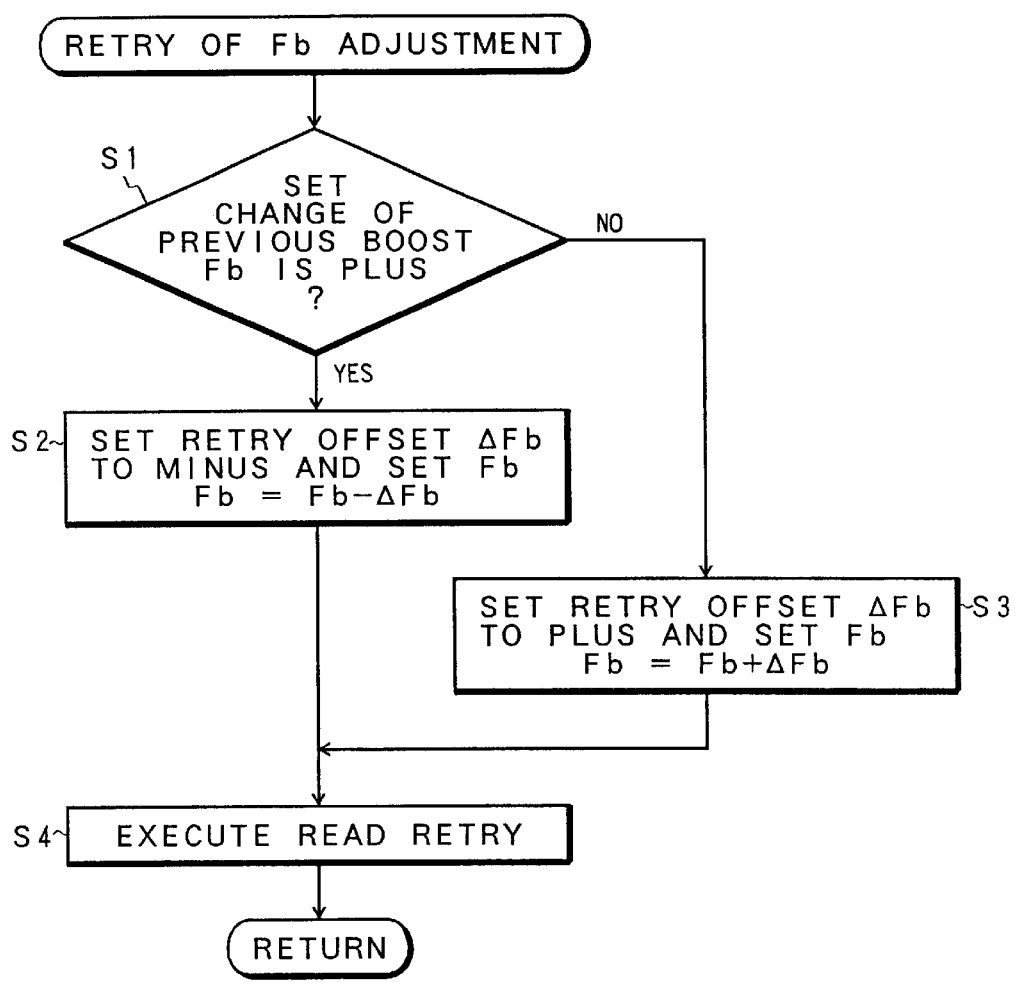
FIG. 31 is a flowchart for a read retry in which the setting of a boost of the LPF is changed.
Figure 32:
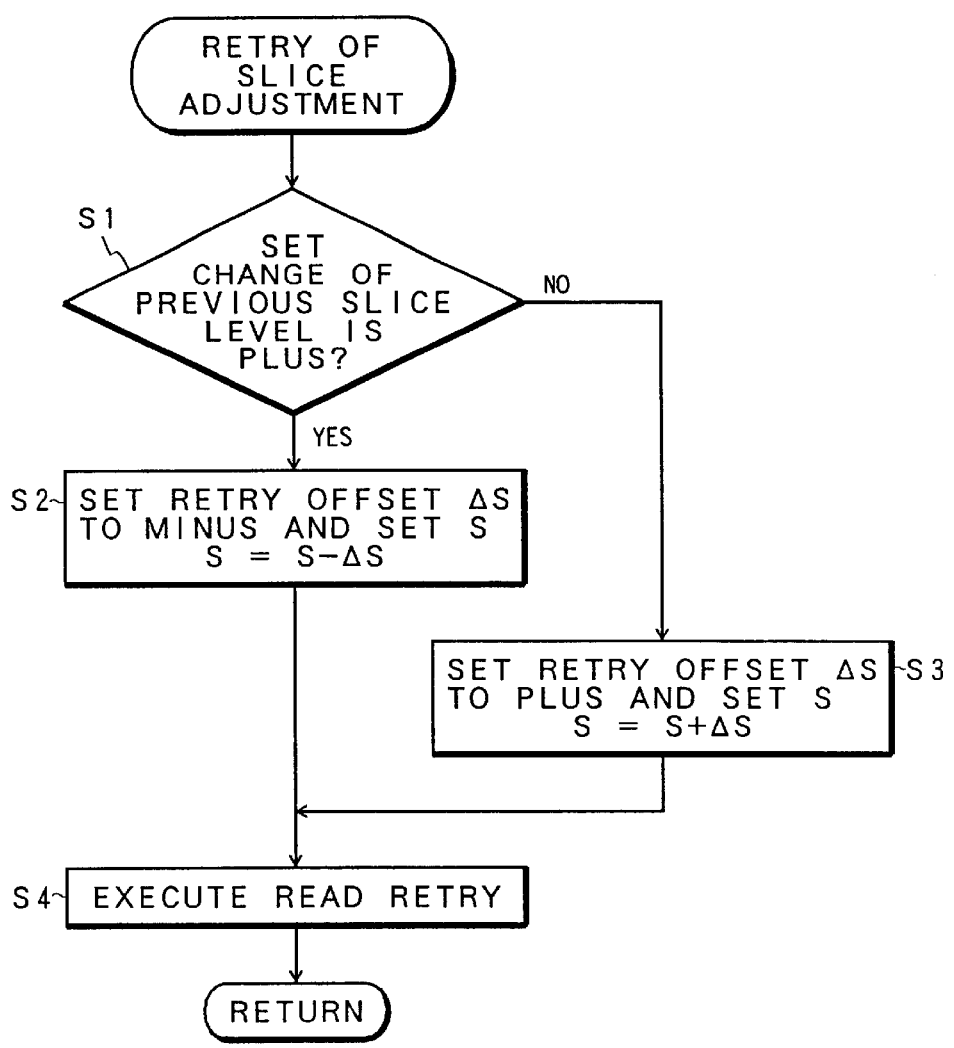
FIG. 32 is a flowchart for a read retry in which the setting of a slice level is changed.
Figure 33:
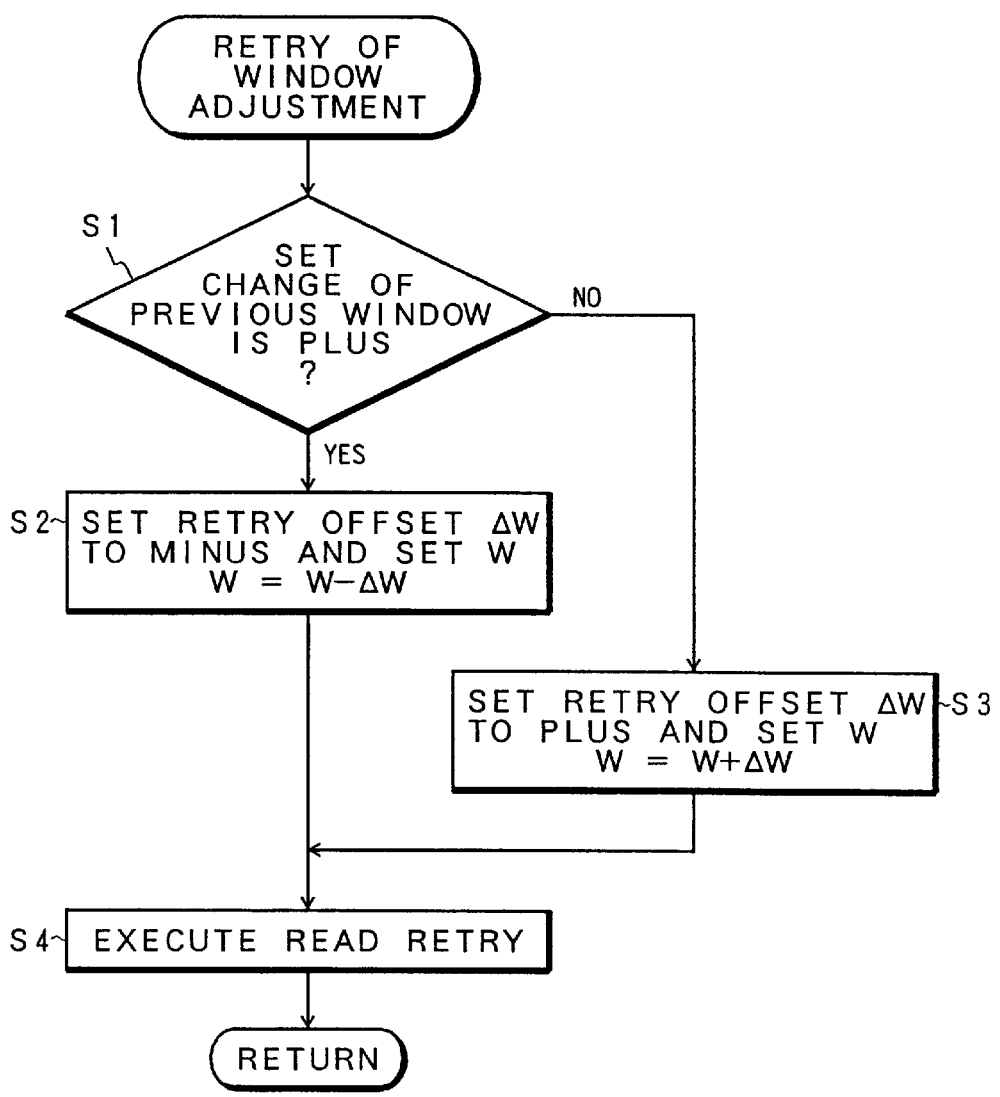
FIG. 33 is a flowchart for a read retry in which the setting of a window of a data discriminator is changed.

FIG. 31 shows the read retry in the case where the boost Fb of the low pass filter is selected as a parameter to be set and changed. In step S1, if the previous setting change has been performed to the plus side, the retry offset ΔFb is set to a minus value in step S2. On the contrary, when the previous setting change is performed to the minus side, the retry offset is set to a plus value in step S3. In step S4, the read retry is executed. The read retry which is executed by changing the retry offset to the plus or minus value so as to be opposite to that in the previous setting is also similarly performed in the case where the slice level of the slice circuit in FIG. 32 is selected as a parameter, the case where the window (delay time) of the data discriminator in FIG. 33 is selected as a parameter, and further, the case where the focusing offset to move the objective lens in the optical axial direction by the focusing actuator in FIG. 34 is selected as a parameter, respectively. The order of the parameters to be selected in step S4 in the read retrying process in FIG. 27 can be set to the order of, for example, the reproducing magnetic field, reading power, cut-off frequency, boost, window, and focusing offset. It is also possible to perform the read retry such that subsequent to the reproducing magnetic field and the reading power, the focusing offset is controlled and, after that, the parameters are sequentially switched in accordance with the order of the cut-off frequency, boost, and window as circuit parameters of the read LSI, and the set values are changed to the plus values and minus values. It is also possible to perform the read retry while selecting a combination of a plurality of proper kinds of parameters and changing the setting thereof without sequentially selecting various parameters one by one. With respect to only the parameters selected for the read retry, the read retry is executed by adding the plus or minus retry offsets to the set parameters obtained by adding the test offsets to the defaults. However, with respect to the parameters which are not targets of the setting change, the parameter set values obtained by adding the test offsets to the defaults to which no retry offset is added are used.

Figure 35:
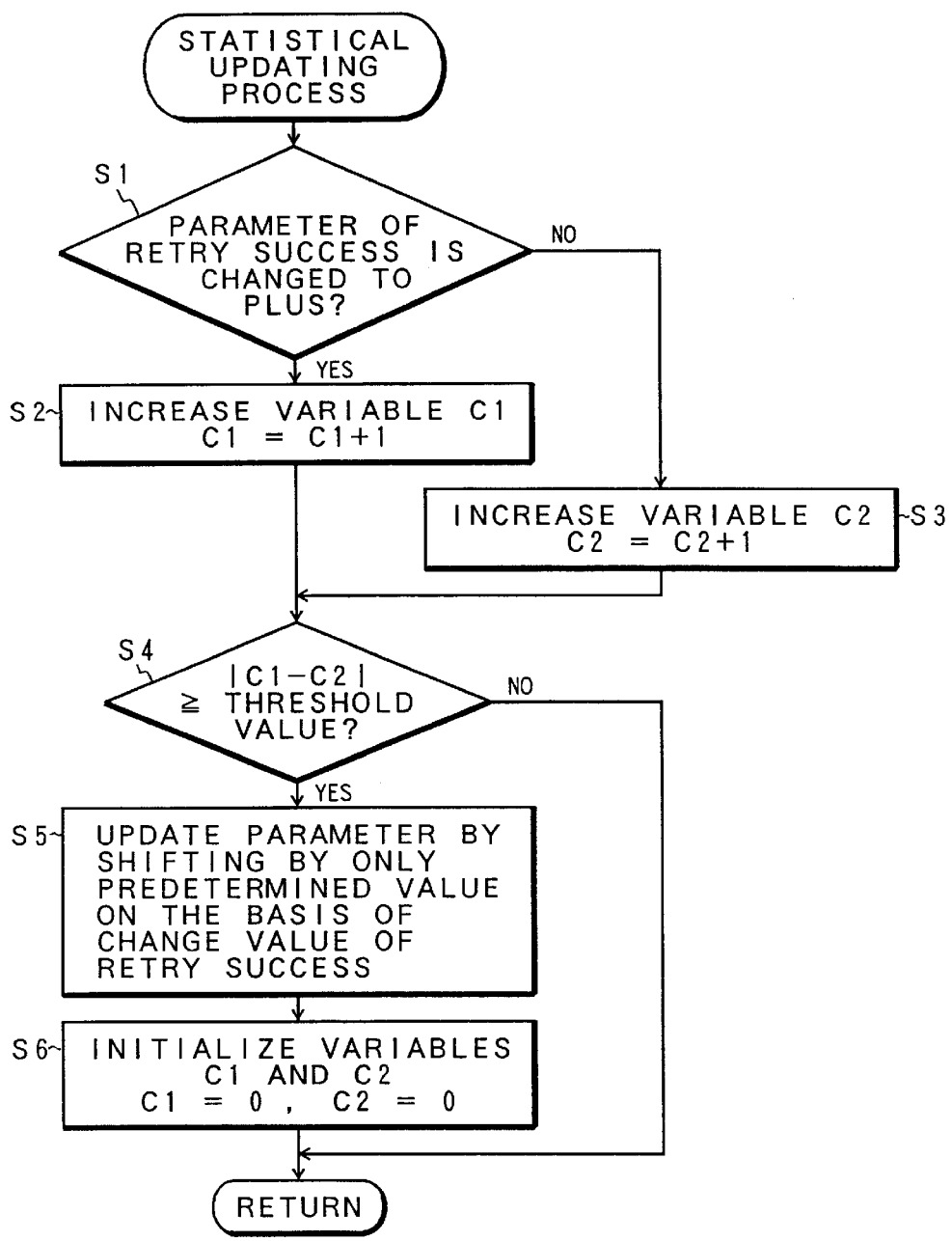
FIG. 35 is a flowchart for a parameter updating process based on statistical information of a retry success in FIGS. 16A and 16B.

FIG. 35 is a flowchart for the default parameter updating process based on the statistic information in which the parameter set information of the retry success in step S9 in FIG. 27 has been stored. In the statistic updating process of the default parameters, a check is first made in step S1 to see if the retry success parameters have been changed to the plus side. If the retry succeeded by the parameters changed by setting the retry offsets to the plus side, step S2 follows and a variable C1 is increased by "1". On the other hand, if the retry succeeded by the parameters changed by setting the retry offsets to the minus side, step S3 follows and another variable C2 is increased by "1". Subsequently in step S4, whether the absolute value of a difference between the variables C1 and C2 is equal to or larger then a predetermined threshold value is discriminated. If the absolute value of the difference between the variables C1 and C2 is equal to or larger than the threshold value, step S5 follows and the default parameters are updated by deviating by only a predetermined value on the basis of the change value of the retry success. For example, the test offsets are updated to values in which the half of the retry offsets at the time of the retry success was added to the default parameters. Since a degree of updating of the default parameters is made close to the change value of the retry success to a certain degree, an approaching degree is properly set. When the updating of the default parameter is finished, the variables C1 and C2 are initialized to 0 in step S6, respectively, thereby preparing for the next statistical updating process. In the statistical updating process in FIG. 35, the variables C1 and C2 are individually counted in accordance with the changes of the parameters to the plus and minus sides at the time of the retry success. However, it is also possible to construct in a manner such that one variable is used, the addition is performed in case of changing to the plus side, the subtraction is performed in case of changing to the minus side, and its result is compared with the threshold value in step S4. It will be obviously understood that as for the statistical parameter updating in FIG. 35, for example, in case of the zone division default table 128-1 in FIG. 17, the statistical default parameter updating process is individually performed on a unit basis of the same parameter unit of the same zone. This point similarly applies to the area division default table 128-2 in FIG. 21 and the updating process of the default parameters is individually performed with respect to the same parameter in the same area. Further, with regard to the temperature division default table 128-3 in FIG. 24, the updating process of the default parameters is performed every same parameter of the same temperature division.

Figure 36A:
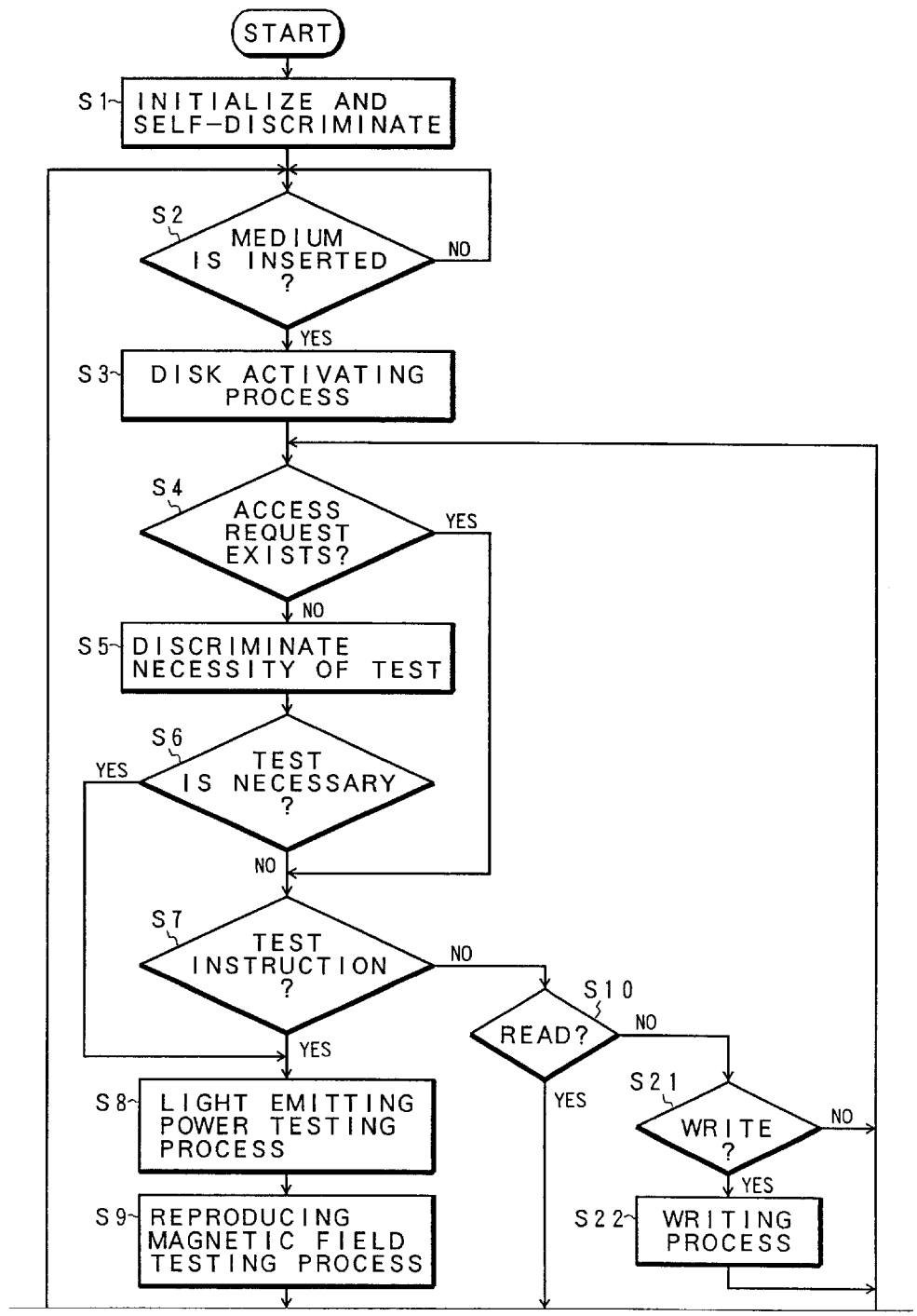
FIGS. 36A and 36B are flowcharts for the processing operation including the parameter updating process by a test processing unit in FIGS. 16A and 16B.
Figure 36B:
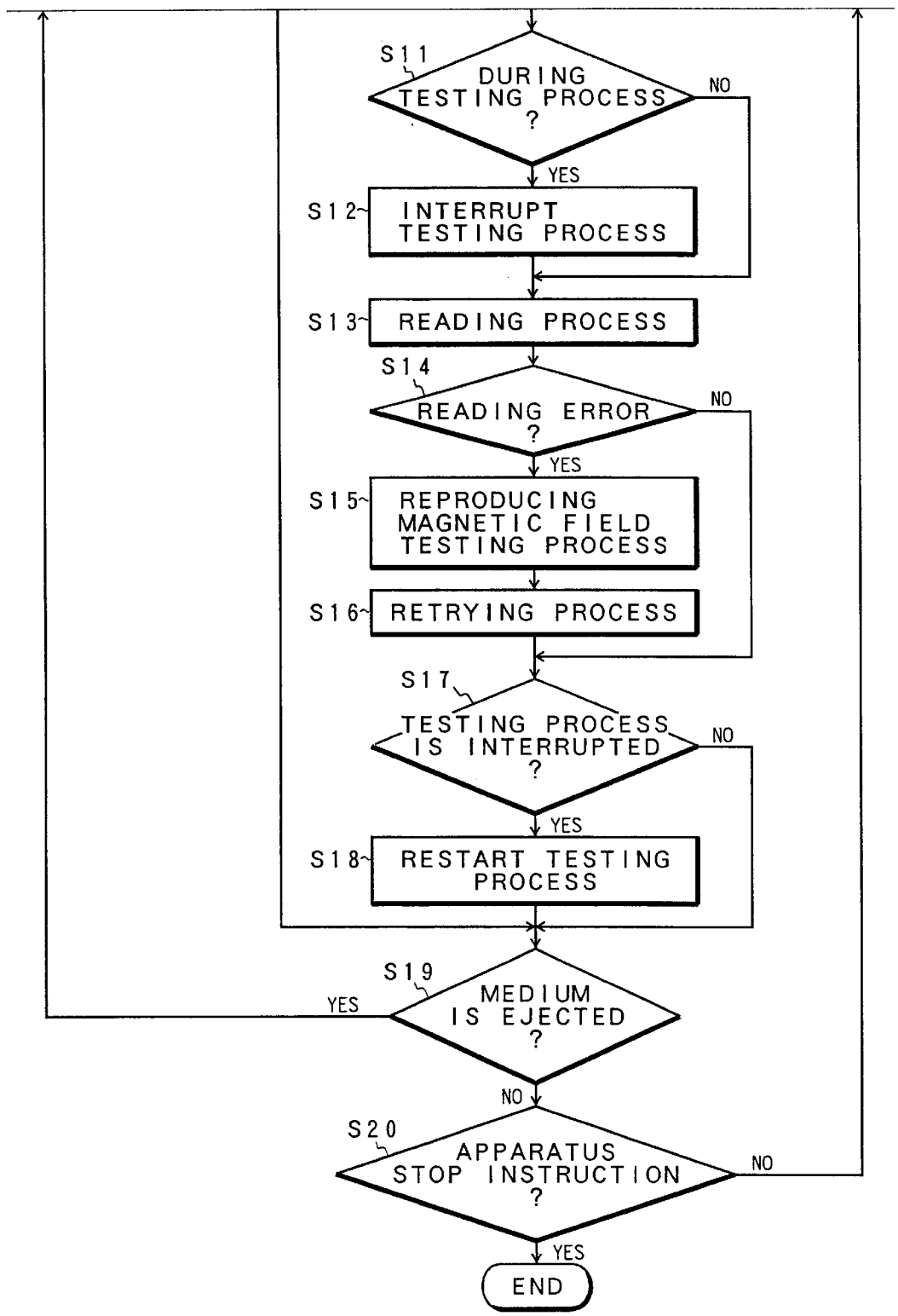

Optimization by the testing process of various parameters for the recording and reproduction by the test processing unit 126 in FIGS. 16A and 16B will now be described as follows. FIGS. 36A and 36B are flowcharts for the whole processes of the optical storing apparatus of the invention. When a power source of the apparatus is turned on, an initialization and a self diagnosing process are performed in step S1. The apparatus waits for the loading of a medium in step S2. When the medium is loaded in this state, step S3 follows and a disk activating process is performed. The disk activating process in step S3 is executed as shown in a flowchart of FIG. 37.

Figure 37:
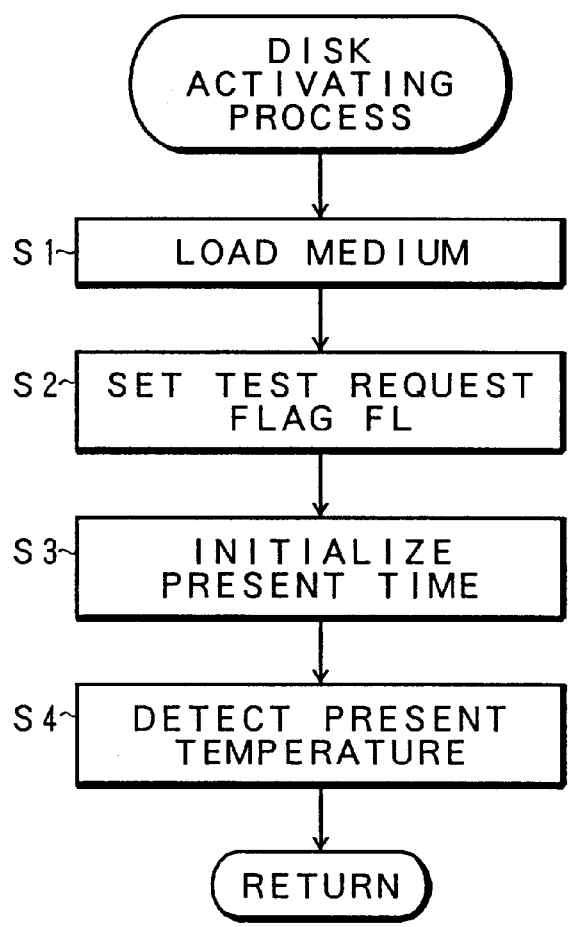
FIG. 37 is a flowchart for a disk activating process prior to the testing process in FIGS. 36A and 36B.

In FIG. 37, first in step S1, the medium is loaded and set to the spindle motor and is rotated at a constant velocity. In subsequent step S2, a test request flag FL is set. In step S3, the present time is initialized. In step S4, further, the present temperature T in the apparatus is detected. The processes necessary to decide the light emitting power of the laser diode and the reproducing magnetic field by the magnetic field applying unit upon activation are finished.

Referring again to FIGS. 36A and 36B, when the disk activating process in step S3 is finished, step S4 follows and the presence or absence of an access request from the upper apparatus is discriminated. In the embodiment, even if the disk activating process is performed by the loading of the medium, the testing process of the light emitting power and reproducing magnetic field is not performed at that time point, but in response to a test instruction command which is issued for the first time from the upper apparatus which received a notification of the disk activating process, the first testing process of the light emitting power and reproducing magnetic field is performed. Therefore, the access request which is received from the upper apparatus for the first time in step S4 is the test instruction command. In step S7, whether the command is a test instruction or not is discriminated. In step S8, the testing process of the light emitting powers such as writing power, erasing power, reading power, and the like is performed. After that, the testing process of the reproducing magnetic field is performed in step S9. If there is no test instruction from the upper apparatus, the necessity of the test is discriminated in step S5. If the necessity of the test is decided in step S6 on the basis of its discrimination result, a light emitting power testing process in step S8 and a reproducing magnetic field testing process in step S9 are performed. When a read access request is received from the upper apparatus, step S10 follows and the read request is discriminated. The reading process in step S11 and subsequent steps is executed. In the reading process, a check is first made in step S11 to see if the testing process is being performed. If YES, the testing process is once interrupted in step S12. The reading process is executed in step S13. After completion of the reading process, the presence or absence of a read error is discriminated in step S14. If there is the read error, the reproducing magnetic field testing process is executed in step S15. After that, the retrying process is performed in step S16. If there is no read error, step S17 follows and whether the testing process has been interrupted or not is discriminated. If the testing process has been interrupted, the testing process is restarted from the interrupted time point in step S18. When the series of reading processes is finished as mentioned above, a check is made in step S19 to see if the medium has been ejected. If the medium is not ejected, the presence or absence of an apparatus stop instruction is checked in step S20. After that, the processing routine is returned to step S4. The apparatus waits for the loading of a next medium and similar processes are repeated. When there is a write access request from the upper apparatus, step S21 follows and the write request is discriminated. The writing process is executed in step S22.

Figure 38B:
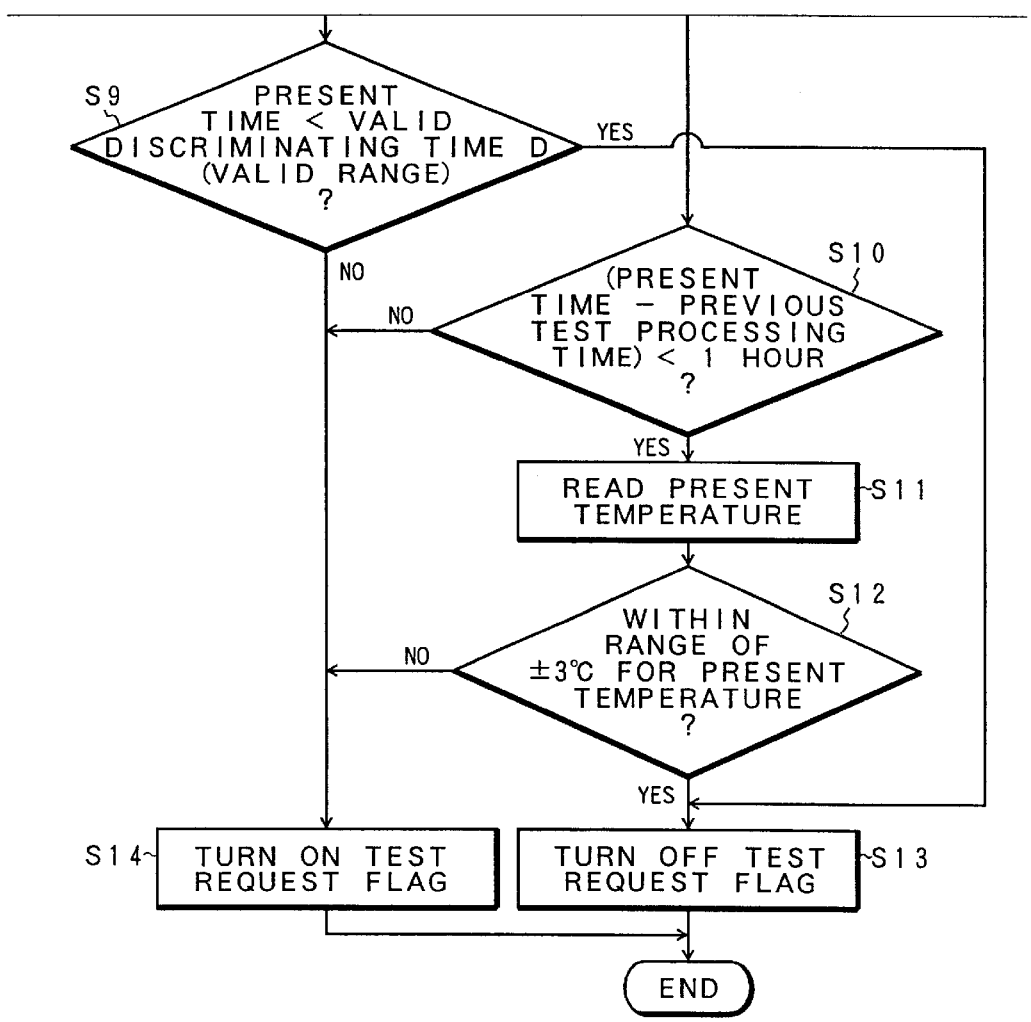

FIGS. 38A and 38B are flowcharts for the process to discriminate the necessity of the test in step S5 in FIGS. 36A and 36B. In the necessity discriminating process of the test, first in step S1, the present time is read. In step S2, time (A) that is required from the activation of the optical disk drive to the previous testing process is calculated. In step S3, by dividing the time (A) from the activation by a predetermined time, for example, 20 seconds, it is converted into the number (B) of unit times. In step S4, whether the number (B) of unit times is less than 8, namely, whether the time (A) from the activation to the first test write is less than 160 seconds or not is discriminated. If the time (A) is less than 160 seconds, step S5 follows and whether the number (B) of unit times is less than 4, namely, whether the time (A) is less than 80 seconds or not is discriminated. If (80 sec≦A≦160 sec), the number (B) of unit times is clipped to "3", namely, the time (A) is clipped to 60 seconds in step S6. Step S7 follows. If the time (A) is less than 80 seconds in step S5, the processing routine directly advances to step S7. In step S7, a valid time (C) which guarantees the use of the optimum values (light emitting power and reproducing magnetic field) determined in the previous testing process is calculated. In this case, the valid time (C) is set to 20 sec$\times 2^B$ (the number of unit times). The maximum value of the valid time is limited to 160 seconds. Thus, the valid time (C) which guarantees the optimum values determined by the testing process is set to the time corresponding to $2^B$ so long as the time (A) from the activation to the first testing process is less than 160 seconds. If the time (A) is equal to or longer than 160 seconds, the valid time (C) is fixed to a predetermined valid time C×160 seconds. The calculation of the valid time (C) as mentioned above is varied in accordance with the time that is required until the medium temperature of the medium loaded in the optical disk drive is settled to the temperature in the apparatus. That is, at the initial stage just after the medium was loaded, since there is a difference between the temperature of the medium and the temperature in the apparatus, the test based on the temperature in the apparatus cannot be validated at this stage. Therefore, the testing process is not performed upon activation. The temperature of the loaded medium is balanced to the temperature in the apparatus with the elapse of time of about 1 to 2 minutes. Therefore, the first testing process is executed synchronously with the timing when the write command is issued from the upper apparatus for the first time after the activation of the optical disk drive. Since there are various timings of issuing the write command from the upper apparatus after completion of the activation, in steps S1 to S7 in FIGS. 38A and 38B, the time (A) from the activation to the first light emission adjustment is obtained, thereby determining the valid time (C) to discriminate the test timing of the next and subsequent times from the time (A). If the valid time (C) can be calculated in step S7, a valid discriminating time (D) is calculated as a time obtained by adding the calculated valid time (C) to the previous test write time in step S8. In step S9, whether the present time has exceeded the valid discriminating time (D) or not is discriminated. If the present time exceeds the valid discriminating time (D), step S14 follows and the test request flag is turned on. The processing routine is returned to step S6 in FIGS. 36A and 36B. When the present time does not reach the valid discriminating time (D) in step S9, the test processing flag is turned off in step S13. When the number (B) of unit times is equal to or larger than 8, namely, when the time (A) is equal to or longer than 160 seconds in step S4, the processing routine advances to step S10. Whether the time obtained by subtracting the previous test processing time from the present time is shorter than one hour or not is discriminated. If it is shorter than 1 hour, the present temperature is read in step S11. Whether the present temperature lies within a range of ±3° C. for the previous temperature or not is discriminated in step S12. If it lies within ±3° C., the test processing flag is turned off in step S13 and the testing process is not performed. When there is a temperature fluctuation exceeding the range of ±3° C. for the previous temperature, the test processing flag is turned on in step S14 and the testing process is executed. When a difference between the present time and the previous test processing time is equal to or longer than one hour in step S10, the test processing flag is forcedly turned on in step S14 and the testing process is executed. Each threshold time set in the process to discriminate about the necessity of the testing process can be properly determined if necessary.

Figure 39A:
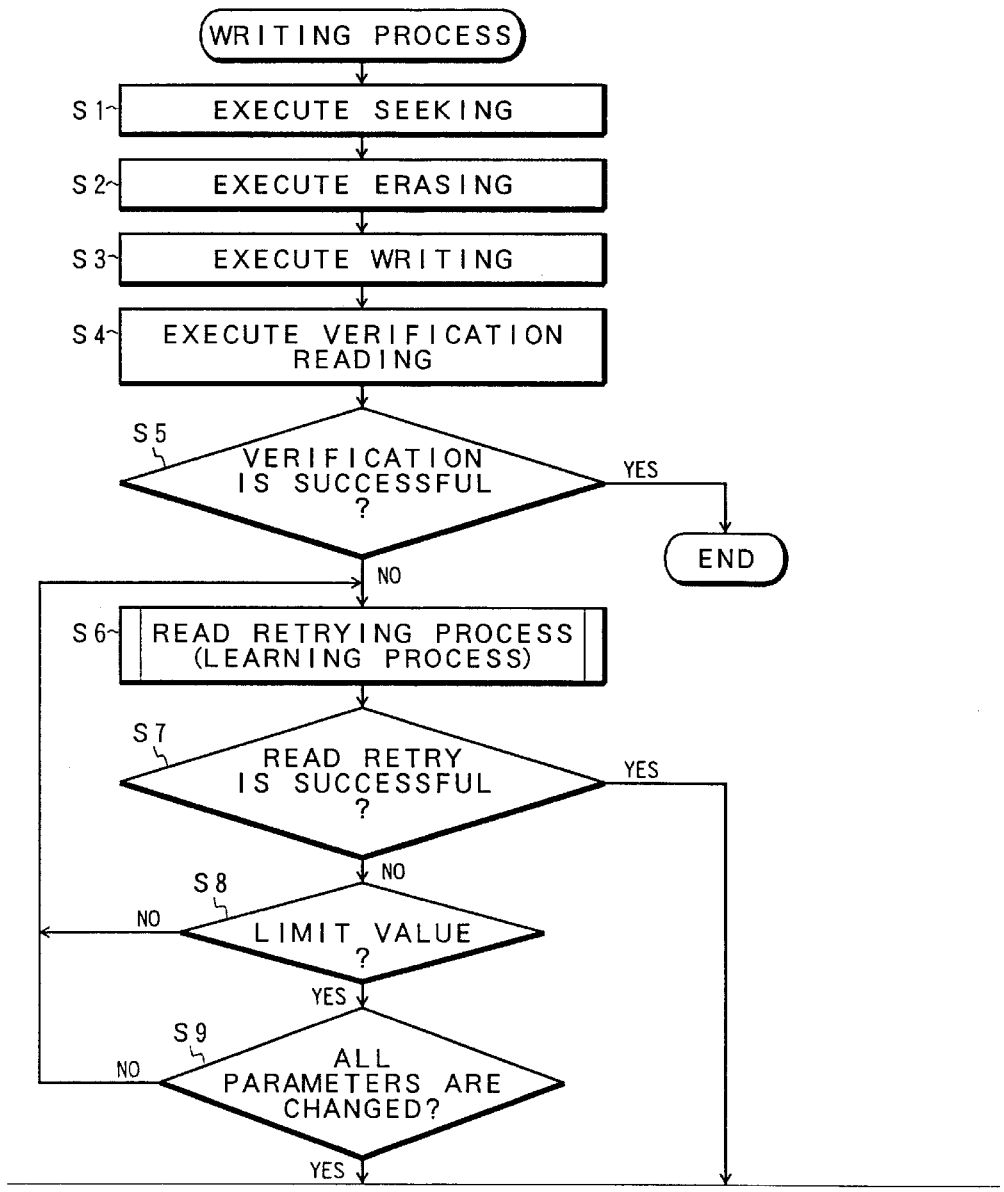
FIGS. 39A and 39B are flowcharts for a writing process including a write retry in the second embodiment of FIGS. 16A and 16B.
Figure 39B:
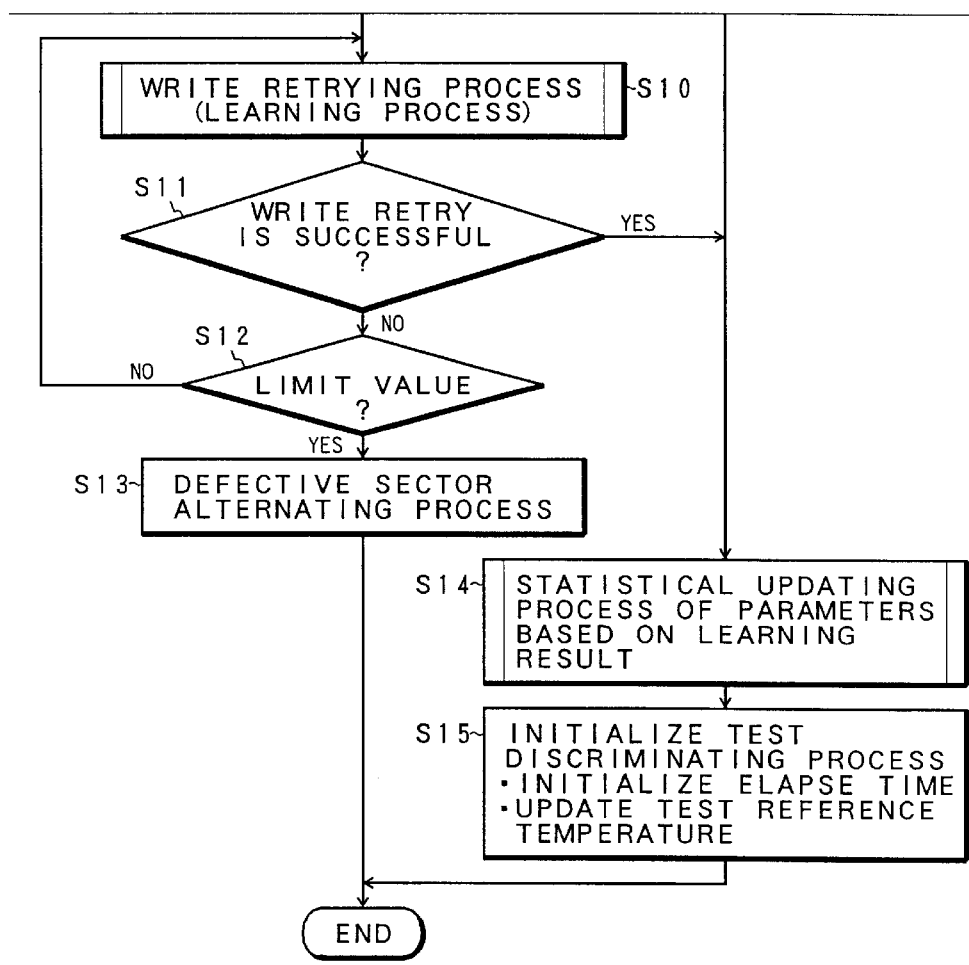

FIGS. 39A and 39B are flowcharts for the writing process by the write processing unit 124 and write retry processing unit 125 in FIGS. 16A and 16B. In the writing process, when the write processing unit 124 executes the seeking operation to position the laser beam to the target sector on the basis of the write instruction, track No. TK, sector No. SS, and zone No. Zi of the registers 135 in step S1 and positions the laser beam to the target sector, the erasing operation is executed in step S2. In step S3, the writing operation is subsequently executed. In step S4, the verify read is finally executed. When the verify read is successful in step S5, the writing operation is normally finished. When the verification fails in step S5, step S6 follows and the read retrying process for the verify retry is executed. The read retrying process is substantially the same as the reading process in FIG. 27. If the read retry is successful in step S7, step S14 follows. The parameter set information of the successful read retry is stored as statistic information. The parameters are updated in accordance with the statistical updating process shown in the flowchart of FIG. 35. In step S14, the initialization of the elapsed time and the updating of the test reference temperature in the test processing unit 126 are further executed at the time point of the successful read retry as a target of the updating of the default parameter and on the basis of the temperature in the apparatus. Further, in the read retry as a verify retry in FIGS. 39A and 39B, if the read retry does not succeed even when the changed value of the parameter reaches the limit value in step S8 and the setting change of all of the parameters in step S9 is finished, the write retrying process in step S10 is performed. In the write retrying process, the erasure, writing, and verification are repeated while changing the writing power. When the write retry is successful, the processing routine advances from step S11 to step S14 and the changed writing power of the successful write retry is stored as parameter set information. In the setting change of the writing power in step S10 as well, since the change to the plus side and the change to the minus side are alternately performed, the test offsets which are added to the default of the writing power are updated so as to approach the changed writing power of the write retry success in accordance with the statistical updating process shown in the flowchart of FIG. 35. When the writing power is updated, the test discriminating process is initialized in step S15. If the write retry does not succeed even when the write retrying process is performed while changing the setting of the writing power in step S10 and if the changed writing power reaches the limit value in step S12, the recording and reproduction do not succeed even by any one of the read retry and the write retry with respect to the target sector. Therefore, an alternating process of the defective sector is performed in step S13.

Figure 40:
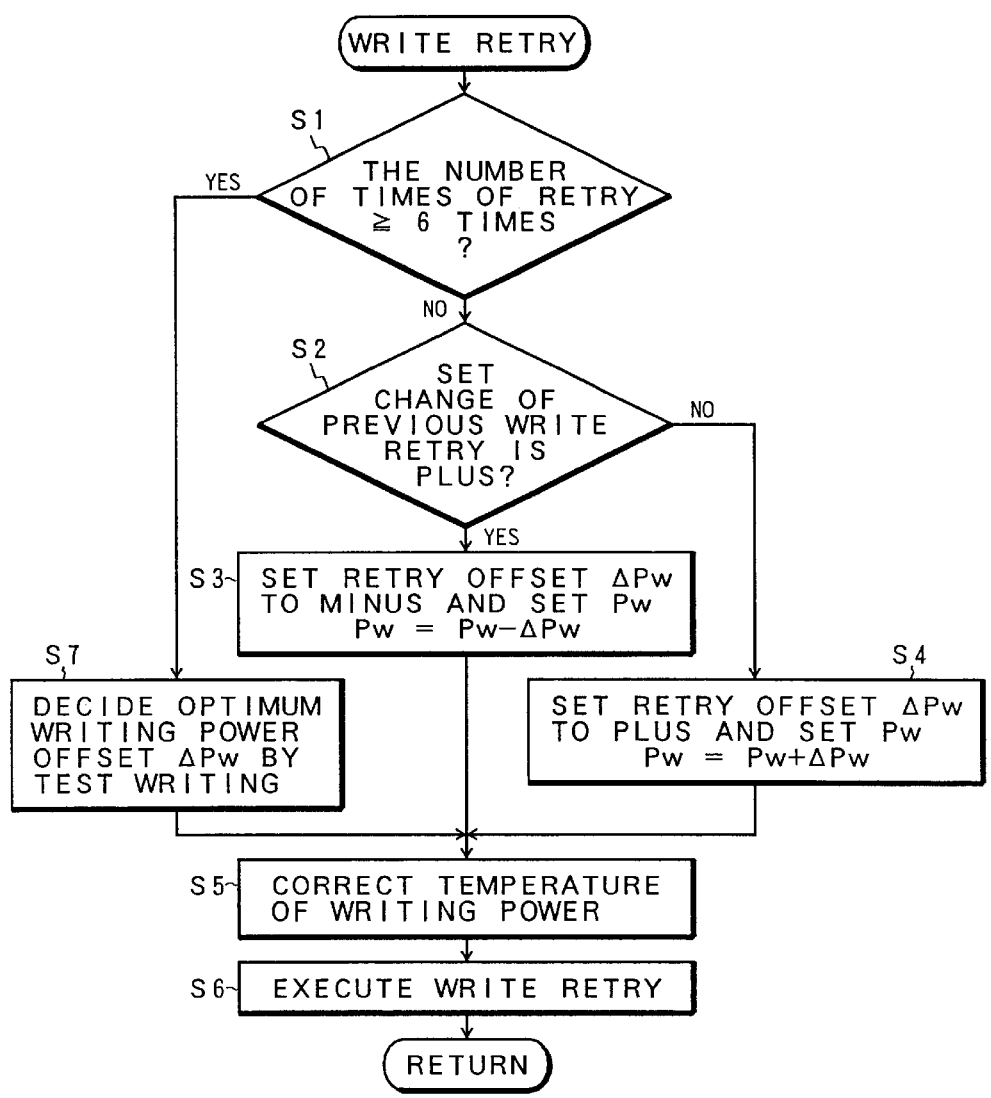
FIG. 40 is a flowchart for the write retrying process in FIGS. 39A and 39B.

FIG. 40 shows the details of the write retrying process in step S10 in FIG. 39B. In the write retrying process, the write retry is executed by using a write retry offset table 132-4 of the number of times division as shown in FIG. 41. In this table, 0% of the default, namely, the default writing power is used as it is as a retry offset ΔPw at the first time of the write retry. +3% is used at the second time, −3% is used at the third time, +6% is used at the fourth time, and −6% is used at the fifth time. Further, if the write retry does not succeed even when the writing power is changed to the plus side and the minus side, the test write is performed with respect to the sixth and seventh times. In the test write, the laser beam is positioned to the specific test track in the zone by the test processing unit 126 in FIGS. 16A and 16B and the erasure, writing, and verification are performed while changing the writing power, thereby obtaining the optimum writing power. If the optimum writing power is obtained by the test write, the laser beam is returned to the target sector, and the erasure, writing, and verification using the optimum writing power obtained in the test write are executed. By the test write, the writing power is set to the optimum value according to the environmental conditions at that time and an extremely high success ratio of the write retry is obtained. In the read retry and verify retry in FIGS. 16A and 16B, the reproducing magnetic field, reading power, writing power, and focusing offset, and further, the cut-off frequency, boost, window, and slice level as circuit parameters of the read LSI have been mentioned as parameters to be set and changed. However, the other parameters necessary for the reading and writing operations can be used. The parameters can be set and changed by selecting specific parameters which are valid for retry success among them.

Reflection of the Success Retry

Figure 42B:
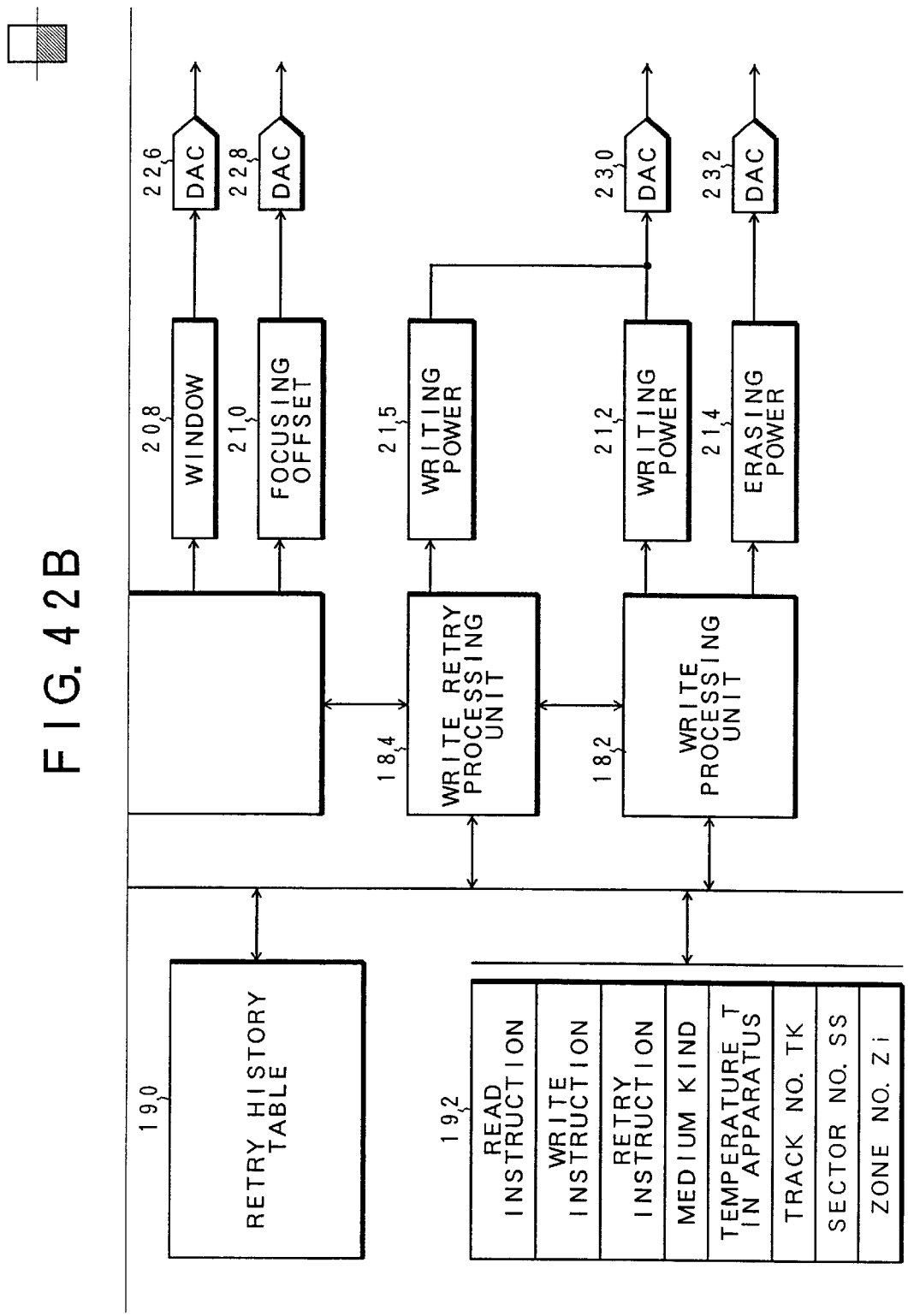

FIGS. 42A and 42B are functional block diagrams of the third embodiment of the invention in which the retry information which is successful in the read retry and verify retry is stored as statistic information and conditions of the read retry of a high success ratio are extracted from the statistic information at the time of the new subsequent retry, thereby improving the retry success ratio. In the third embodiment, a read processing unit 178 is provided for the reading operation, thereby allowing a read retry processing unit 180 to perform the read retry when an error occurs in the reading operation by the read processing unit 178. A write processing unit 182 is provided for the writing operation. A write retry processing unit 184 is provided for the read retry when a verify error occurs due to the erasure, writing, and verify by the write processing unit 182. The verify retry by the write retry processing unit 184 is substantially executed by the read retry processing unit 180. A default table 185, a test offset table 186, and a retry offset table 188 in which various parameters necessary for the reading operation and the writing operation have been stored are provided for the read processing unit 178, read retry processing unit 180, write processing unit 182, and write retry processing unit 184. A group of registers 192 for various control instructions necessary for the reading operation and the writing operation are provided. A read instruction, a write instruction, a retry instruction, a medium kind, a temperature T in the apparatus, a track No. TK, a sector number SS, and a zone No. Zi are set as control instructions. Further, for the read processing unit 178, read retry processing unit 180, write retry processing unit 184, and write processing unit 182, registers 194 to 215 are provided in correspondence to the parameters which are respectively controlled by them and D/A converters 216 to 232 for converting the set values of the registers into analog control signals are provided, respectively. Further, a retry history table 190 is provided in correspondence to the read retry processing unit 180 and write retry processing unit 184. A retry sequence 195 to perform the read retry while switching the various parameters and changing the setting thereof at the time of the read retry or verify retry has been preset in the read retry processing unit 180.

FIG. 43 shows a retry sequence 195-1 in FIGS. 42A and 42B for the MSR medium as a target and a retry offset of a retry offset table 188-1 corresponding thereto. The retry sequence 195-1 is divided into sequence Nos. SEQ1 to SEQ14. Like a retry offset table 188-1 shown in correspondence thereto, plus and minus offset values have alternately been stored with respect to the retry offsets of the same parameter. For example, in the sequence No. SEQ1, the plus retry offset +ΔH of the reproducing magnetic field is set. In the next sequence No. SEQ2, the minus retry offset −ΔH is set. This point shall also similarly apply to the remaining retry offsets of the reading power Pr, cut-off frequency Fc, boost Fb, slice level S, window W, and focusing offset FCO.

FIG. 44 shows a retry sequence 195-2 and a retry offset table 188-2 for the MO medium other than the MSR medium as a target. Since the retry offsets +ΔH and −ΔH of the reproducing magnetic field in the MSR medium in FIG. 43 are excluded, the retry sequence 195-2 comprises 12 sequences of sequence Nos. SEQ1 to SEQ12.

For example, like a temperature division retry history table 190-1 of FIG. 45, the sequence numbers of the successful retry sequence have been stored in the retry history table 192 in FIGS. 42A and 42B in accordance with a temperature area of the temperature T in the apparatus at the time of the retry success. The sequence numbers of the successful retry sequence can specify the parameters of the successful retry from the correspondence of the retry sequence 195-1 of, for example, the MSR medium in FIG. 43 and the retry offset 188-1. For example, the successful retry sequence within a range of (0° C.≦T<10° C.) is a sequence No. SEQ3. In the sequence No. SEQ3, by changing the reading power Pr from FIG. 43 by only the retry offset +ΔPr, it is possible to recognize that the retry is a successful retry. As mentioned above, by separately storing the sequence numbers of the successful retry, namely, the set values of the successful retry parameters while dividing the temperature in the apparatus into temperature zones, at the time of the next retry, the retry is executed by the retry sequence corresponding to the temperature in the apparatus at that time, so that a success ratio of the retry can be raised. Particularly, in the case where a retry continuously occurs when the sectors of a certain track are continuously read by the read access of one time, the parameter set information which is successful with respect to the retry at the first time is first set by the retry at the second time. Therefore, when the environmental conditions hardly change as in the case where the sectors are continuously read out, the retries at the second and subsequent times succeed by the retry of one time. A success ratio of the retry can be remarkably raised.

FIG. 46 shows another embodiment of the retry history table 190 in FIGS. 42A and 42B and is characterized in that a zone division retry history table 190-2 is used. That is, in the MO medium and the MSR medium, since the data has been recorded by the ZCAV system, the number of recording data differs depending on the medium zone. In an extreme case, even if the retry of the read error on the innermost rim side is successful or even if the result is applied to the retry on the outermost rim side, there is not always a possibility of success. Therefore, as shown in FIG. 46, the zone is divided into the zones Z01 to Z18 and the sequence No. of the successful retry sequence is stored every zone. Therefore, at the time of the new retry, the sequence No. of the past retry sequence which succeeds in the same zone by the zone number at that time is recognized and the retry to which the success result of the same zone is reflected is performed. Thus, a success ratio of the retry can be remarkably raised.

FIG. 47 shows another embodiment of the retry history table 190 in FIGS. 42A and 42B and is characterized in that a medium capacity division retry history table 190-3 is used. In the optical storing apparatus of the invention, medium cartridges of different medium capacities of 128 MB, 230 MB, 540 MB, 640 MB, and 1.3 GB are supported. For example, since a track pitch differs depending on the medium capacity and the optimum values of various parameters for writing and reading also differ, it is desirable that the sequence numbers of the successful retry sequences, namely, successful parameter set information is separately stored every medium capacity.

FIG. 48 shows another embodiment of the retry history table 190 in FIGS. 42A and 42B and is characterized in that a seek distance division retry history table 190-4 is used. When an error upon reading operation occurs due to the positioning operation of the laser beam, set values of the parameters necessary for the successful retry differ depending on the seek distances at which the laser beam moves. Therefore, by separately storing the parameter set information of the past successful retry every seek distance, when a new retry occurs, the parameter set information for the proper retry success adapted to the seek distance at that time is used and the retry can be performed at a high success ratio. In the seek distance division retry history table 190-4, for example, the seek distance is divided on the basis of the track number from the outer rim on the MSR medium. In correspondence to the division of the seek distance, the sequence number of the successful retry sequence is stored every seek distance.

FIG. 49 shows another embodiment of the retry history table 190 in FIGS. 42A and 42B. Only the parameter set information of the past successful retry sequences has been stored in each of the retry history tables of FIGS. 45 to 48. This embodiment is characterized in that the number of times of success of the past successful retry sequence is stored every sequence No. SEQi showing the successful set parameters. That is, FIG. 49 shows a temperature division retry history table 190-5 and sequence Nos. i=1~14 are provided as success retry sequences SEQi. The sequence Nos. SEQ1 to SEQ14 denote, for example, retry offsets of the parameters corresponding to the sequence numbers of the MSR medium in FIG. 43. With respect to each of the temperature ranges of a unit of 10° C. in a range from 0° C. to 60° C., the number of times of success of the past successful read retry is stored as for each of the sequence Nos. SEQi=1~14. For example, considering the temperature range of (0° C.≦T<10° C.), the number of times of success of the sequence No. SEQ3 is equal to 4. This sequence No. SEQ3 denotes the number of times of success of the retry of the parameter set value in which the reading power Pr is changed from that in FIG. 43 by an amount of +ΔPr. In the retry process using the temperature division retry history table 190-5 of FIG. 49, the retry sequence of the highest success ratio among the success retry sequences of the sequence Nos. SEQ1 to SEQ14 corresponding to the apparatus temperatures at the time of the retry is set to the retry at the first time. If the retry fails at the first time, the retry sequence of the next highest number of success times is executed. In a manner similar to the above, by executing the retry sequence in accordance with the order of the numbers of times of success from the large number to the small number, a success ratio of the retry can be remarkably raised.

FIG. 50 shows an embodiment of a zone division retry history table 190-6 in which the numbers of success times have been stored. In this case as well, the past numbers of times of success have been separately stored every success retry sequences SEQ1 to SEQ14 into zones Z01 to Z18, respectively. At the time of the new retry, the retry is executed in accordance with the order from the sequence of the sequence No. SEQi of the highest number of times of success.

FIG. 51 shows a capacity division retry history table 190-7 in which the numbers of times of success have been stored. Similarly, the retry is executed in accordance with the order from the retry sequence of the highest number of times of success among the retry sequences SEQ1 to SEQ14 corresponding to the medium capacities. In the medium of 1.3 GB, the numbers of times of success have been stored with respect to the retry sequences SEQ1 to SEQ14 in correspondence to FIG. 43. In each of the media of 128 MB, 230 MB, 540 MB, and 640 MB, the numbers of times of success have been stored with regard to the retry sequences SEQ1 to SEQ12 as shown in FIG. 44.

Figure 52:
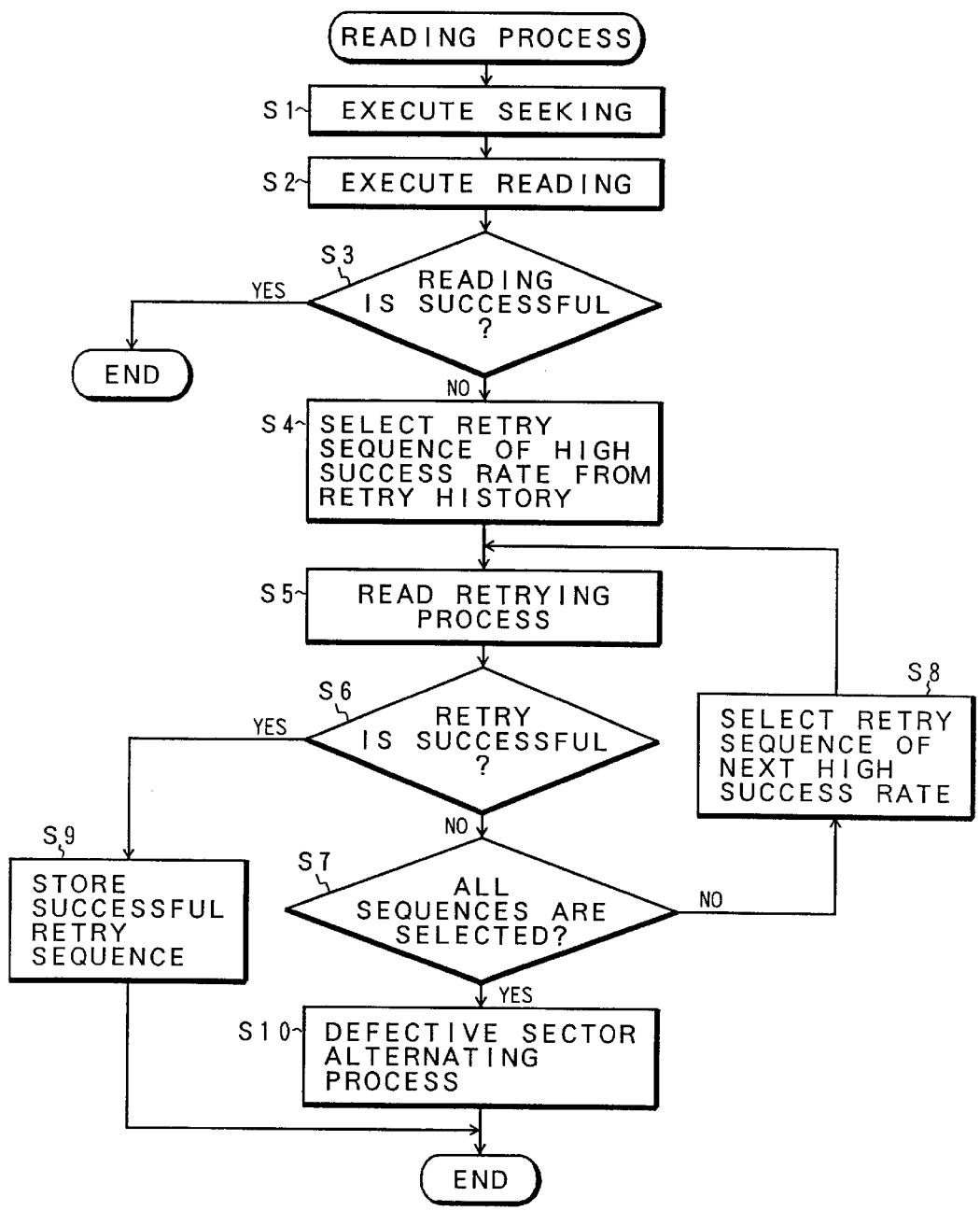
FIG. 52 is a flowchart for a reading process including a read retry to which past successful retry information in FIGS. 42A and 42B is reflected.

FIG. 52 is a flowchart for the reading process including the read retry process in FIGS. 42A and 42B. The seeking operation to seek the laser beam to the target sector is executed in step S1. In step S2, the reading of the target sector is executed. If the reading is successful in step S3, the reading operation is normally finished. If the reading fails in step S3, step S4 follows. The retry sequence of a high success ratio is selected from the retry history table 190. In step S5, the read retry is executed. In the read retry of the first time, no retry history information exists. Therefore, in this case, the read retry is executed, for example, in accordance with the sequence number of the retry sequence 195-1 in FIG. 43. If the read retry succeeds at least once, the successful retry sequence is stored in the retry history table 190. Therefore, at the time of a new retry, the previous successful retry sequence is selected and the read retry is executed, or the retry sequences are selected in accordance with the order from the retry sequence of the highest success ratio among the past retries and the read retry is executed. If the retry succeeds in step S6, the successful retry sequence is stored in the retry history table 190 in step S9. In this instance, if the retry history table 190 has a structure of FIG. 45, 46, 47, or 48, the sequence number of the successful retry sequence is stored into the corresponding segment and is updated.

In case of the table structures of FIGS. 49, 50, and 51 in which the numbers of times of success have been stored, the number of times of success of the successful sequence number corresponding to the segment of the temperature, zone, medium capacity, or the like is increased. When the retry fails in step S6, until all of the sequences are selected in step S7, the retry sequence of the second high success ratio is selected in step S8. The read retry process in step S5 is executed. At this time, in the table structures in which the numbers of success times have been stored in FIGS. 49, 50, and 51, the retry sequence can be selected in accordance with the order from a high success ratio. However, in the table structures in which only the latest successful retry sequence in FIGS. 45 to 48 have been stored, the retry sequence which is successful at the first time can be selected. However, when the retry fails at the first time, the sequence next to the fixedly determined sequence number is selected at the second time. In this case, a possibility of success is not raised. Therefore, even with respect to FIGS. 45 to 48, the successful sequence numbers of the previous successful different parameters are stored. When the retry fails in the first retry, with respect to the second time, two-previous successful another sequence is selected and the retry can be performed.

FIG. 53 is a flowchart for the writing process by the write processing unit 182 and write retry processing unit 184 in FIGS. 42A and 42B. In step S1, the seeking operation to seek the laser beam to the target sector is executed. The erasure of the target sector is executed in step S2. The writing is executed in step S3. The verify read is executed in step S4. When the success of the verification is determined in step S5, the writing operation is normally finished. When the verification fails in step S5, step S6 follows. The read retry process is executed as a verify retry in step S7. The read retry process as a verify retry in steps S7 to S12 is also substantially the same as the read retry process in steps S5 to S10 in the reading process in FIG. 52. If the retry fails even when the read retry is performed with respect to the read retry process for the verify retry in FIG. 53, the write retry can be performed as shown in step S10 in FIGS. 39A and 39B and FIG. 40.

According to the invention as described above, at the time of the read retry of the MSR medium, the value of the reproducing magnetic field is changed and the read retry is performed by the changed reproducing magnetic field, thereby allowing the retry to succeed. The frequency of the occurrence of the read error due to the retry-out is remarkably reduced, thereby enabling the stable reading operation to be guaranteed. According to the invention, when the read retry succeeds, the parameter set values at the time of success are stored as statistic information. By the learning process of the statistic information, the parameters are automatically updated so as to approach the parameter set values which provided the retry success and the retry success conditions are reflected to the determination of the parameters. Thus, the number of times of retry until the success of the read retry is reduced, the success ratio is raised, the frequency of the occurrence of the read error due to the retry failure is decreased, and the stability of the reading operation can be improved. Further, according to the invention, the successful retry information with respect to the past read retry is stored and, when a new retry is performed, it is performed by using the stored successful retry information. Thus, the success ratio of the read retry which is performed while switching a plurality of kinds of parameters and changing the setting thereof is remarkably raised. As compared with the retry which is performed while fixedly switching a plurality of kinds of parameters and changing the setting thereof, the number of times of retry until the success is remarkably reduced and the retry execution time can be strikingly reduced.

The invention is not limited to the foregoing embodiments but incorporates many modifications within the scope of the invention without departing from the objects and advantages of the invention. The invention is not limited by the numerical values shown in the embodiments.

What is claimed is:

1. An optical storing apparatus comprising:
    an optical storage medium in which at least a recording layer to record data and a reproducing layer to reproduce the data recorded on said recording layer are formed on a substrate;
    a reproducing unit for reproducing the data recorded on the recording layer of said optical storage medium at a recording mark smaller than a beam diameter of a laser beam by setting a combination of a reproducing magnetic field and a reproducing laser power which are necessary for the reproduction into optimum values; and
    a read retry processing unit for changing a value of said reproducing magnetic field and retrying a reproducing operation at the time of a read retry when a read error occurs in said reproducing unit.

2. An apparatus according to claim 1, wherein said read retry processing unit changes said reproducing magnetic field in accordance with at least either each of several zones formatted on said optical storage medium, or each area obtained by dividing a recording area of said optical storage medium into a plurality of areas at the time of the read retry.

3. An optical storing apparatus comprising:
    a reproducing unit for reproducing the data recorded on said optical storage medium by setting parameters necessary for reproduction to optimum values; and
    a retry processing unit for performing a read retry while changing the setting of said parameters at the time of a read retry when a read error occurs in said reproducing unit, storing parameter set values as statistic information at the time of a retry success, and updating optimum parameters by a learning process based on said statistic information.

4. An apparatus according to claim 3, wherein said retry processing unit further performs a verify retry while changing the setting of said parameters at the time of a verify retry when a read error occurs due to a verification by a recording unit for recording data to an optical storage medium by a laser beam, stores parameter set values at the time of a retry success as statistic information, and updates optimum parameters by a learning process based on said statistic information.

5. An apparatus according to claim 3, wherein in the case where a magnetically induced super resolution medium for recording data at a recording mark smaller than a beam diameter of the laser beam is used as said optical storage medium, a reproducing magnetic field, a reading power, a cut-off frequency and a boost of a low pass filter, a slice level of a slice circuit, a window value (window delay time) of a data discriminator, and a focusing offset are set as said parameters necessary for the reproduction, and at the time of the read retry, the read retry is repeated while sequentially switching said plurality of kinds of parameters and changing the setting thereof.

6. An apparatus according to claim 3, wherein in the case where a magnetooptic medium for recording data at a recording mark depending on a beam diameter of the laser beam is used as said optical storage medium, a reading power, a cut-off frequency and a boost of a low pass filter, a slice level of a slice circuit, a window value (window delay time) of a data discriminator, and a focusing offset are set as said parameters necessary for the reproduction, and at the time of the read retry, the read retry is repeated while sequentially switching said plurality of kinds of parameters and changing the setting thereof.

7. An apparatus according to claim 3, wherein at the time of the read retry, said retry processing unit repeats the read retry while alternately repeating a setting change of the parameters for adding retry offsets to the parameter set values and a setting change of the parameters for subtracting the retry offsets from the parameter set values, stores information showing whether the parameter set values upon success and the retry offsets have been added or subtracted as a learning result, and updates said parameter set values so as to approach latest parameter set values by which the retry succeeds when an absolute value of the sum of the number of times of addition of the retry offsets which succeed in said learning result and the number of times of subtraction of the successful retry offsets is equal to or larger than a predetermined threshold value.

8. An apparatus according to claim 3, wherein said retry processing unit changes the setting of said parameters in accordance with any one of each zone formatted on said optical storage medium, each area obtained by dividing a recording area of said optical storage medium into a plurality of areas, and a temperature in the apparatus.

9. An apparatus according to claim 3, further comprising a test processing unit for deciding test offsets which are added to defaults which give said parameter set values by a test read and performing a next test read when an elapsed time from the test read reaches a predetermined time or when a temperature, change exceeding a predetermined value in which an apparatus temperature at the time of the test read is used as a reference temperature occurs,
    and wherein when the parameter set values are updated on the basis of the statistic information stored at the time of the retry success, said retry processing unit initializes the elapsed time of said test processing unit and updates said reference temperature to the temperature in the apparatus at the time of the retry success, thereby allowing a next test read to be discriminated.

10. An apparatus according to claim 4, wherein when said verify retry fails, said retry processing unit repeats a write retrying operation of erasure, writing, and verification while changing the setting of a writing power to record data onto said optical storage medium.

11. An apparatus according to claim 10, wherein said retry processing unit repeats the write retry at the time of the write retry while alternately performing a setting change of the parameters for adding retry offsets to a set value of the writing power and a setting change of the parameters for subtracting the retry offsets from the set value of said writing power.

12. An apparatus according to claim 10, wherein when said write retry succeeds, said retry processing unit stores information indicating whether the successful writing power set value and the retry offsets have been added or subtracted as a learning result, and updates said writing power set value so as to approach a latest writing power set value by which the retry succeeds when an absolute value of the sum of the number of times of addition of the retry offsets which succeed in said learning result and the number of times of subtraction of the successful retry offsets is equal to or larger than a predetermined threshold value.

13. An apparatus according to claim 10, wherein at the time of the write retry, said retry processing unit changes the setting of said writing power in accordance with at least any one of each zone formatted on said optical storage medium, each area obtained by dividing a recording area of said optical storage medium into a plurality of areas, and/a temperature in the apparatus.

14. An optical storing apparatus comprising:

a reproducing unit for reproducing data recorded on an optical storage medium by setting parameters necessary for reproduction to optimum values; and a retry processing unit for performing a read retry of a high success ratio on the basis of past successful retry information at the time of a read retry when a read error occurs in said reproducing unit and storing successful retry information at the time of a retry success.

15. An apparatus according to claim 14, wherein said retry processing unit executes the retry while switching a plurality of kinds of parameters and changing the setting thereof, stores successful parameter set values as statistic information, starts the read retry from previous successful parameter set values at the time of a new read retry, and stores the successful parameter set values at the time of the retry success.

16. An apparatus according to claim 14, wherein said retry processing unit executes the retry while switching a plurality of kinds of parameters and changing the setting thereof, stores successful parameter set values and the number of times of success of every parameter as statistic information, selects the parameter set values in accordance with the order from the parameter set value in which the number of times of success is large in said statistic information at the time of a new read retry, and repeats the read retry.

17. An apparatus according to claim 14, wherein in the case where a magnetically induced super resolution medium for recording data at a recording mark smaller than a beam diameter of the laser beam is used as said optical storage medium, the retry is executed while switching a reproducing magnetic field, a reading power, a cut-off frequency and a boost of a low pass filter, a slice level of a slice circuit, a window value (window delay time) of a data discriminator, and a focusing offset and changing the setting thereof as said parameters necessary for the reproduction.

18. An apparatus according to claim 14, wherein in the case where a magnetooptic medium for recording data at a recording mark depending on a beam diameter of the laser beam is used as said optical storage medium, the retry is executed while switching a reading power, a cut-off frequency and a boost of a low pass filter, a slice level of a slice circuit, a window value (window delay time) of a data discriminator, and a focusing offset and changing the setting thereof as said parameters necessary for the reproduction.

19. An apparatus according to claim 14, wherein at the time of the read retry, said retry processing unit alternately repeats a setting change of parameters for adding retry offsets to the parameter set values and a setting change of parameters for subtracting the retry offsets from the parameter set values.

20. An apparatus according to claim 14, wherein said retry processing unit stores the statistic information of the parameter set values at the time of said retry success in accordance with the temperature in the apparatus, each zone formatted on the medium, a kind of said optical storage medium, or a seek distance.

* * * * *

UNITED STATES PATENT AND TRADEMARK OFFICE
CERTIFICATE OF CORRECTION

PATENT NO.   : 6,687,194 B1
DATED        : February 3, 2004
INVENTOR(S)  : Kobayashi et al.

It is certified that error appears in the above-identified patent and that said Letters Patent is hereby corrected as shown below:

<u>Column 32,</u>
Line 32, delete "temperature," and insert -- temperature --.

<u>Column 33,</u>
Line 3, delete "and/a" and insert -- and a --.

Signed and Sealed this

Tenth Day of August, 2004

JON W. DUDAS
*Acting Director of the United States Patent and Trademark Office*